(12) United States Patent
Brück et al.

(10) Patent No.: US 11,972,883 B2
(45) Date of Patent: Apr. 30, 2024

(54) MAGNETOCALORIC EFFECT OF Mn—Fe—P—Si—B—V ALLOY AND USE THEREOF

(71) Applicant: Magneto B.V., Leiden (NL)

(72) Inventors: Ekkehard Hubertus Brück, Delft (NL); Jaiwei Lai, Delft (NL); Niels Harmen Van Dijk, Delft (NL)

(73) Assignee: Magneto B.V., Leiden (NL)

( * ) Notice: Subject to any disclaimer, the term of this patent is extended or adjusted under 35 U.S.C. 154(b) by 510 days.

(21) Appl. No.: 17/285,523

(22) PCT Filed: Oct. 16, 2019

(86) PCT No.: PCT/NL2019/050684
§ 371 (c)(1),
(2) Date: Apr. 15, 2021

(87) PCT Pub. No.: WO2020/080942
PCT Pub. Date: Apr. 23, 2020

(65) Prior Publication Data
US 2022/0028589 A1  Jan. 27, 2022

(30) Foreign Application Priority Data

Oct. 16, 2018 (NL) .................................. 2021825
Dec. 31, 2018 (NL) .................................. 2022331

(51) Int. Cl.
*H01F 1/01* (2006.01)
*C22C 22/00* (2006.01)
*F25B 21/00* (2006.01)

(52) U.S. Cl.
CPC ............ *H01F 1/017* (2013.01); *C22C 22/00* (2013.01); *F25B 21/00* (2013.01); *F25B 2321/0023* (2013.01)

(58) Field of Classification Search
CPC .......... H01F 1/017; C22C 22/00; F25B 21/00; F25B 2321/0023
See application file for complete search history.

(56) References Cited

U.S. PATENT DOCUMENTS

2005/0013723 A1* 1/2005 Branagan ............ C22C 33/0278
420/590
2007/0166183 A1* 7/2007 Kosa ....................... C22C 38/46
420/42

(Continued)

FOREIGN PATENT DOCUMENTS

CN    100416894 C  *  9/2008  ........... C01B 33/113
CN    101417786 A  *  4/2009
(Continued)

OTHER PUBLICATIONS

Brück "Developments in magnetocaloric refrigeration." Journal of Physics D: Applied Physics 38.23 (2005): R381. 12 pages.

(Continued)

*Primary Examiner* — Nelson J Nieves
(74) *Attorney, Agent, or Firm* — Smith Baluch LLP

(57) ABSTRACT

The invention provides an alloy comprising e.g. manganese, iron, vanadium, phosphor and silicon. The invention also provides an apparatus comprising a magnetic field generator, a heat sink, the thermo element, a heat source, and a control system, wherein in a controlling mode the control system is configured to select between (i) a first configuration wherein the magnetic field generator generates a magnetic field, the thermo element is exposed to the magnetic field, and heat from the thermo element is transferred to the heat sink, and (ii) a second configuration, wherein the thermo element is not exposed to the magnetic field, and heat from a heat source is transferred to the thermo element.

22 Claims, 27 Drawing Sheets

(56) References Cited

U.S. PATENT DOCUMENTS

| | | | |
|---|---|---|---|
| 2011/0037342 A1 | 2/2011 | Degen et al. | |
| 2012/0031109 A1* | 2/2012 | Vetrovec | F25B 21/00 62/3.1 |
| 2014/0290274 A1* | 10/2014 | Hu | H01F 1/015 241/3 |
| 2015/0013853 A1* | 1/2015 | Nakamura | H01F 1/16 148/541 |
| 2016/0189834 A1 | 6/2016 | Guillou et al. | |
| 2017/0233855 A1* | 8/2017 | Park | C22C 38/06 420/44 |
| 2018/0026170 A1* | 1/2018 | Miyazaki | H10N 10/10 252/62.3 T |
| 2018/0090756 A1* | 3/2018 | Yoo | C22C 22/00 |

FOREIGN PATENT DOCUMENTS

| | | | | |
|---|---|---|---|---|
| CN | 101407883 B | * | 2/2014 | C22C 19/00 |
| CN | 104451437 A | * | 3/2015 | |
| JP | H11335793 A | | 12/1999 | |
| JP | 2006517616 A | | 7/2006 | |
| JP | 2016145377 A | | 8/2016 | |
| JP | 2017031483 A | | 2/2017 | |
| JP | 2017066470 A | | 4/2017 | |
| NL | 2021825 B1 | | 5/2020 | |
| WO | 2004072313 A2 | | 8/2004 | |
| WO | WO-2004072313 A2 | * | 8/2004 | B22F 9/082 |
| WO | 2015018610 A1 | | 2/2015 | |
| WO | 2015018678 A1 | | 2/2015 | |
| WO | 2015018705 A1 | | 2/2015 | |
| WO | WO-2015018610 A1 | * | 2/2015 | F25B 21/00 |
| WO | WO-2015018678 A1 | * | 2/2015 | F25B 21/00 |
| WO | WO-2015018705 A1 | * | 2/2015 | F25B 21/00 |
| WO | 2017072334 A1 | | 5/2017 | |
| WO | 2017162768 A1 | | 9/2017 | |
| WO | 2017211921 A1 | | 12/2017 | |
| WO | WO-2017211921 A1 | * | 12/2017 | H01F 1/015 |
| WO | 2020080942 A1 | | 4/2020 | |
| WO | WO-2020080942 A1 | * | 4/2020 | C22C 22/00 |

OTHER PUBLICATIONS

Guillou et al., "Taming the First-Order Transition in Giant Magnetocaloric Materials." Advanced materials 26.17 (2014): 2671-2675.

International Search Report and Written Opinion in International Patent Application No. PCT/NL2019/050684 dated Apr. 14, 2020, 9 pages.

Miao et al., "Structural origin of hysteresis for hexagonal (Mn, Fe)2(P, Si) magneto-caloric compound." Scripta Materialia 138 (2017): 96-99.

Rundqvist et al., The Structures of Ni6, Si2B, Fe2B and Some Related Phases. Acta Chem. Scand 13 (1959): 425-432.

Search Report and English Translation Thereof in Netherlands Application No. 2022331 dated May 13, 2020, 14 pages.

Search Report in Netherlands Application No. 2021825 dated Feb. 7, 2019, 7 pages.

Swiss Blue Energy AG. Accessed at http://www.swiss-blue-energy.ch/en/technology.html on Jul. 14, 2021. 5 pages.

Thang et al., "Effects of milling conditions on nano-scale MnFe (P, Si) particles by surfactant-assisted high-energy ball milling." Physics Procedia 75 (2015): 1104-1111.

Van Eijck et al., "Design and performance of a novel neutron powder diffractometer: PEARL at TU Delft." Journal of Applied Crystallography 49.5 (2016): 1398-1401.

Korean Office Action with translation in Korean App. No. 10-2021-7014610 dated Sep. 5, 2023, 15 pages.

Japanese Office Action with translation in Japanese App. No. 2021-519553, dated Oct. 16, 2023, 18 pages.

Chinese Office Action and Search Report with translation in Chinese App. No. 201980066963.2 dated Jan. 29, 2024, 13 pages.

\* cited by examiner

MAGNETOCALORIC EFFECT OF Mn—Fe—P—Si—B—V ALLOY AND USE THEREOF

CROSS-REFERENCE TO RELATED APPLICATIONS

This application is a national-phase application, under 35 U.S.C. 371, of International Application No. PCT/NL2019/050684, which was filed on Oct. 16, 2019, which in turn claims priority to Netherlands Application No. 2022331, which was filed on Dec. 31, 2018, and Netherlands Application No. 2021825, which was filed on Oct. 16, 2018. Each of these applications is incorporated herein by reference in its entirety for all purposes.

FIELD OF THE INVENTION

The invention relates to a magnetocaloric material. The invention also relates to a system comprising such material. The invention also relates to a method of producing such material.

BACKGROUND OF THE INVENTION

Magnetocaloric materials are known in the art. US2014290274, for instance, describes a first-order phase-transition La(Fe,Si)$_{13}$-based magnetocaloric material showing small hysteresis loss, and preparation and use thereof. The material has a NaZn$_{13}$-type structure, is composed of granules with a particle size in the range of 15-200 μm and not less than 15 μm, and is represented by chemical formula La$_{1-x}$R$_x$(Fe$_{1-p-q}$Co$_p$Mn$_q$)$_{13-y}$Si$_y$A$_\alpha$. The method for preparing the material comprises steps of preparing the material La$_{1-x}$R$_x$(Fe$_{1-p-q}$Co$_p$Mn$_q$)$_{13-y}$Si$_y$A$_\alpha$ by smelting and annealing; and then crushing the material into powder with a particle size in the range of 15-200 μm. Without changing the components, a La(Fe,Si)$_{13}$-based magnetocaloric material showing small hysteresis loss and strong magnetocaloric effect can be obtained by adjusting the particle size within the range of 15-200 μm. Utilization of this type of materials in the practical magnetic refrigeration application is of great significance. When the particle size is 10 μm or less, the stability of the magnetocaloric material is lost; the magnitude of magnetic entropy change is reduced dramatically; and thus it is no longer suitable for the practical application in magnetic refrigeration technology. Therefore, the giant magnetocaloric effect of the material can be maintained to the max if the granules with a particle size of less than 10 μm are removed by screening.

WO2017211921, "magnetocaloric materials comprising manganese, iron, silicon, phosphorus and carbon", describes magnetocaloric materials comprising manganese, iron, phosphorus, silicon, carbon and optionally one or both of nitrogen and boron, and processes for producing said magnetocaloric materials.

WO2017072334, "magnetocaloric materials comprising manganese, iron, silicon, phosphorus and nitrogen" describes magnetocaloric materials comprising manganese, iron, silicon, phosphorus, nitrogen and optionally boron.

WO2015018705, "magnetocaloric materials containing B" describes a magneto-caloric material of the general formula (i) (Mn$_x$Fe1-x)2+u P1-y-zSi$_y$B$_z$ wherein 0.55≤x≤0.75, 0.4≤y≤0.65, 0.005≤z≤0.025, −0.1≤u≤0.05.

WO2015018610, "magnetocaloric materials containing B" is related to the previous document and describes a magnetocaloric material of the general formula (i) (Mn$_x$Fe1-x)2+u P1-y-zSi$_y$B$_z$ wherein 0.25≤x≤0.55, 0.25≤y≤0.65, 0≤z≤0.2-0.1≤u≤0.05, and y+z≤0.7.

WO2015018678, "magnetocaloric materials containing B" is related to the previous two documents and describes a magnetocaloric material of the general formula (i) (Mn$_x$Fe1-x)2+u P1-y-zSi$_y$B$_z$ wherein 0.55≤x≤0.75, 0.25≤y≤0.4, 0.05≤z≤0.2, −0.1≤u≤0.05.

Miao et al., 2017, "structural origin of hysteresis for hexagonal (MnFe)2(P,Si) magneto-caloric compound", *Scripta Materialia*, describes in situ transmission electron microscope observations on the ferromagnetic transition in hexagonal (Mn,Fe)2(P,Si) magnetocaloric compounds.

Thang et al., 2015, "effects of milling conditions on nano-scale MnFe(P,Si) particles by surfactant-assisted high-energy ball milling", *Physics Procedia*, describes the influence of milling conditions on nano-scale MnFe(P,Si) particles obtained by surfactant-assisted high-energy ball milling as determined via x-ray diffraction and magnetic measurements.

SUMMARY OF THE INVENTION

Prior art (magnetocaloric) materials may have a relatively large hysteresis and/or have otherwise less desirable properties. Hence, it is an aspect of the invention to provide an alternative (magnetocaloric) material, which preferably further at least partly obviates one or more of above-described drawbacks. The present invention may have as object to overcome or ameliorate at least one of the disadvantages of the prior art, or to provide a useful alternative.

In an aspect, the invention provides an alloy comprising metal elements and non-metal elements, wherein the metal elements comprise manganese, iron, and vanadium, and wherein the non-metal elements comprise phosphor and silicon.

This alloy appears to exhibit a (giant) magnetocaloric effect (MCE). This alloy appears to have a relatively small hysteresis but has otherwise useful properties (see also below). Hence, in embodiments a novel magnetocaloric material is provided.

In specific embodiments, the invention provides a MnVFePSi based alloy.

In embodiments, the alloy can be indicated as MA alloy, wherein M indicates one or more metal elements, and wherein A indicates one or more non-metal elements.

In embodiments, the alloy may be indicated as M$_x$A$_y$, wherein x is especially selected from the range of 1.8-2.1 and wherein y is selected from the range of 0.85-1.05, especially 0.9-1.0.

Especially, M comprises at least Mn, Fe and V, and A comprises at least P and Si.

In embodiments, the alloy may be indicated as (Mn$_a$Fe$_b$V$_c$M*$_d$)$_x$(P$_e$Si$_f$A*$_g$)$_y$, wherein x and y are as indicated above, wherein M* refers to optional other metals and wherein A* refers to optional other non-metals. Especially, a+b+c+d=1 and e+f+g=1. Further, especially a>0, b>0, c>0, d>0. Further, especially e>0, f>0, and g>0. Further, especially a+b≥0.8, even more especially a+b≥0.9, yet even more especially a+b≥0.95, such as a+b≥0.97. In yet further specific embodiments, c≥0.05, especially c≥0.01. Further, especially e+f≥0.7, such as e+f≥0.8, like e+f≥0.9, such as especially e+f≥0.95. In embodiments, g≥0.005, such as g≥0.01, like especially g≥0.05. Further, especially g≤0.12, even more especially g≤0.1. In embodiments, A* may comprise B (boron). In further embodiments, A* is B. In specific embodiments, d=0.

Note however that minor impurities may in embodiments not be excluded. In general, however, the presence of impurities may be equal to or below 25,000 ppm, such as equal to or below 20,000 ppm, like equal to or below 15,000 ppm. Hence, e.g. up to 1.5 wt % impurities may be available in the alloy.

In specific embodiments, an atom ratio of the metal elements to the non-metal elements is within the range of 1.8-2.1:1 (i.e. between 1.8:1 and 2.1:1). More especially, an atom ratio of the metal elements to the non-metal elements is within the range of 1.9-2.0:1. Yet even more especially, an atom ratio of the metal elements to the non-metal elements is within the range of 1.93-1.97:1.

In further embodiments, an atom ratio of the vanadium element to the other metal elements is selected from the range of 0.01:1.94-0.04:1.86, like 0.01:1.95-0.03:1.88, such as in embodiments 0.03:1.92. In yet further embodiments, the alloy may further comprise one or more of C, N, B, wherein an atom ratio of C, N and B to phosphor and silicon ($[C]+[N]+[B])/([P]+[Si])$ is equal to or smaller than 0.1, especially ≤0.05. In embodiments, an atom ratio of the silicon element is in a molar fraction of the non-metal elements ranging from 0.3 to 0.6, with the remainder being (i) P, or (ii) P, and one or two out of C, N, and B. In yet further embodiments, an atom ratio of the silicon element is in a molar fraction of the non-metal elements ranging from 0.3 to 0.6, with the remainder being P, and C, N, and B.

In further embodiments, an atom ratio of the vanadium element to the other metal elements is selected from the range of 0.01:1.95-0.03:1.92.

As indicated above, the alloy can be indicated as MA alloy, wherein M indicates one or more metal elements, and wherein A indicates one or more non-metal elements, and wherein M comprises at least Mn, Fe and V, and A comprises at least P and Si. Especially, the atom ratio of V to M (wherein M thus also includes V) is selected from the range of 0.005-0.1, more especially 0.008-0.05, like 0.008-0.035.

In embodiments, the atom ratio of [P+Si] to A is selected from the range of 0.9-1 (i.e. at least 90% of the A atoms are P and Si). In embodiments, the atom ratio of Mn to Fe may be selected from the range of 0.3-2, such as 0.4-1.8.

Especially, when (i) the atom ratio of Mn to M (wherein M thus also includes Mn) is selected from the range of 0.55-0.67, like 0.58-0.63, the atom ratio of Fe to M (wherein thus M also include Mn) is selected from the range of 0.68-0.76, like especially 0.70-0.74, the ratio of V to M (wherein M thus also includes V) is selected from the range of 0.008-0.05, the atom ratio of P to A (wherein A thus also include P) is selected from the range of 0.38-0.46, more especially from the range of 0.40-0.44, and the atom ratio of Si to A (wherein A thus also includes Si) is selected from the range of 0.54-0.62, especially from the range of 0.56-0.60, good results were obtained with Tc in the range of about 25-50° C. This may e.g. be useful for (industrial) residual heat applications.

Hence, in embodiments the invention provides a MnVFePSiB based alloy.

In yet a further aspect, the invention also provides a method for producing the alloy. Starting materials may be combined and annealed at a temperature of at least about 1300 K, such as up to 1500 K. Hence, in an embodiment, the alloy as described herein may be obtainable by pre alloying starting materials for the alloy and a subsequent heat treatment at a temperature selected from the range of 1300-1500 K, especially over a period of time selected from the range of minutes to weeks, such as 10 μminutes to 5 weeks, like 1 hour to 2 weeks. In alternative embodiments, the alloy as described herein may be obtainable by pre alloying starting materials for the alloy and a subsequent heat treatment at a temperature selected from the range of about 900-1500 K, such as at least about 1200 K, especially over a period of time selected from the range of minutes to weeks, such as 10 μminutes to 5 weeks, like 1 hour to 2 weeks, at elevated pressures. Elevated pressures may e.g. be at least about 50 MPa, such as at least about 80 MPa, like at least about 100 MPa, like in the range of 80-200 MPa, though other elevated pressures may also be possible.

Hence, in an aspect the invention provides a method for producing the alloy as defined herein, wherein the method comprises providing a combination of starting materials to produce the alloy, and heating the combination of starting material until the alloy is obtained. In embodiments, the starting materials may comprise elementary starting materials, such as elemental Mn, V, Fe, P, and Si, or elemental B. Alternatively or additionally, the starting materials may comprise a pre alloyed starting material. For instance, the starting material may comprise $Fe_3P$ (iron phosphide) as pre alloy. For instance, $Fe_3P$ may be prepared by dropping pellets of red phosphorus into molten iron. The iron can e.g. be melted in an induction furnace under protective (e.g. nitrogen and/or argon) atmosphere. Other pre alloys may also be applied. Hence, the starting materials may comprise one or more different pre alloys. Instead of the term "heating" and similar terms, also the term "annealing" and similar terms may be applied. As indicated above, heating may e.g. be done at at least 900K, such as especially at at least 1300 K, such as up to 1500 K. The term "heating" may also refer to a heating program, wherein over time during time periods the temperature is kept constant, before changing to a higher or lower temperature. After heating the starting materials such that the alloy is obtained, the thus obtained material can be cooled down. It surprisingly appears that V also has a beneficial effect on the cooling down process. When larger volumes of starting materials are heated, gradual cooling down of the thus obtained material seems possible with the V containing products, whereas the magnetical properties of non-V containing alloys appear to be worse. Hence, the present alloy also allows production of larger batches of such alloy.

Further, it was also found that the alloy as described herein has much better low-field and high field performance. The behavior in e.g. a field of 0.5 and 1 Tesla appears to be the same (ΔM essentially stays the same), whereas comparative examples showed substantial differences in magnetic behavior (e.g. 0% vs. 22% change for the V containing alloy and a non-V containing alloy).

The alloy may especially be shaped to facilitate fast heat transfer. In embodiments, the alloy may be used as (shaped) thermo element. Especially, the thermo element is a body comprising the alloy, especially an alloy body. In embodiments, the thermo element comprises a massive body.

Hence, in yet a further aspect, the invention also provides a thermo element comprising the herein described alloy. The thermo element can be used in an apparatus for heating, or for cooling, or for heating and cooling, respectively, or for creating mechanical energy. The alloy, and thus in embodiments the thermo element, may exhibit the (giant) magnetocaloric effect (MCE). This effect can be used to cool, or to heat (with the alloy or thermo element, respectively). This may also be used to create mechanical energy (with the alloy or thermo element, respectively). The term "mechanical energy" especially refers to the sum of potential energy and kinetic energy. In the present invention, the alloy or the thermo element may in embodiments be used to create mechanical energy, especially kinetic energy.

In yet a further aspect, the invention provides an apparatus comprising a magnetic field generator, a heat sink, a thermo element comprising the alloy as defined herein, and a control system. In embodiments, in a controlling mode the control system is configured to select between (i) a first configuration wherein the magnetic field generator generates a (first) magnetic field, the thermo element is exposed to the magnetic field, and the thermo element is in thermal contact with the heat sink, and (ii) a second configuration, wherein the thermo element is not exposed to the magnetic field or to a substantially smaller magnetic field, and the thermo element is not in thermal contact with the heat sink. Especially, in a controlling mode the control system is configured to select between (i) a first configuration wherein the magnetic field generator generates a magnetic field, the thermo element is exposed to the magnetic field, and the thermo element is in thermal contact with the heat sink, and (ii) a second configuration, wherein the thermo element is not exposed to the magnetic field, and the thermo element is not in thermal contact with the heat sink. In an embodiment, the apparatus further comprises or is functionally coupled to a heat source, wherein during the second configuration heat from the heat source is transferred to the thermo element.

In yet a further aspect, the invention provides an apparatus comprising a magnetic field generator, a heat sink, a thermo element comprising the alloy as defined herein, a heat source, and a control system. In embodiments, in a controlling mode the control system is configured to select between (i) a first configuration wherein the magnetic field generator generates a (first) magnetic field, the thermo element is exposed to the magnetic field, and heat from the thermo element is transferred to the heat sink, and (ii) a second configuration, wherein the thermo element is not exposed to the magnetic field or to a substantially smaller magnetic field, and heat from a heat source is transferred to the thermo element. Especially, in a controlling mode the control system is configured to select between (i) a first configuration wherein the magnetic field generator generates a magnetic field, the thermo element is exposed to the magnetic field, and heat from the thermo element is transferred to the heat sink, and (ii) a second configuration, wherein the thermo element is not exposed to the magnetic field, and heat from a heat source is transferred to the thermo element.

In this way, a heat pump may be provided.

A substantially smaller magnetic field is especially at least 10 times, such as at least 20 times, like at least 50 times smaller than the (first) magnetic field.

In embodiments, the heat source may comprise a cold heat exchanger. In embodiments, this may comprise refrigerator, or (e.g. in house) an air conditioning system, or (e.g. outside) air or an aquifer for a heat pump heating system.

In embodiments, the heat transfer may be accomplished by a water-like fluid, in embodiments containing some means to prohibit freezing and/or to prohibit boiling within the desired temperature range, such as in a temperature range of 210-380K.

In embodiments, the apparatus may further comprising a fluid system, wherein the fluid system is configured to contain a fluid, and wherein the fluid system is configured to provide thermal contact between the thermo element and the fluid (contained by the system), especially wherein the fluid is a liquid, even more especially wherein the liquid comprises one or more of an additive to increase the boiling temperature and/or an additive to decrease the freezing temperature. In embodiments, the fluid comprises water. In specific embodiments, the fluid may essentially consist of water. However, other liquids may also be used (at reduced or elevated temperatures).

The fluid system may include a pump. In this way the fluid may be pumped along a device that is to be cooled (or heated). The term "pump" may also refer to a plurality of pumps.

The apparatus may comprise an actuator, configured to move the thermo element. Alternatively, the thermo element may be configured as part of an actuator. As indicated above, the thermo element may also be used to create mechanical energy.

The heat transfer may also be accomplished by any other nonflammable, nontoxic, greenhouse-effect neutral fluid that does not boil or freeze in the desired temperature range. Hence, in embodiments (of the apparatus) the liquid may comprise a nonflammable, nontoxic, greenhouse-effect neutral fluid that does not boil or freeze in the desired temperature range.

In yet a further aspect, the invention also provides a system that comprises a heat pump. Such system may comprise the (elements of the above-described) respective embodiments of the apparatus.

In an aspect, the invention provides a system comprising the apparatus as defined herein, wherein the system is configured as a refrigerator, wherein in a controlling mode of the system, the system is configured to pump heat from sub ambient levels to a temperature in the range from ambient down to 210 K and/or to temperatures above ambient, such as to a temperature in the range of 210 K to above ambient. The low temperature range may also be a fraction of the aforementioned range depending on the desired refrigerator temperature.

In embodiments, the system may be configured to provide heat (thermal energy) from a first space to a second space, wherein the first space has a lower temperature than the second space. Especially, the first space may have a sub ambient temperature, and the second space may have a temperature selected from the range of 210 K to an above ambient temperature.

In an aspect, the invention provides a system comprising the apparatus as defined herein, wherein the system is configured as a heater, wherein in a controlling mode of the system, the system is configured to pump heat from sub ambient levels to temperatures above ambient up to 380 K. The high temperature range may also be a fraction of the aforementioned range depending on the desired heater temperature.

In yet a further aspect, the invention also provides a system comprising a magnetic field source, the alloy as defined herein, and a thermal switch, that results in generation of mechanical and or electrical energy. Hence, the invention also provides a Tesla motor or magnetocaloric generator.

In yet a further aspect, the invention also provides an apparatus (similar to the one described in US20120031109A1, which is herein incorporated by reference) for transferring heat from a cooler reservoir to a warmer reservoir while spending mechanical energy in the process; said apparatus comprising a thermo element comprising the alloy, a first thermal conductor, a second thermal conductor, a means for producing a region of strong magnetic field and a region of weak magnetic field, and a thermal interface fluid (TIF); said first thermal conductor being arranged to be in a good thermal communication by means of said TIF with a portion of said thermo element when said portion of said thermo element is immersed in said weak magnetic field; and said second thermal conductor being arranged to be in a good thermal communication by means of said TIF with a portion of said thermo element when said portion of said thermo element is immersed in said strong magnetic field.

Swiss Blue Energy AG also describes a Thermo-Magnetic Motor (see e.g. http://www.swiss-blue-energy.ch/en/technology.html), suitable for converting low-temperature heat between 20° C. to 80° C. into usable electricity. A percentage of the thermal energy stored in the temperature difference ($\Delta T$) of two water flows is utilized for electricity production. For instance, the minimum temperature difference should be 20 K. The Curie point defines the temperature, where a reversible phase change of magnetic properties of magneto-caloric materials occurs. The magneto-caloric material behaves paramagnetic above its Curie point (i.e. behavior in a magnetic field comparable to plastics) and ferromagnetic below its Curie point (i.e. behavior in a magnetic field comparable to iron). This behavior is named Curie Effect. At a temperature below the Curie point the magneto-caloric material is attracted by the magnetic field of a permanent magnet (ferromagnetic properties). With a temperature above the Curie point, the magneto-caloric material passes the magnetic field of a permanent magnet unhindered (paramagnetic properties). By a fast change in temperature above and below the Curie point of the magneto-caloric material (Fast Thermal Switch) combined with an accurate placement of permanent magnets, a continuous rotation of the rotor is achieved. This mechanical energy is afterwards converted in electricity. The Thermo-Magnetic Motor (TMM) converts a percentage of the thermal energy stored in the temperature difference ($\Delta T$) between two water streams into usable zero-emission electricity. This is achieved by a very fast and continuous heating and cooling of a magneto-caloric material around its Curie point and the application of permanent magnets.

Hence, in an aspect the invention provides an apparatus configured to execute one or more of (a) cooling during a first operation mode, and (b) heating during a second operation mode, wherein the apparatus comprises a thermo element comprising the alloy as defined herein.

In yet a further aspect of the invention, the invention provides an apparatus configured to generate mechanical energy during a third operation mode.

In yet a further aspect of the invention, the invention provides an apparatus configured to generate electrical energy during a fourth operation mode.

In yet a further aspect of the invention, the invention provides an apparatus configured to execute one or more of (a) cooling during a first operation mode, and (b) heating during a second operation mode, (c) generating mechanical energy during a third operation mode, and (d) generating electrical energy during a fourth operation mode.

Hence, in an aspect the invention also provides a system comprising the apparatus as defined herein, wherein the system is configured to heat, to cool, or to heat and cool, respectively, or to generate mechanical energy. Especially, in an aspect the invention also provides a system comprising the apparatus as defined herein, wherein the system is configured to heat, to cool, or to heat and cool, respectively, or to generate mechanical energy, or to generate electrical energy. Two or more of such options may be possible in embodiments of the system. The system may further comprise a control system.

The control system may control the apparatus or system (comprising the apparatus) in dependence of a sensor signal, an instruction of a user interface, and a timer. The sensor signal may e.g. be the signal of a temperature sensor. The timer may e.g. be a clock.

Below, specific embodiments may be described of which the teaching may also be interpreted broader, and which embodiments are—amongst others—described to support the above defined embodiments and the appending claims.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The system, or apparatus, or device may execute an action in a "mode" or "operation mode" or "mode of operation" or "control mode". Likewise, in a method an action or stage, or step may be executed in a "mode" or "operation mode" or "mode of operation" or "control mode". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed. However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 2:
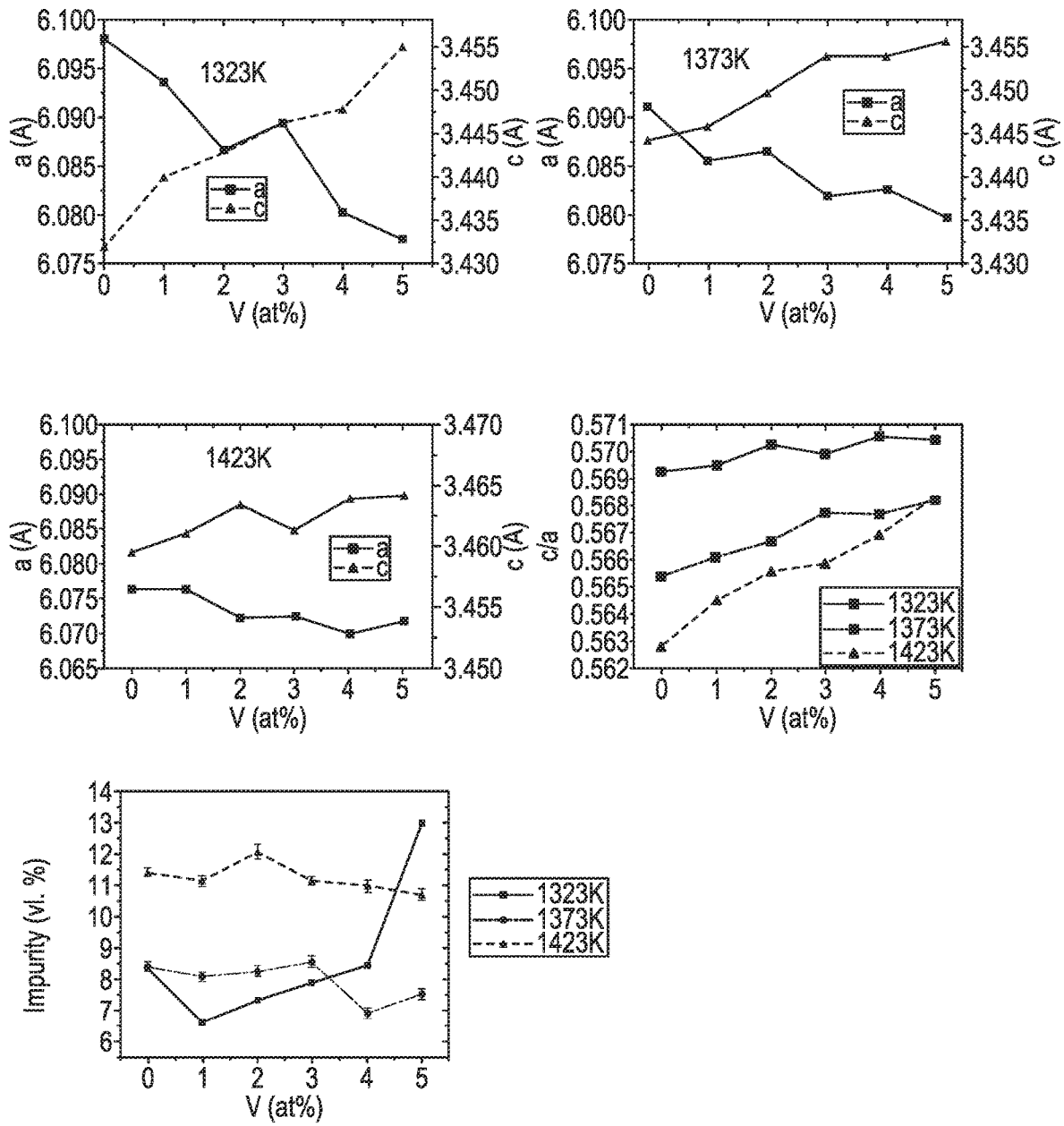
Figure 3A:
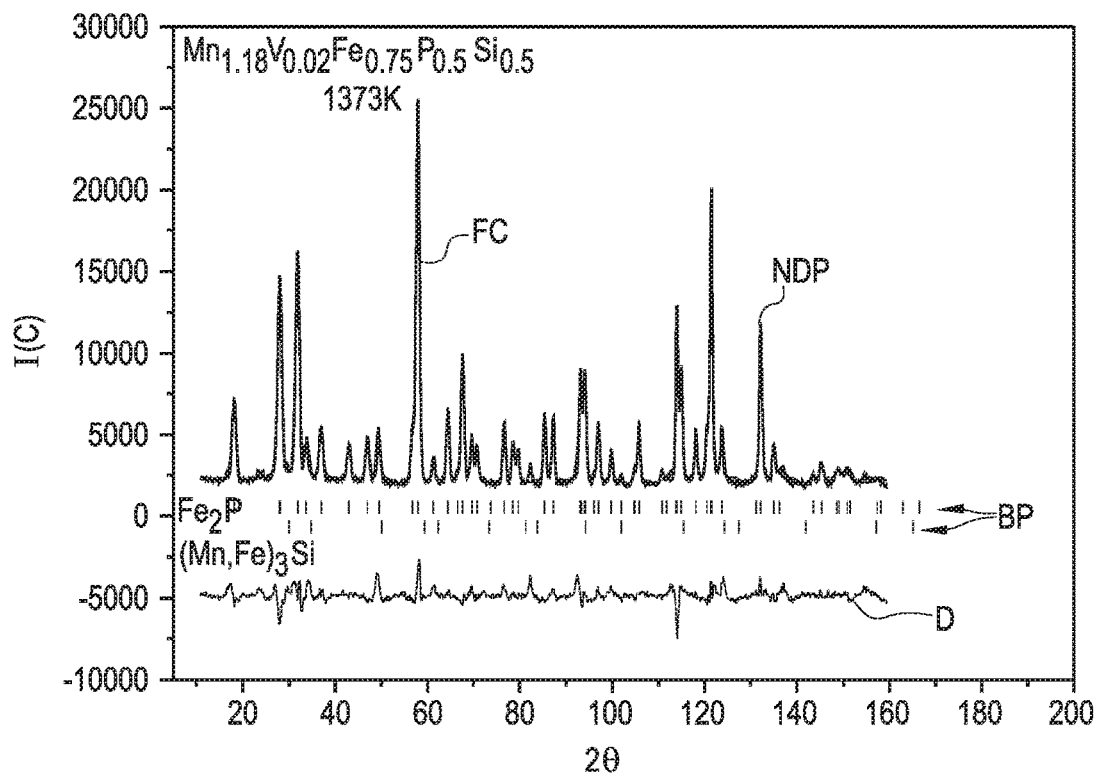
Figure 3B:
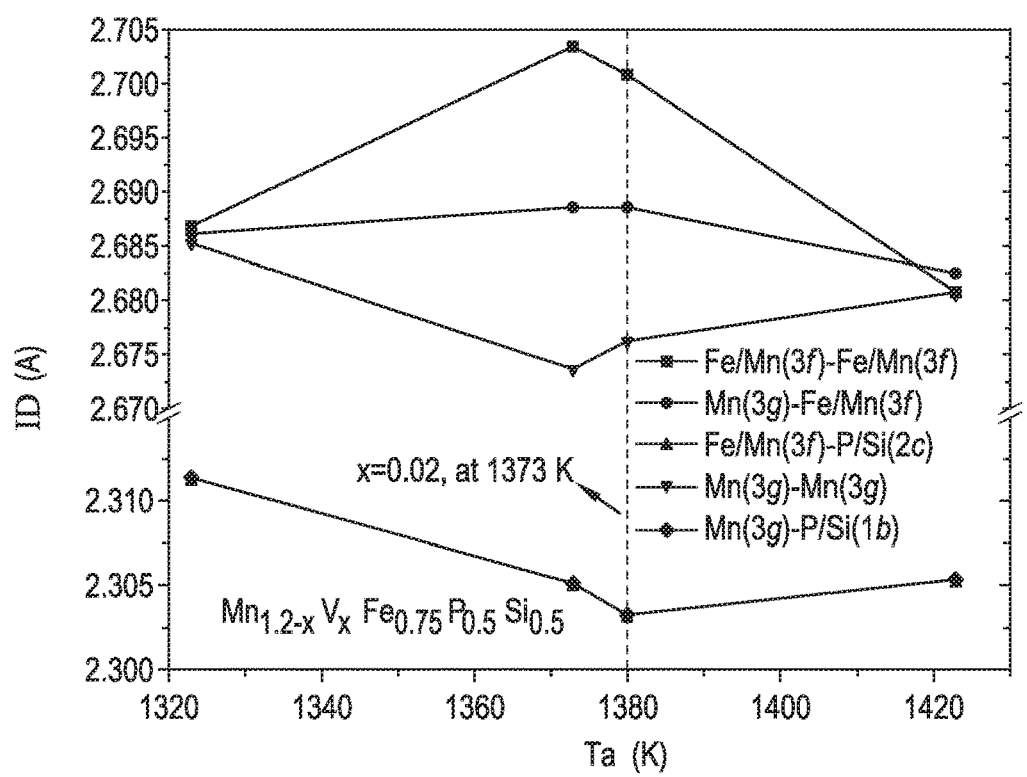
Figure 4A:
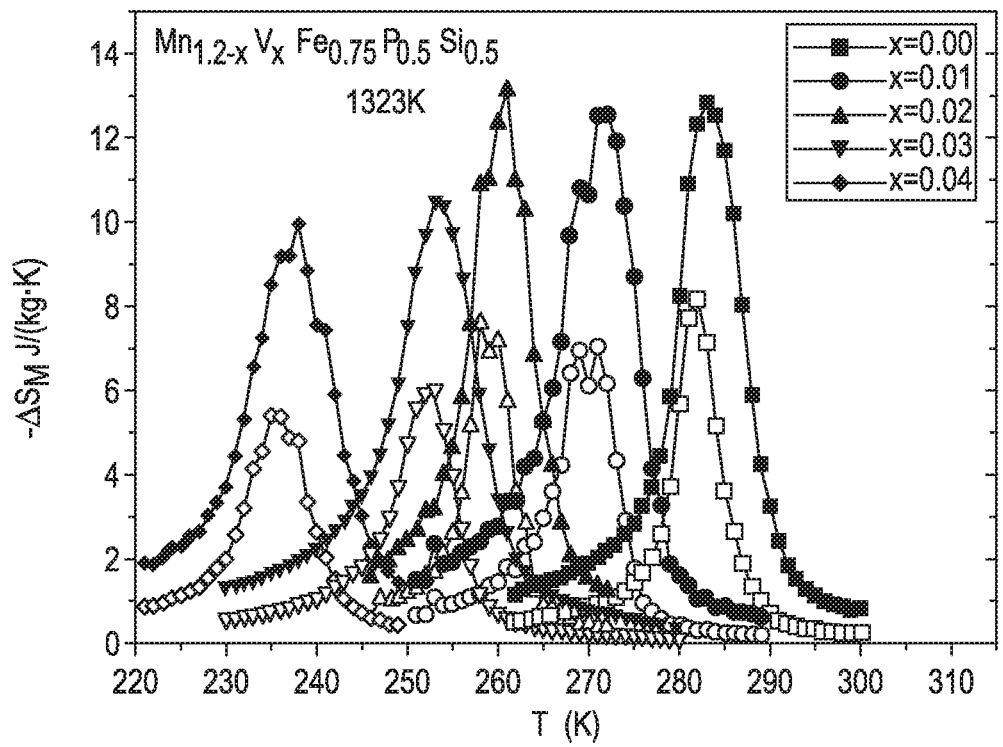
Figure 4B:
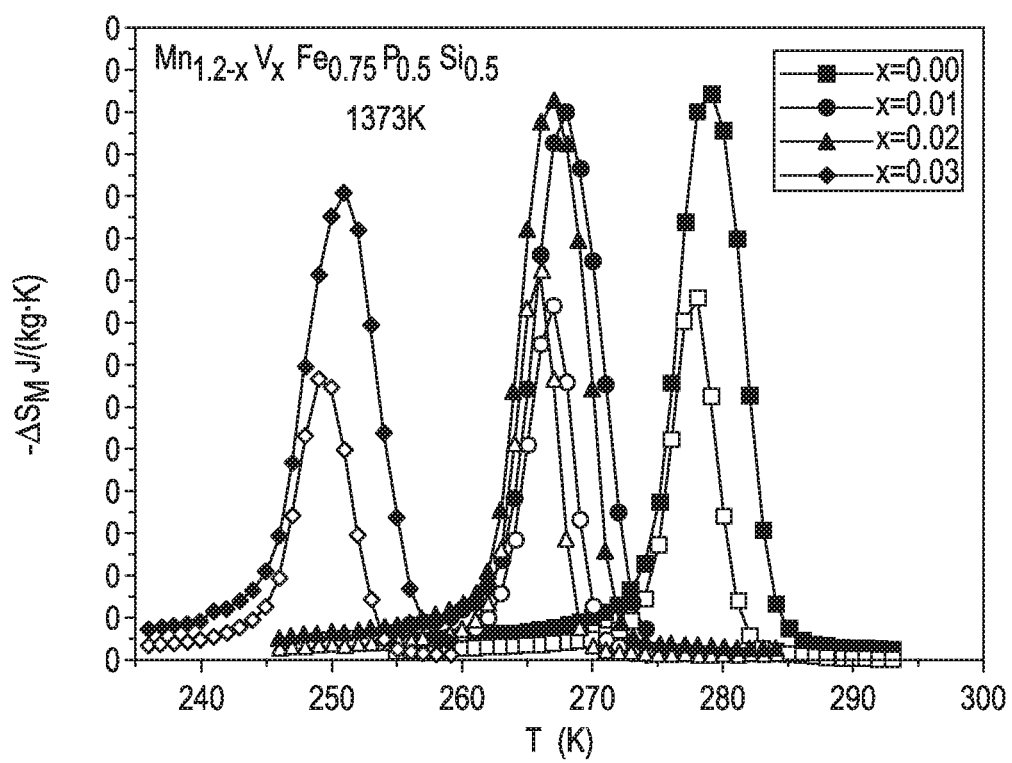
Figure 4C:
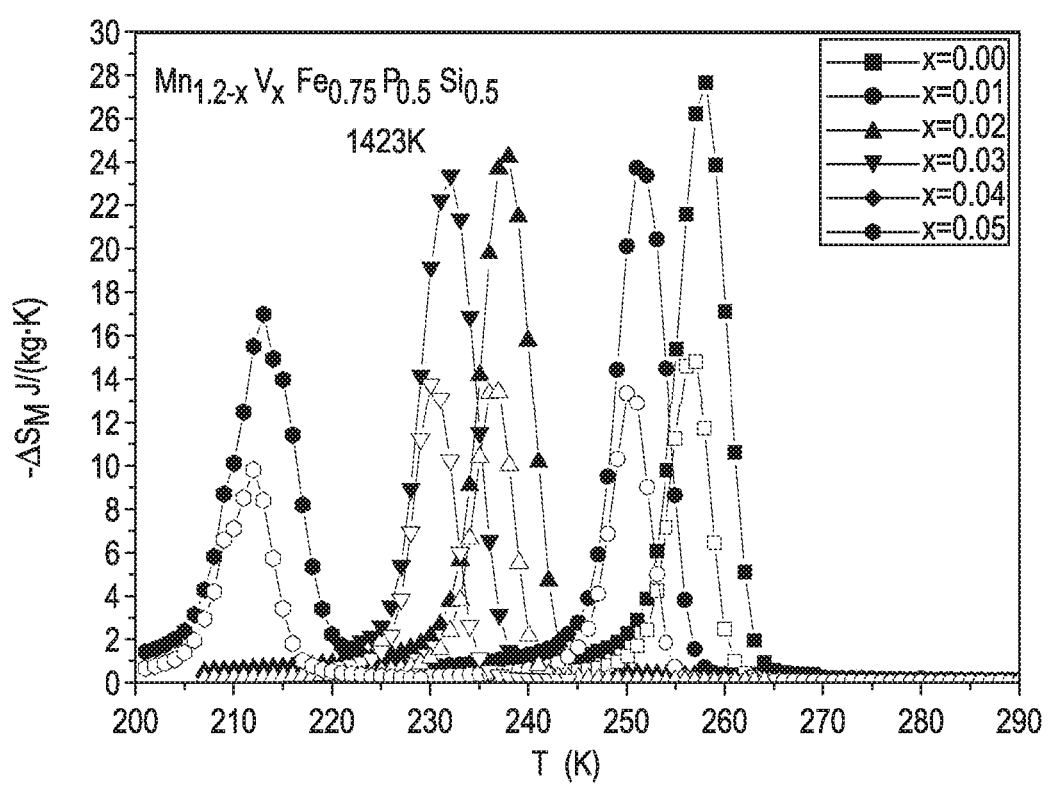
Figure 5A:
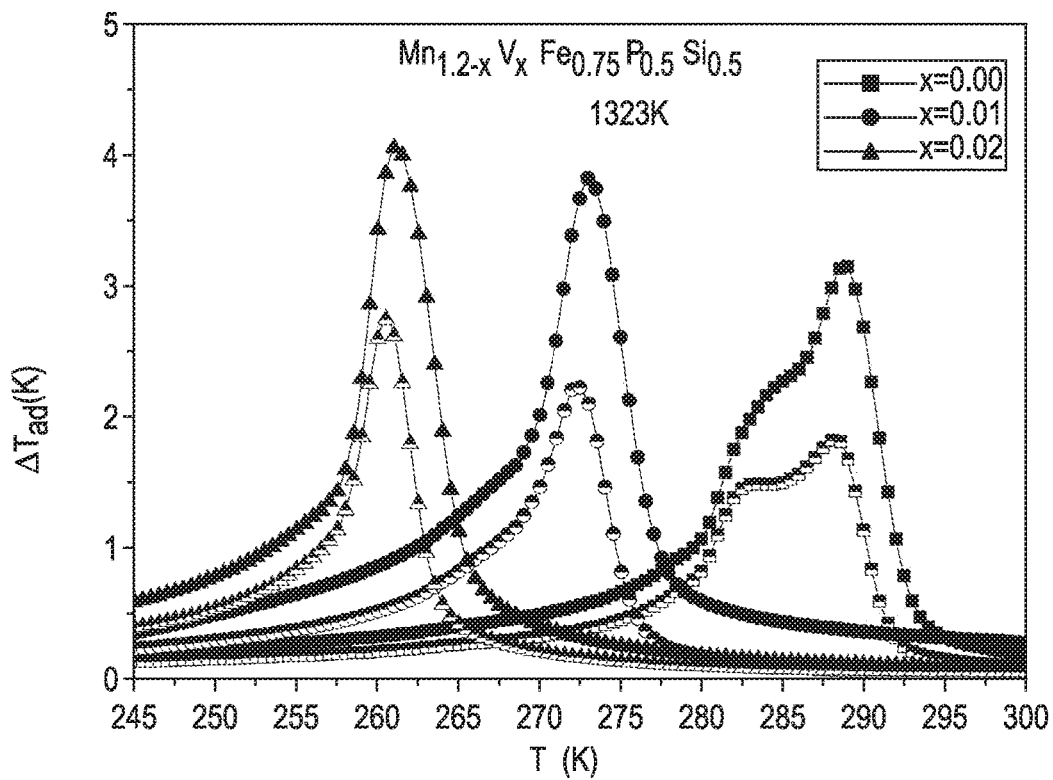
Figure 5B:
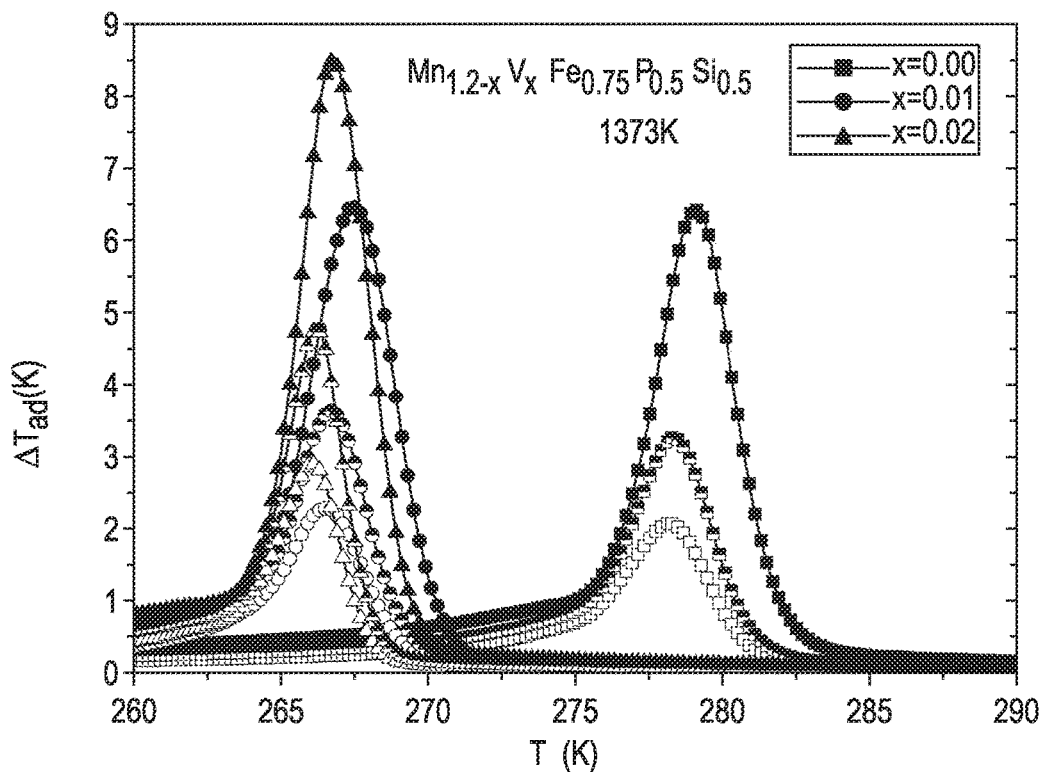
Figure 6A:
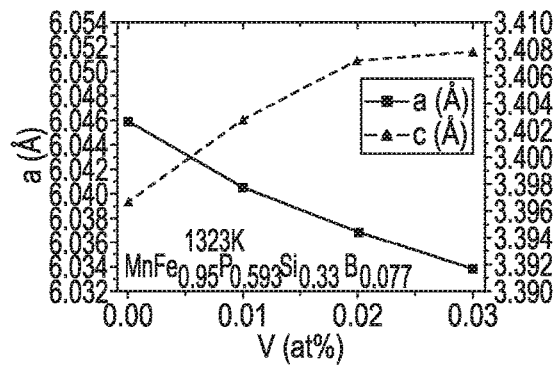
Figure 6B:
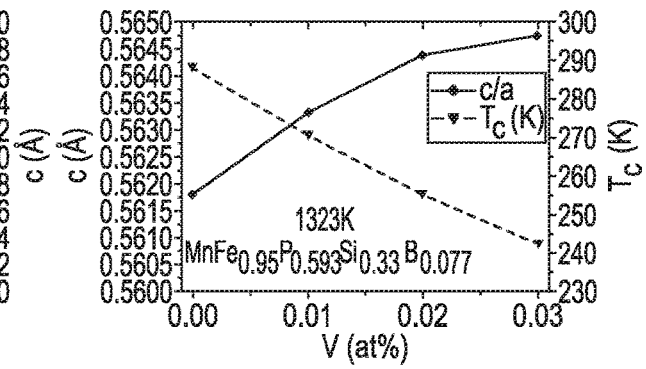
Figure 6C:
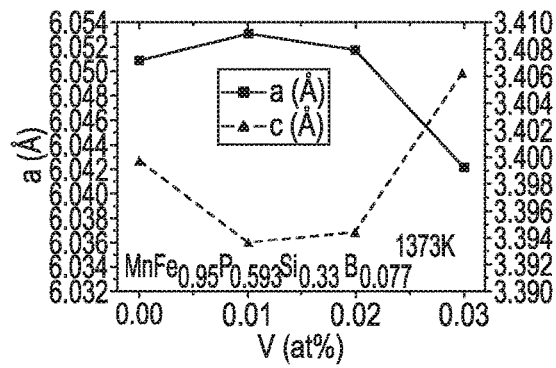
Figure 6D:
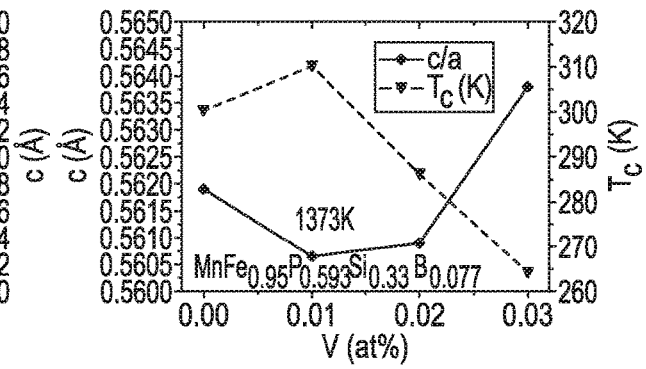
Figure 6E:
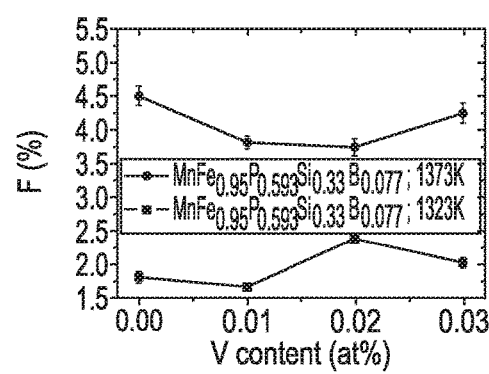
Figure 6F:
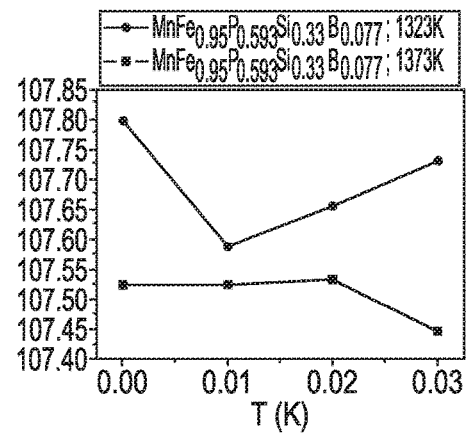
Figure 7A:
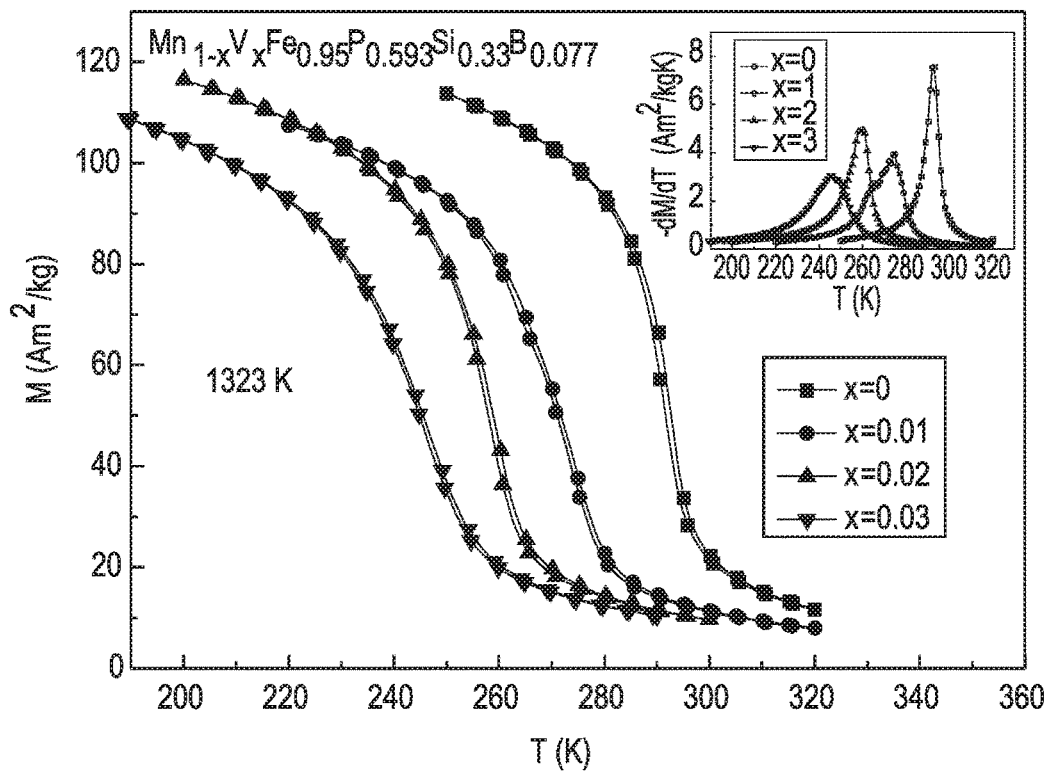
Figure 7B:
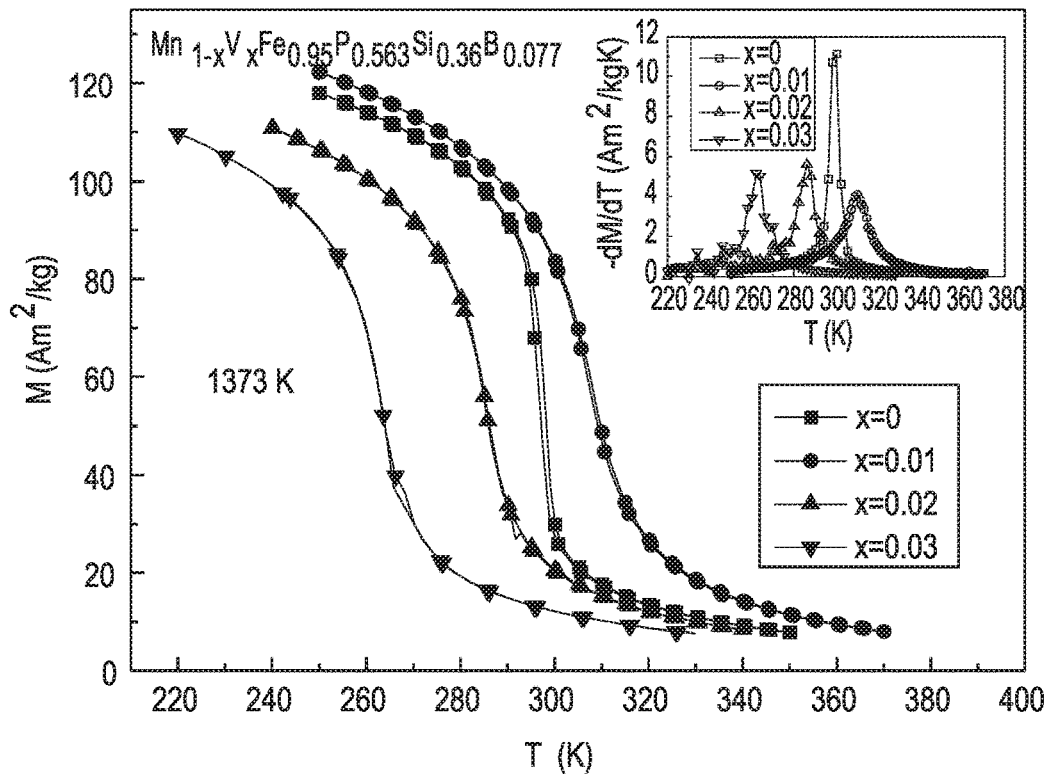
Figure 8A:
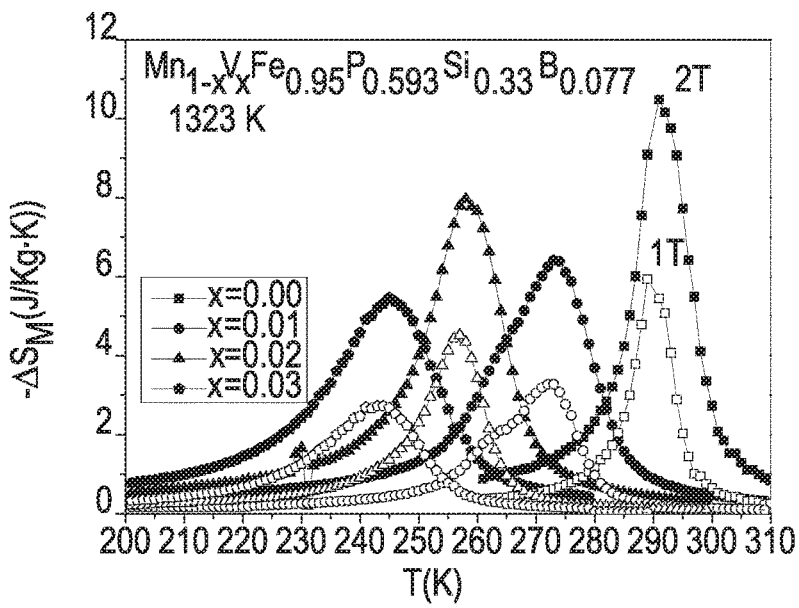
Figure 8B:
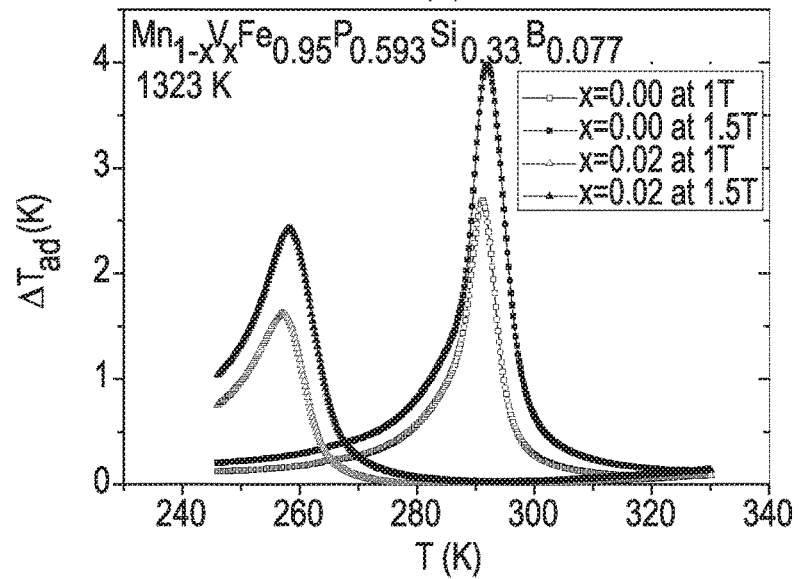
Figure 8C:
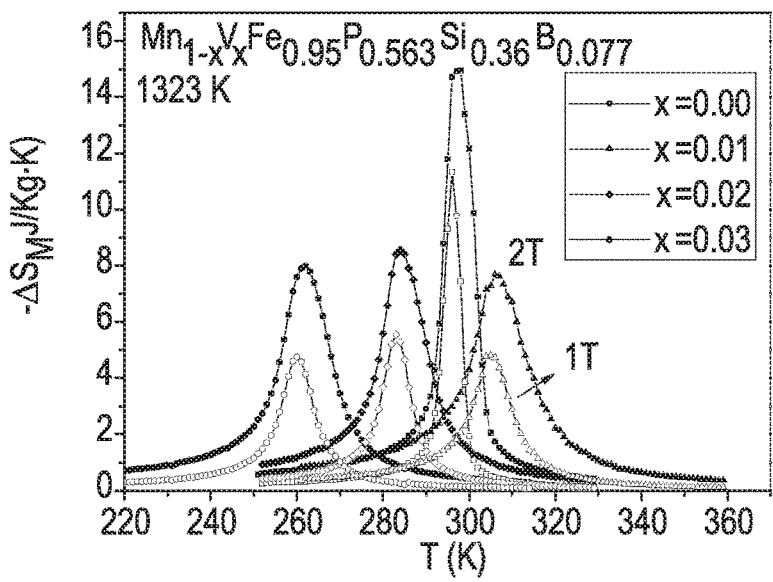
Figure 8D:
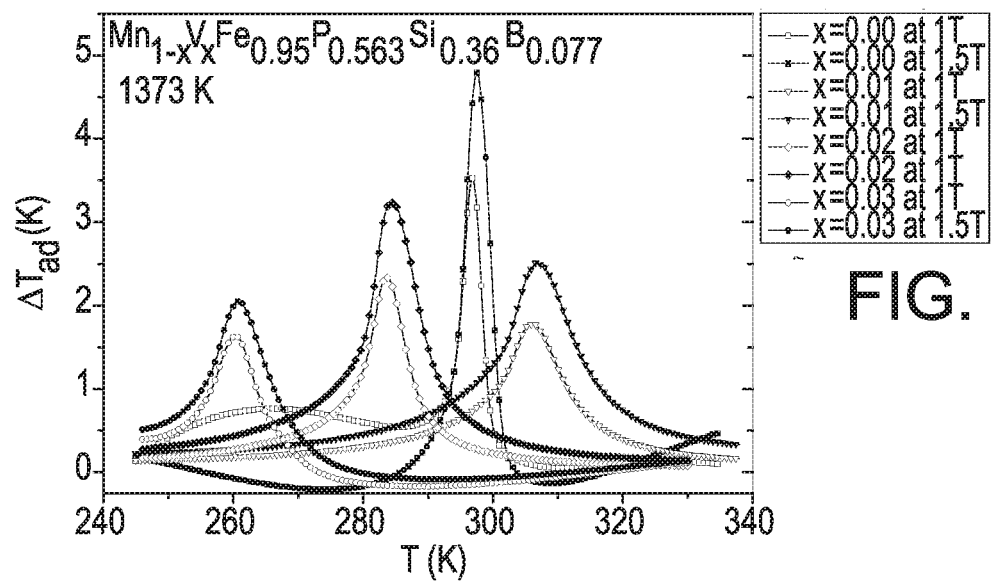
Figure 8E:
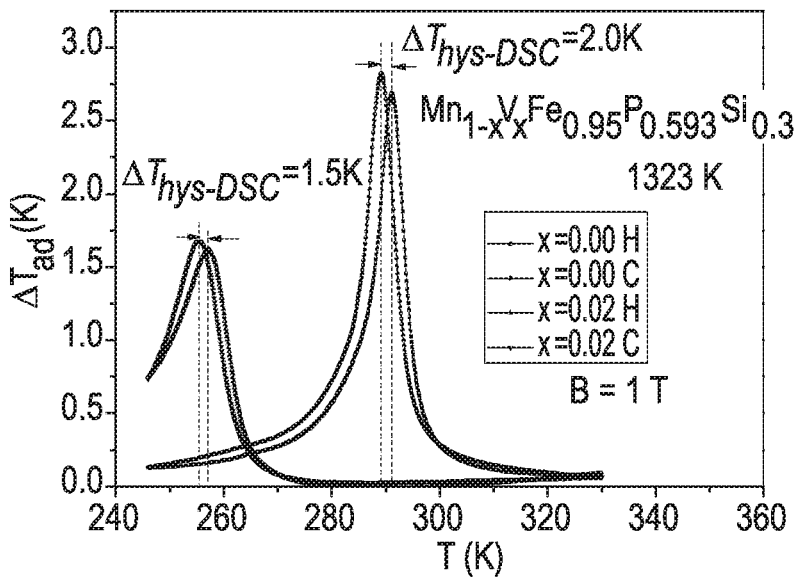
Figure 8F:
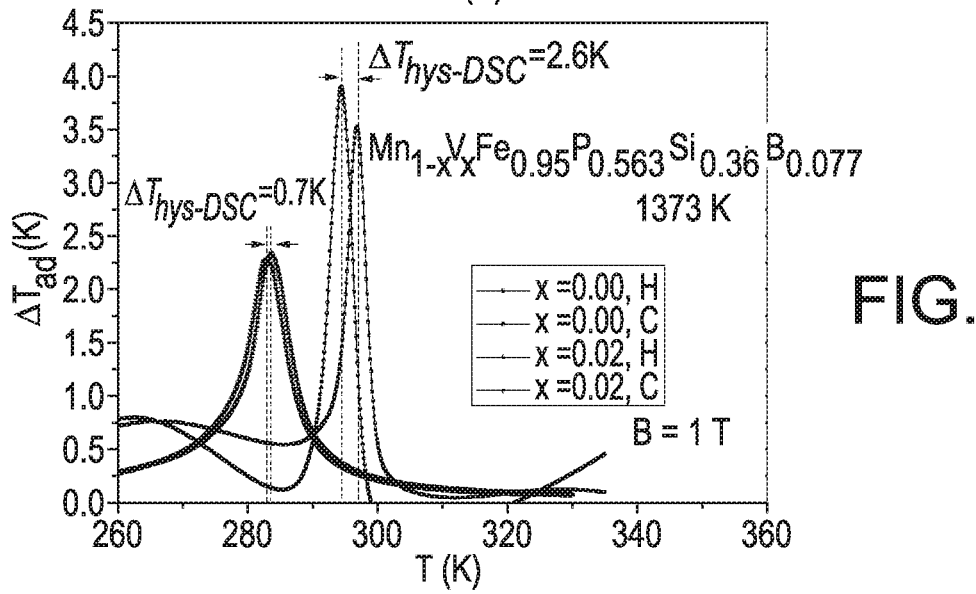
Figure 9A:
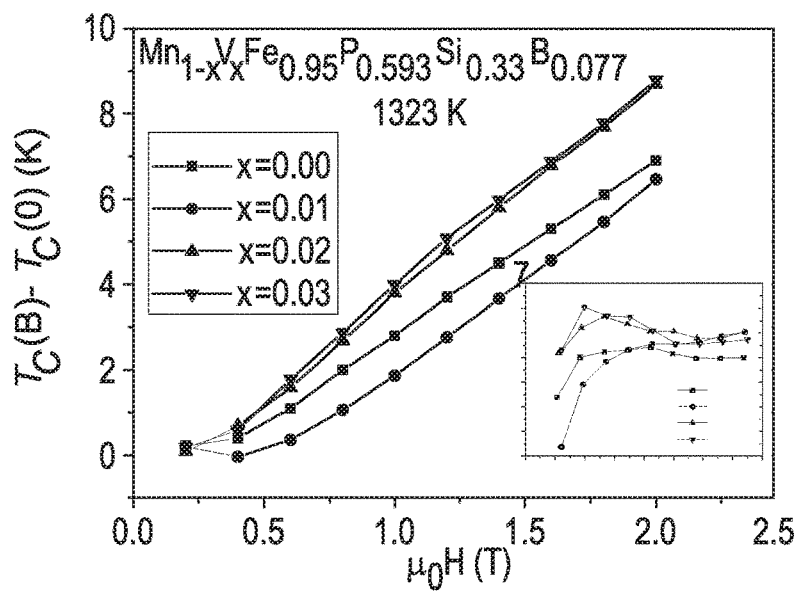
Figure 9B:
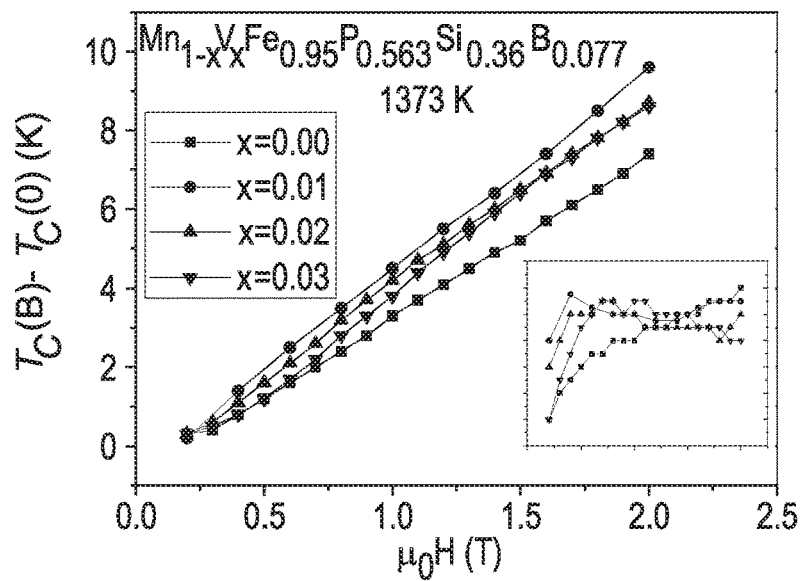
Figure 9C:
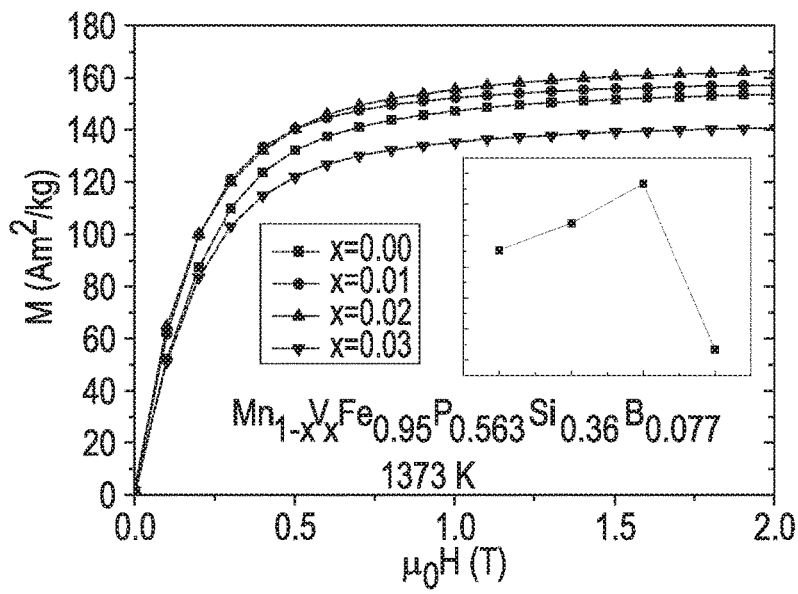
Figure 10A:
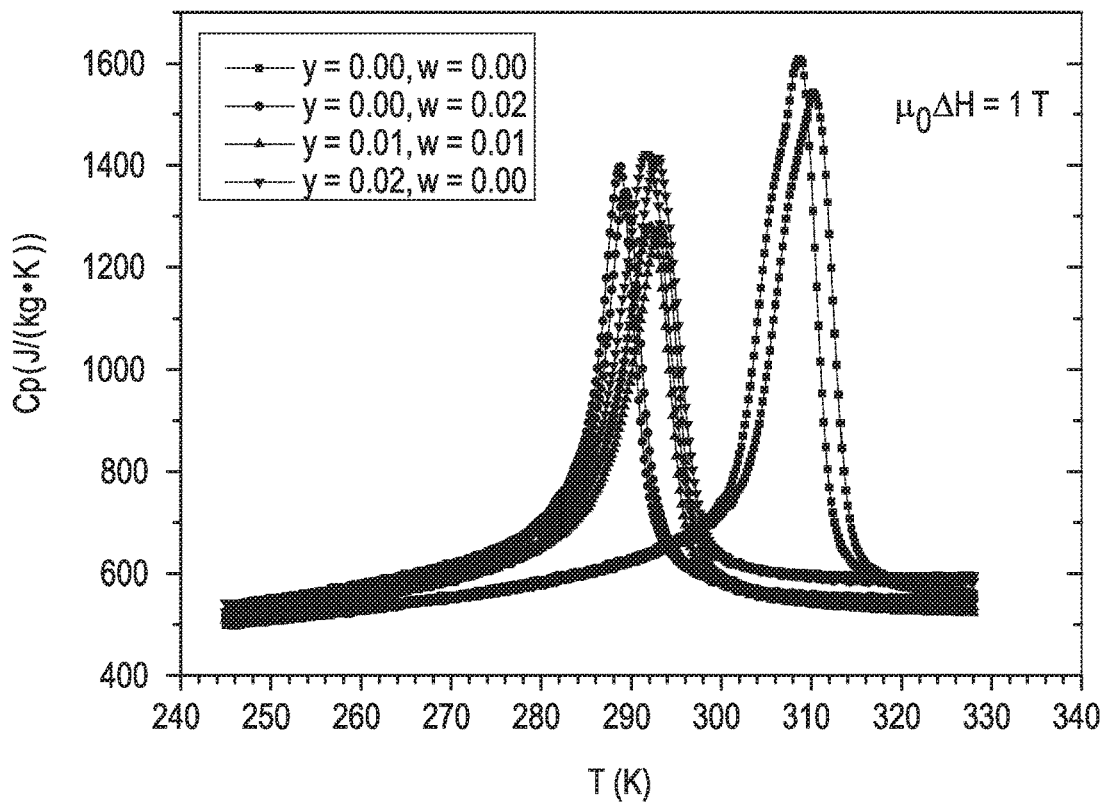
Figure 10B:
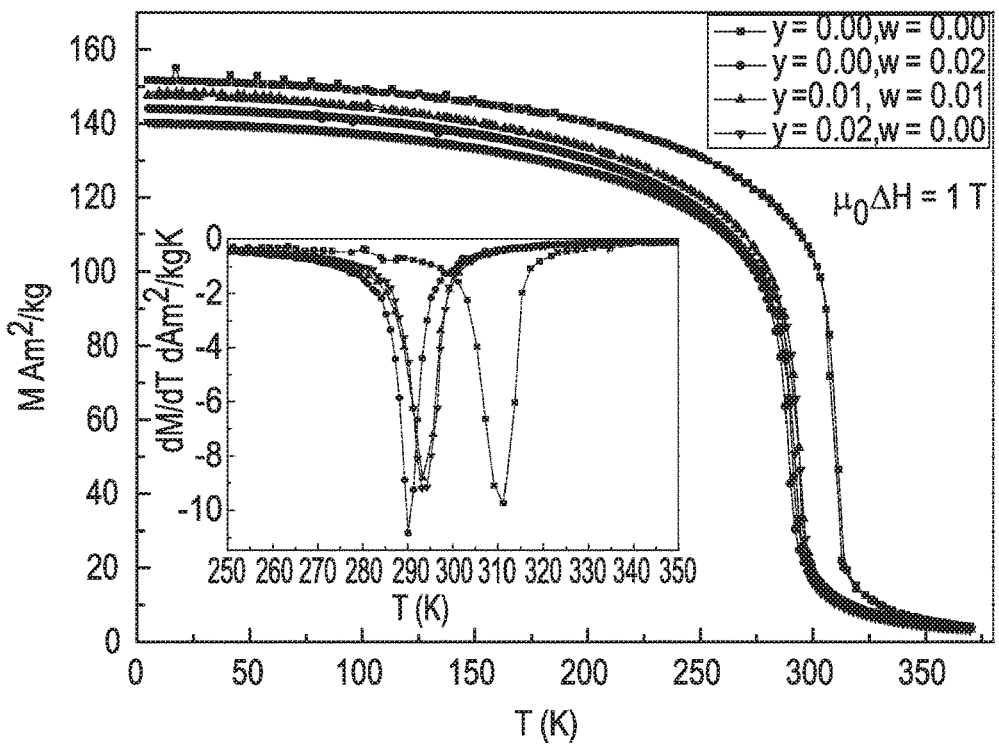
Figure 10C:
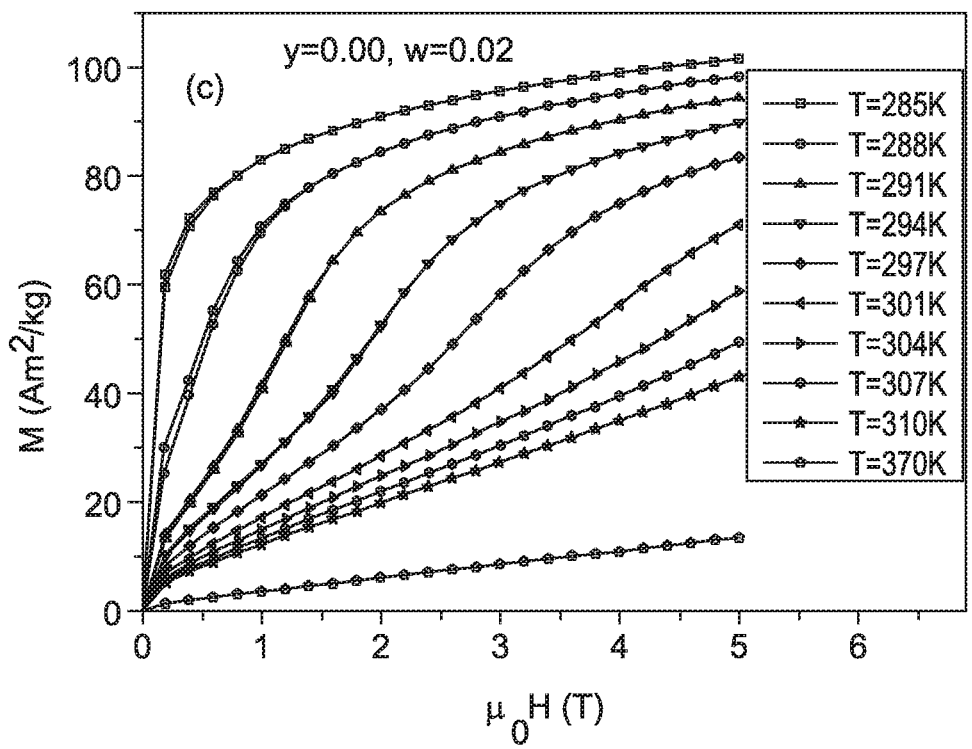
Figure 10D:
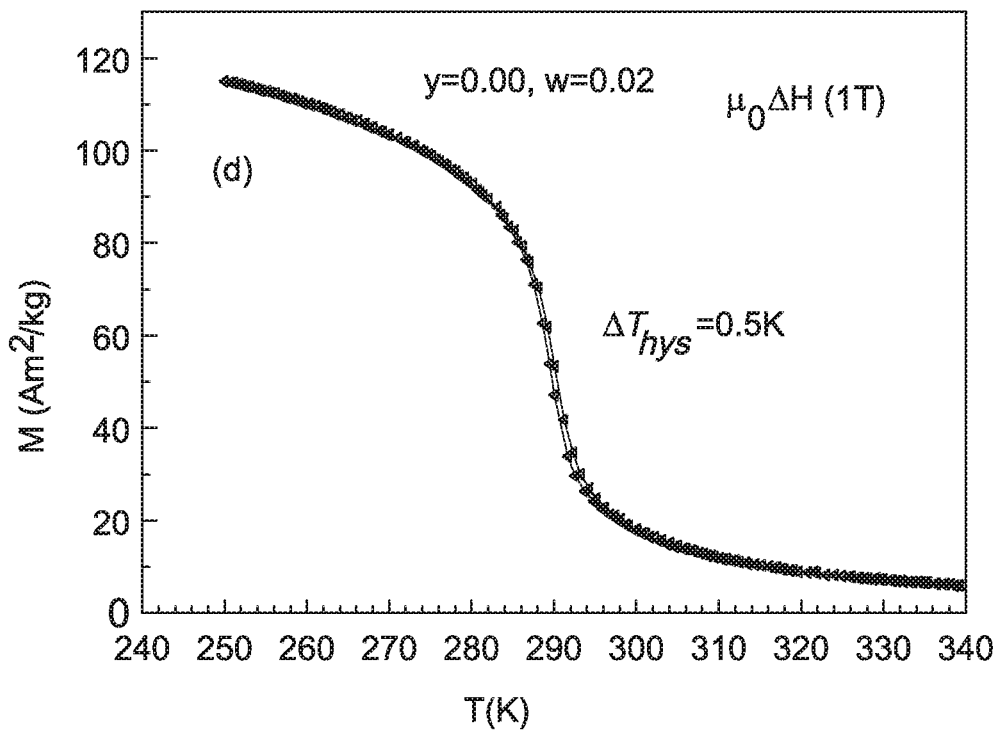
Figure 11A:
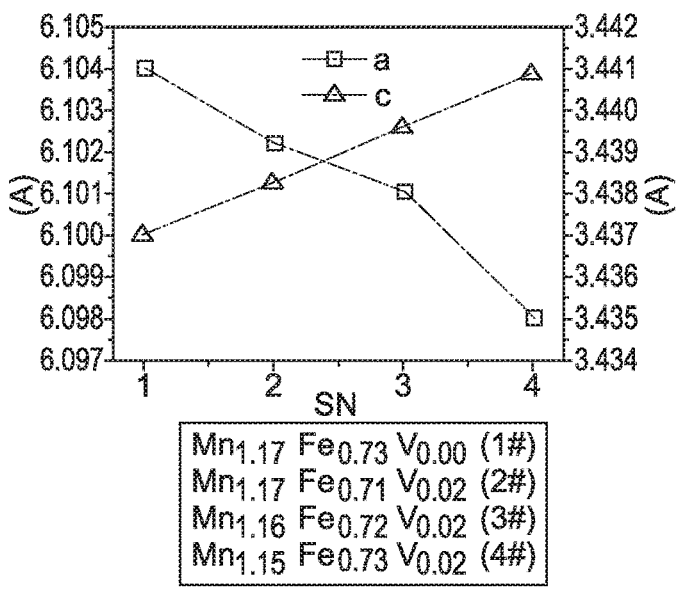
Figure 11B:
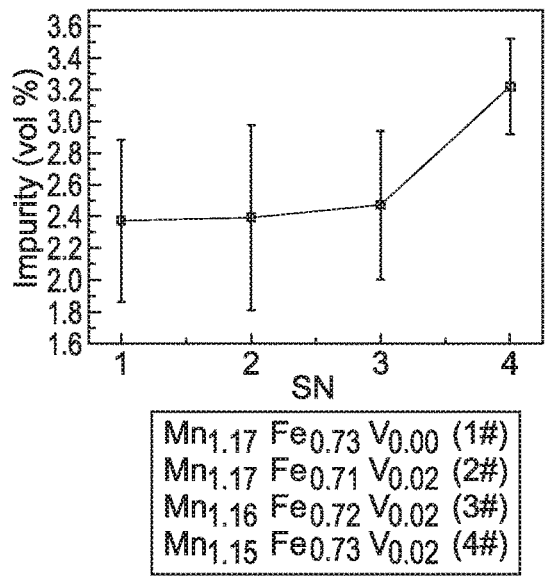
Figure 11C:
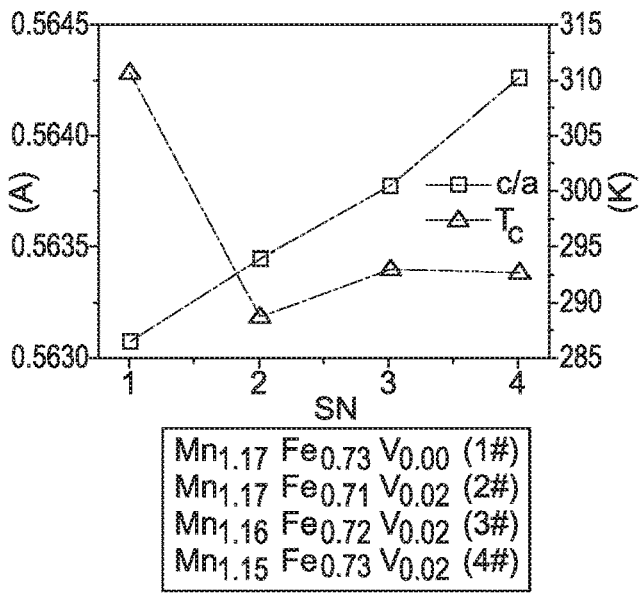
Figure 11D:
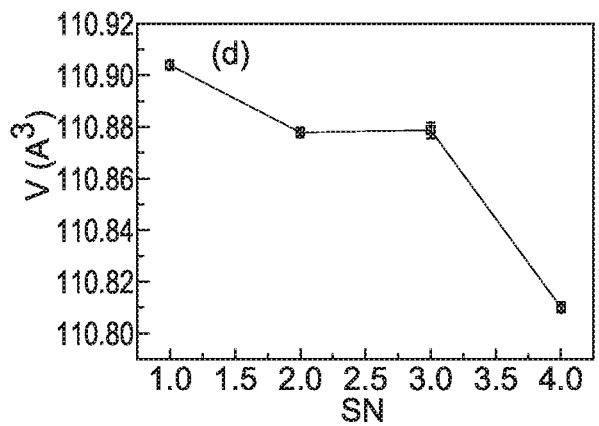
Figure 11E:
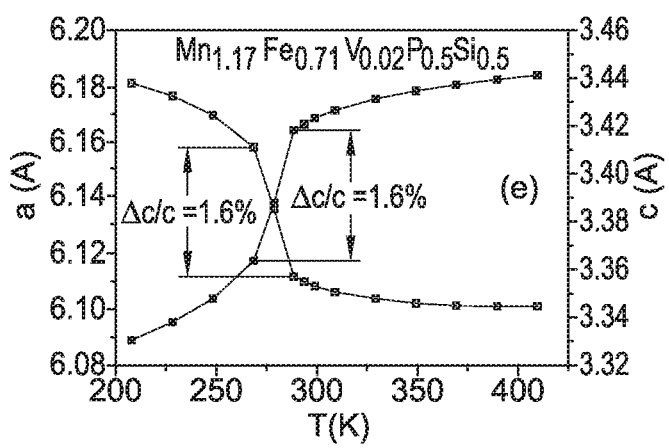
Figure 11F:
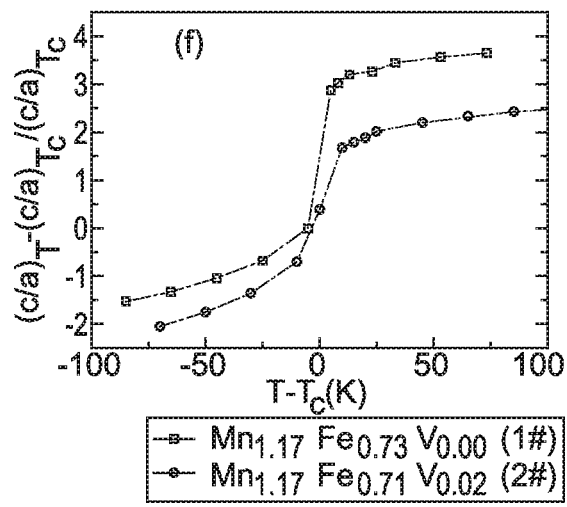
Figure 12A:
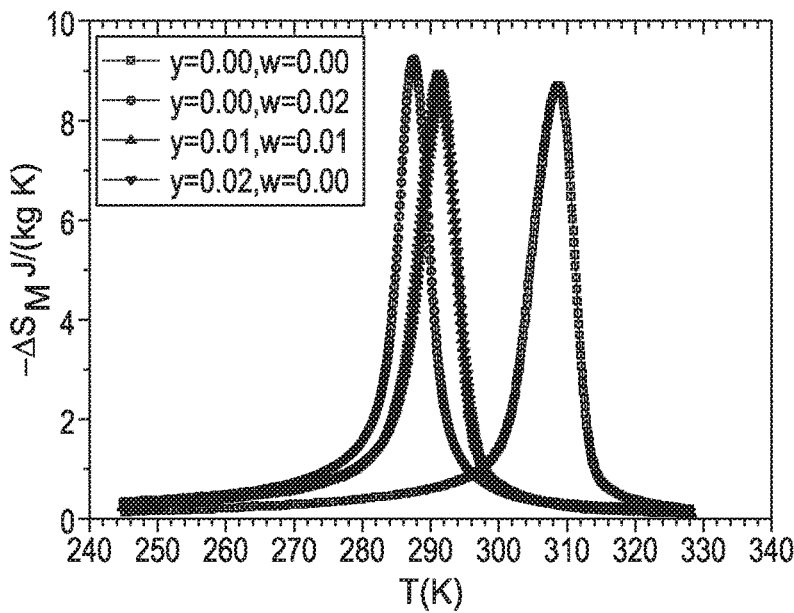
Figure 12B:
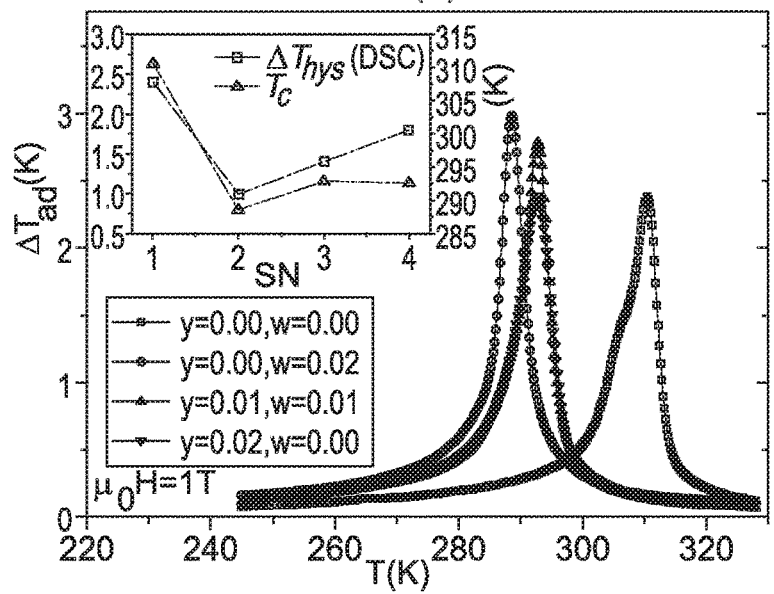
Figure 12C:
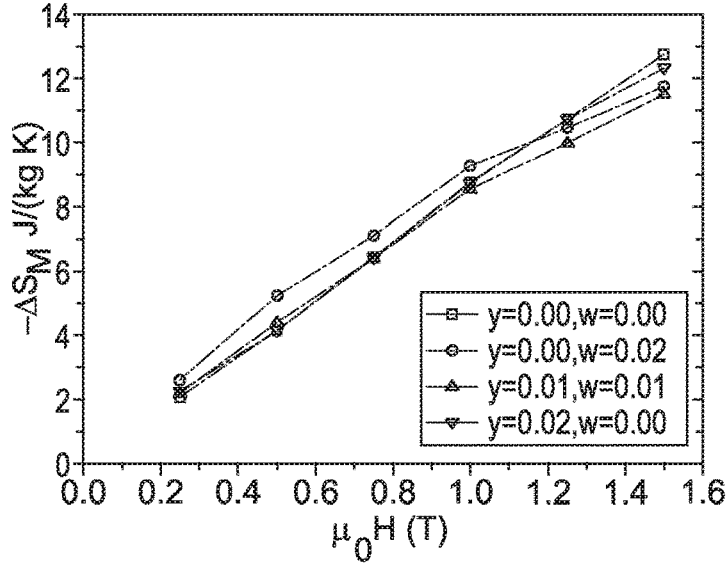
Figure 12D:
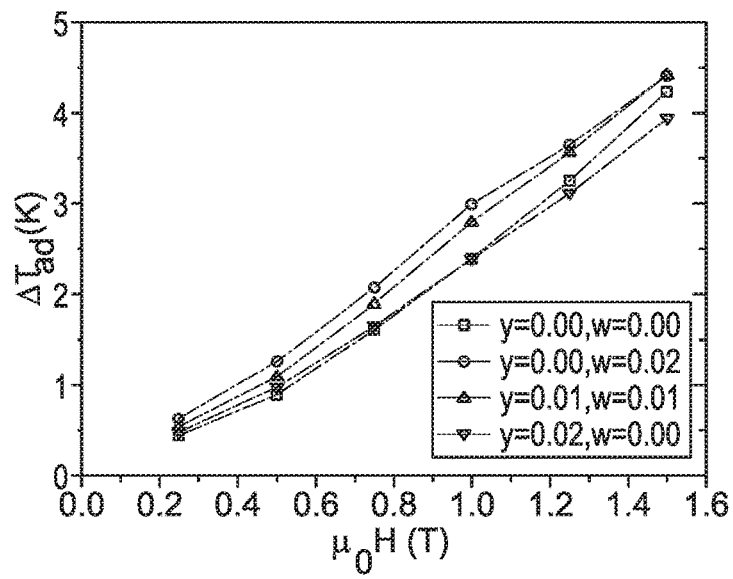
Figure 12E:
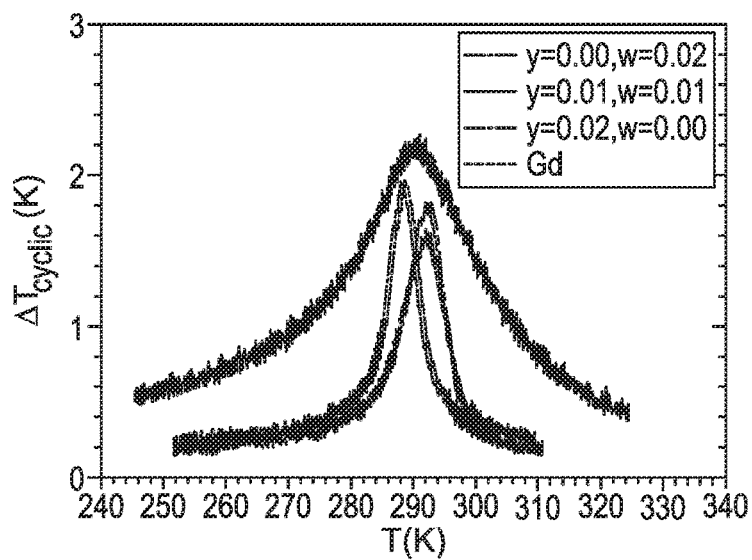
Figure 12F:
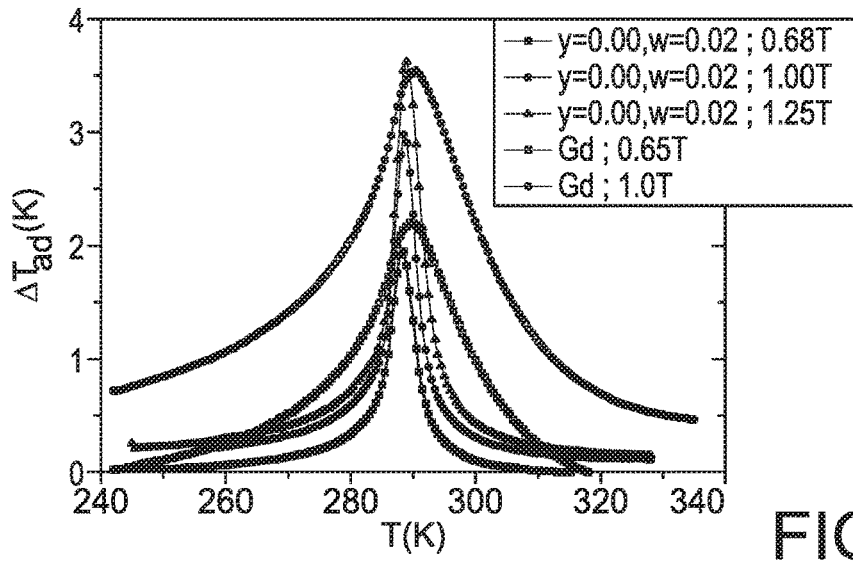
Figure 13:
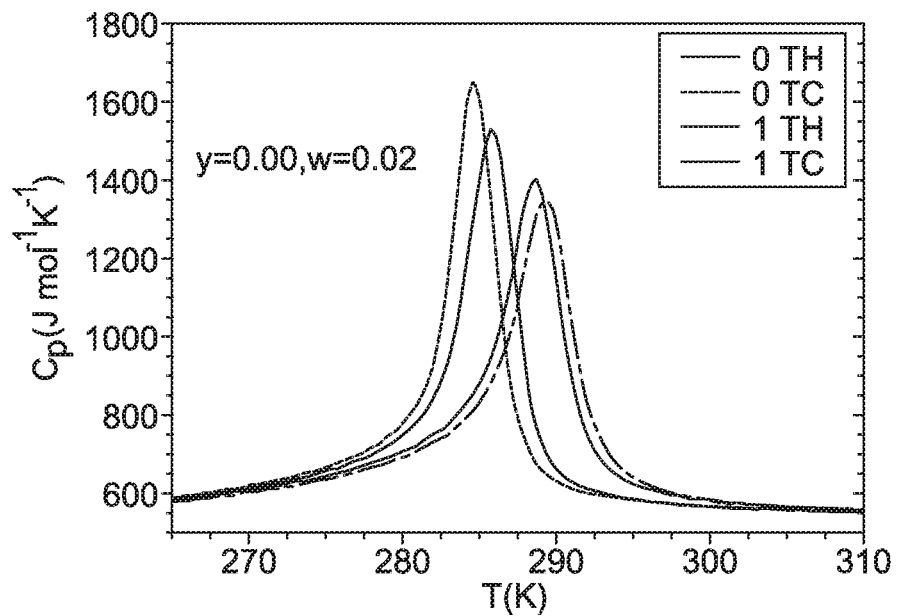
Figure 14:
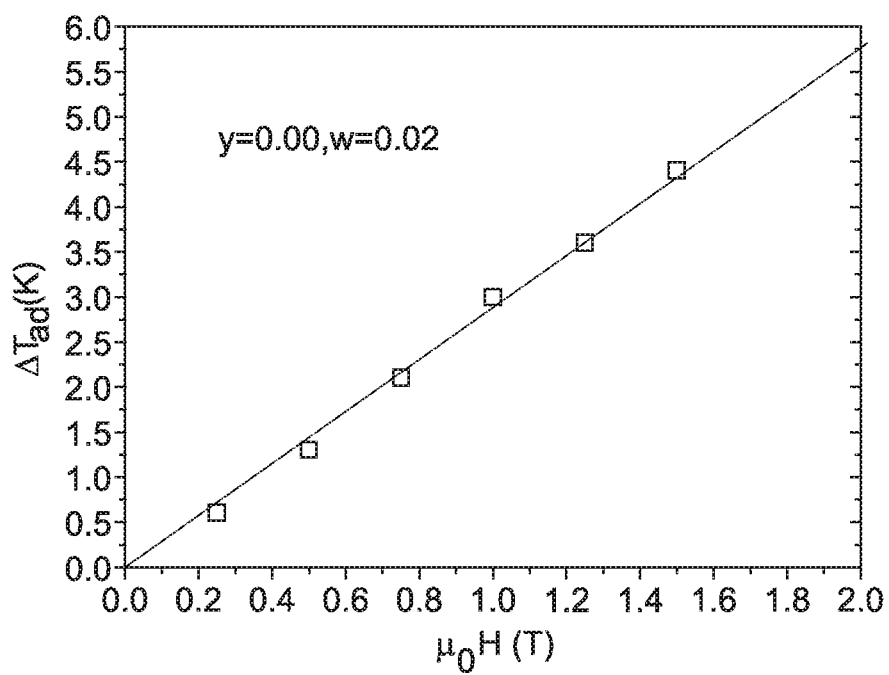
Figure 15:
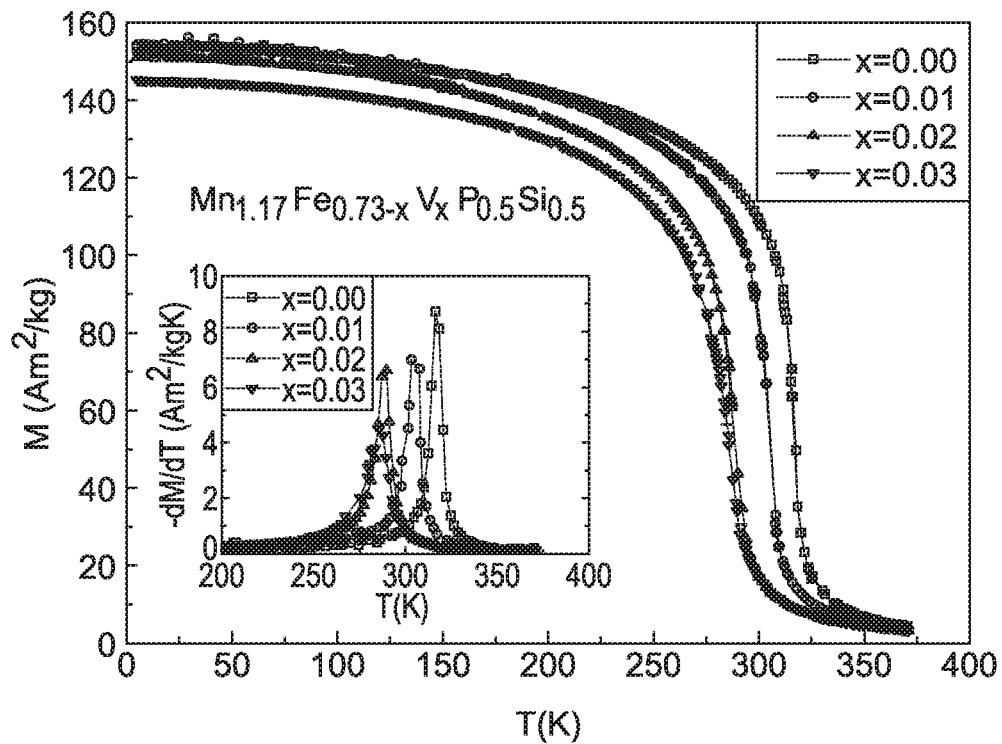
Figure 16:
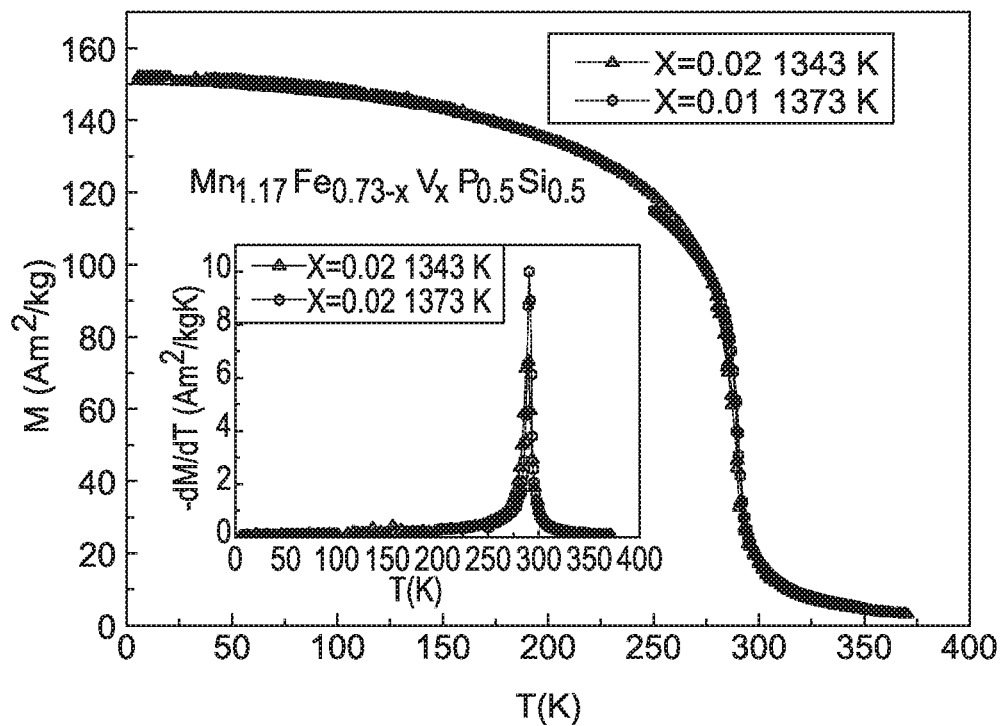
Figure 17A:
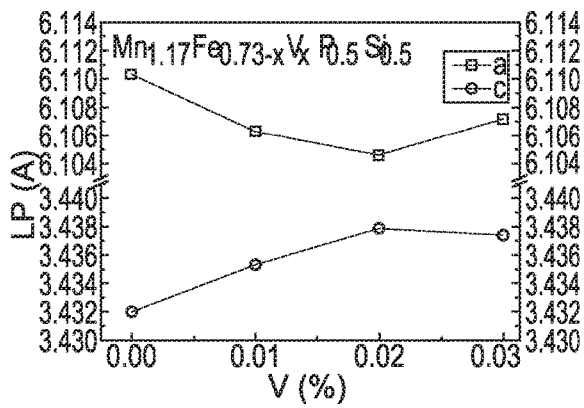
Figure 17B:
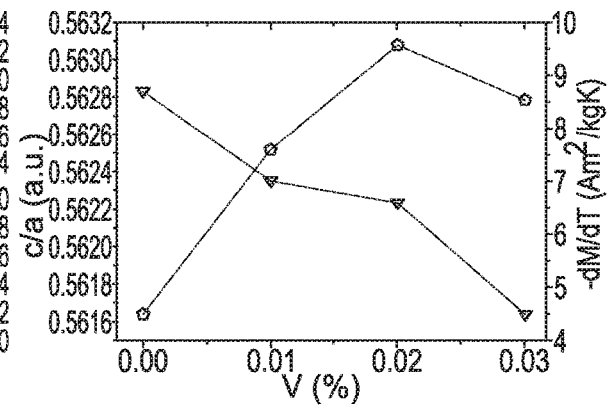
Figure 17C:
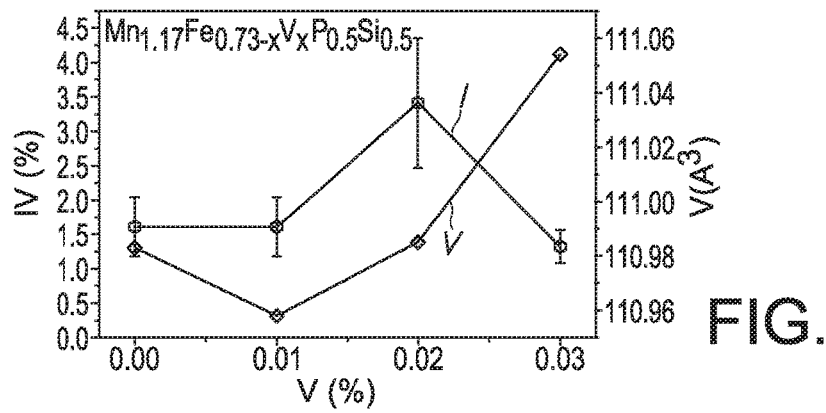
Figure 18:
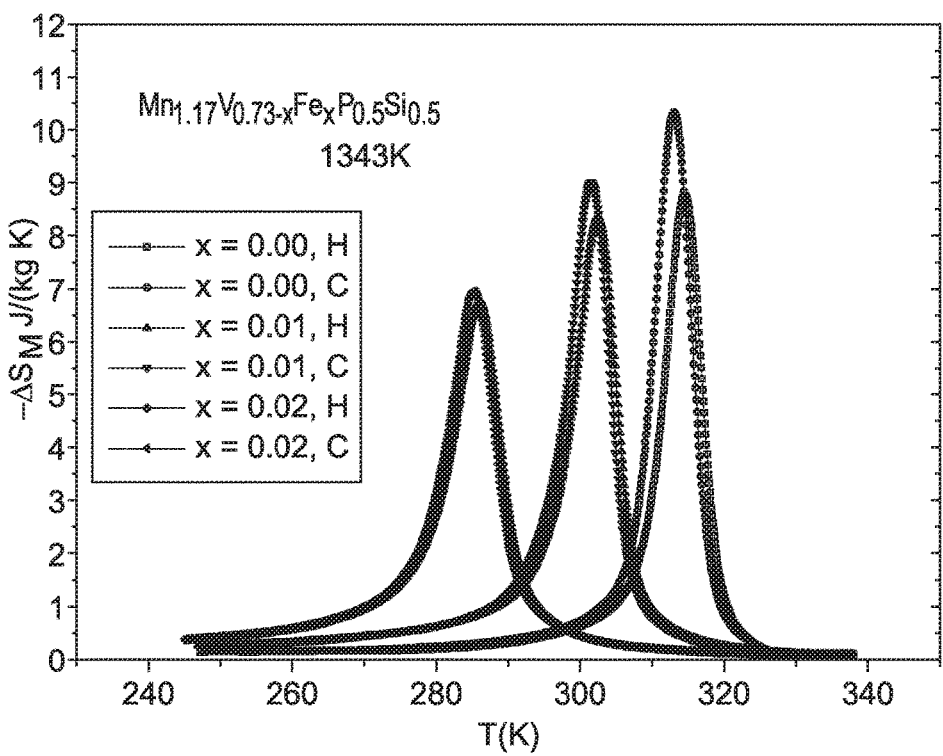
Figure 19:
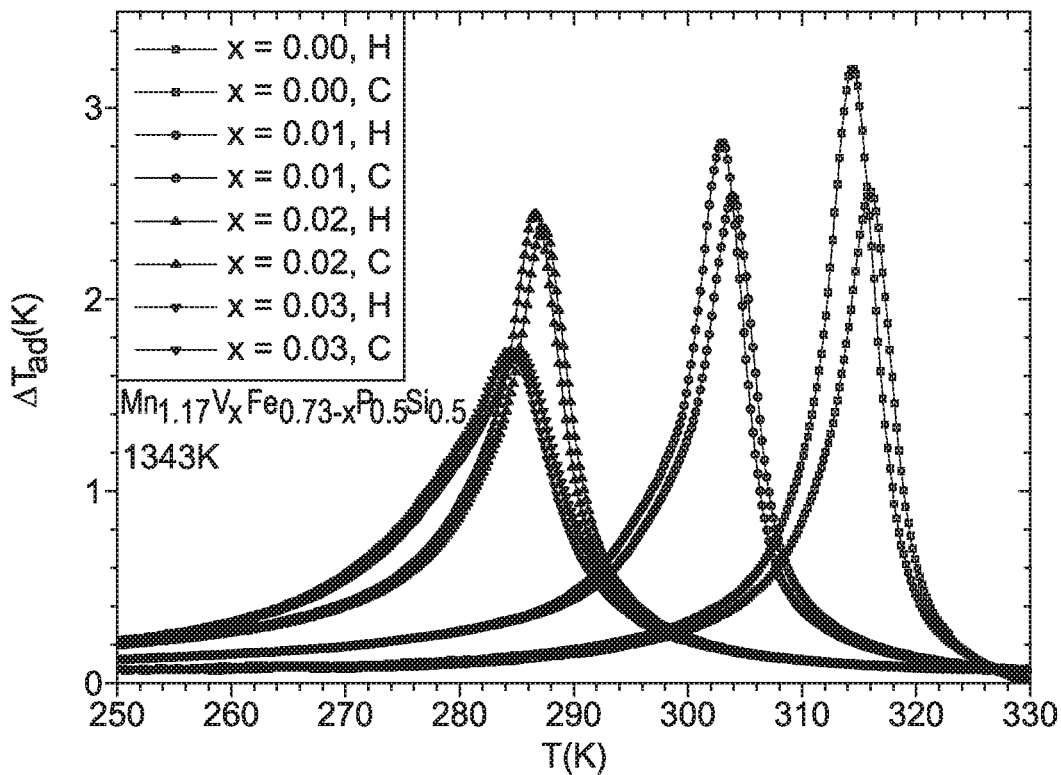
Figure 20:
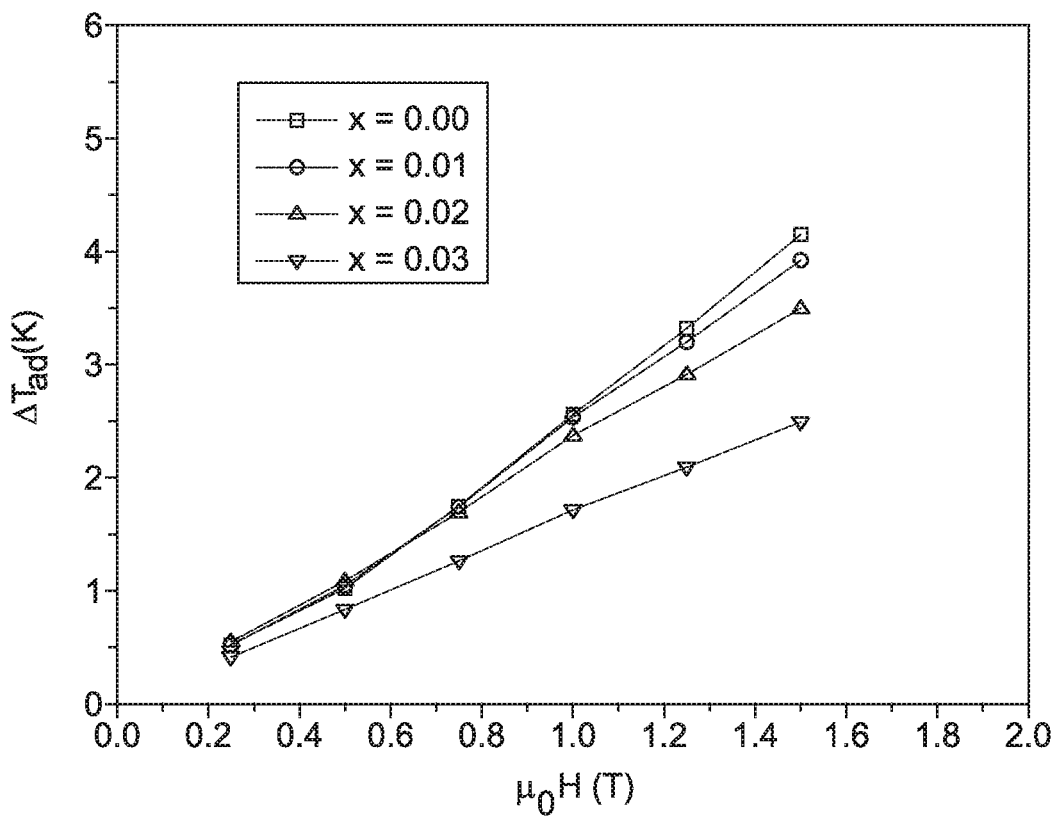
Figure 21:
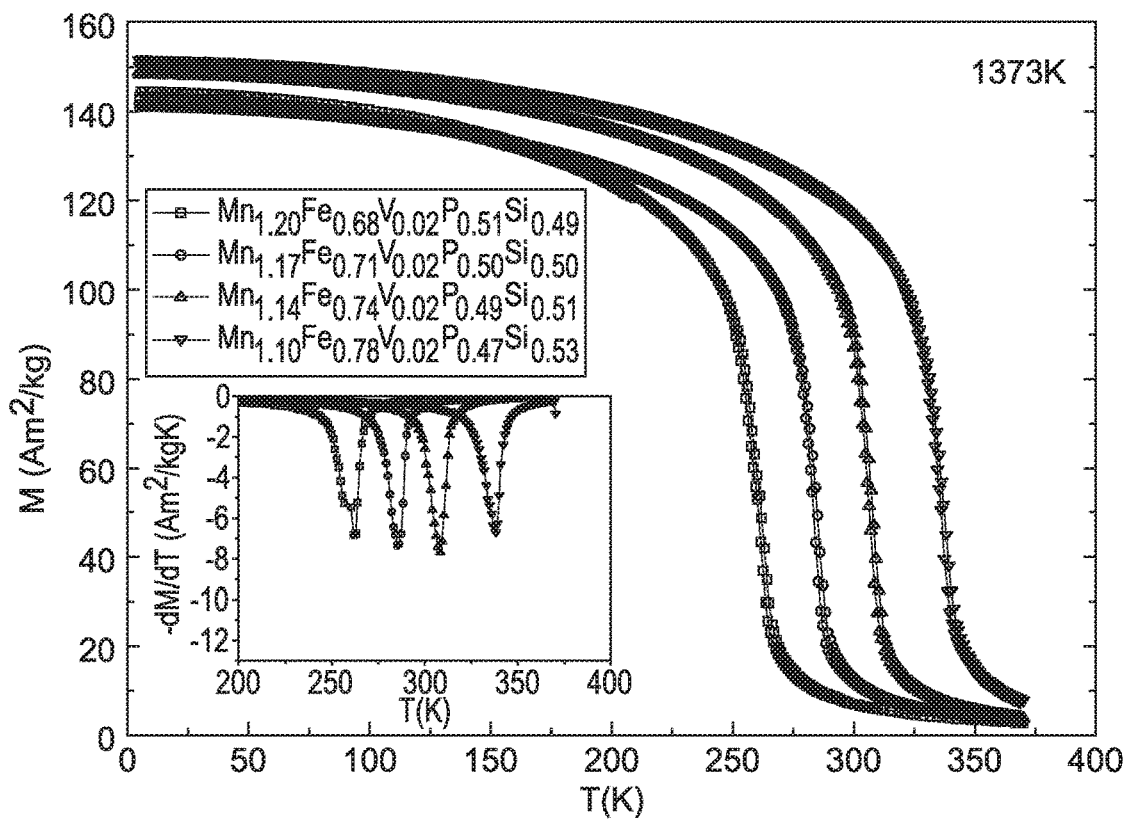
Figure 22:
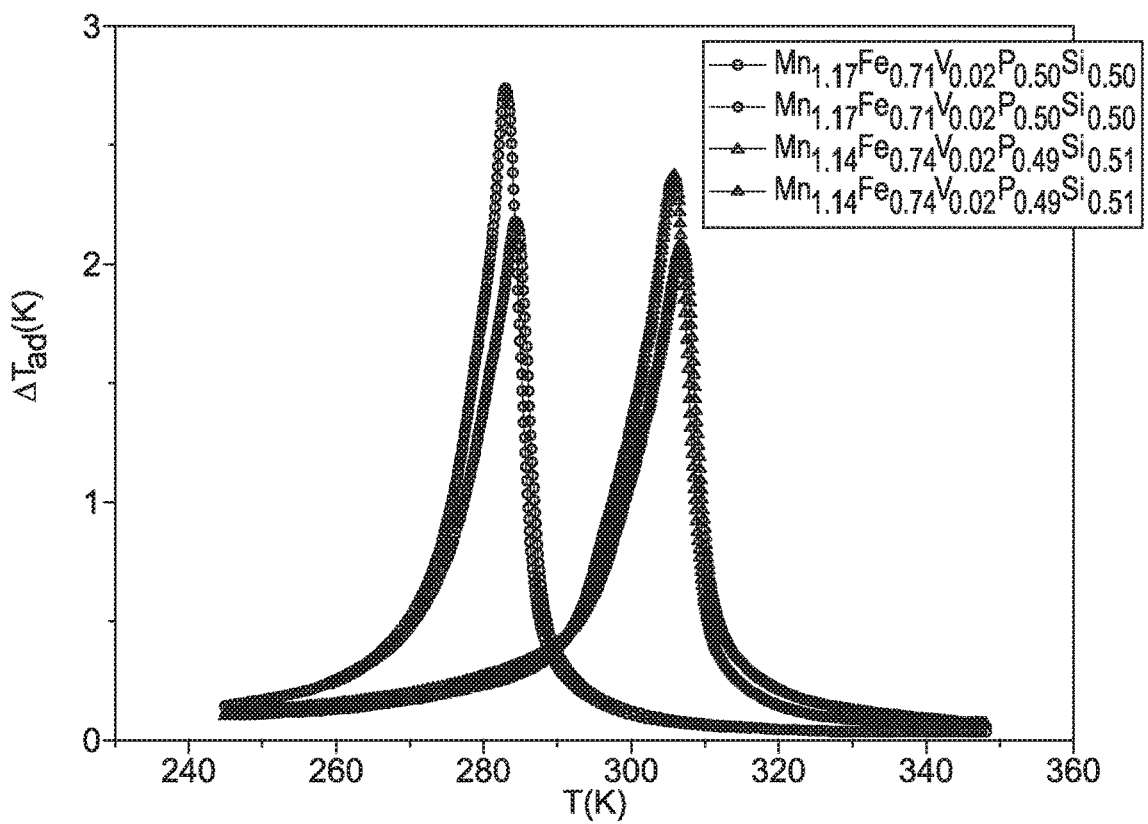
Figure 23:
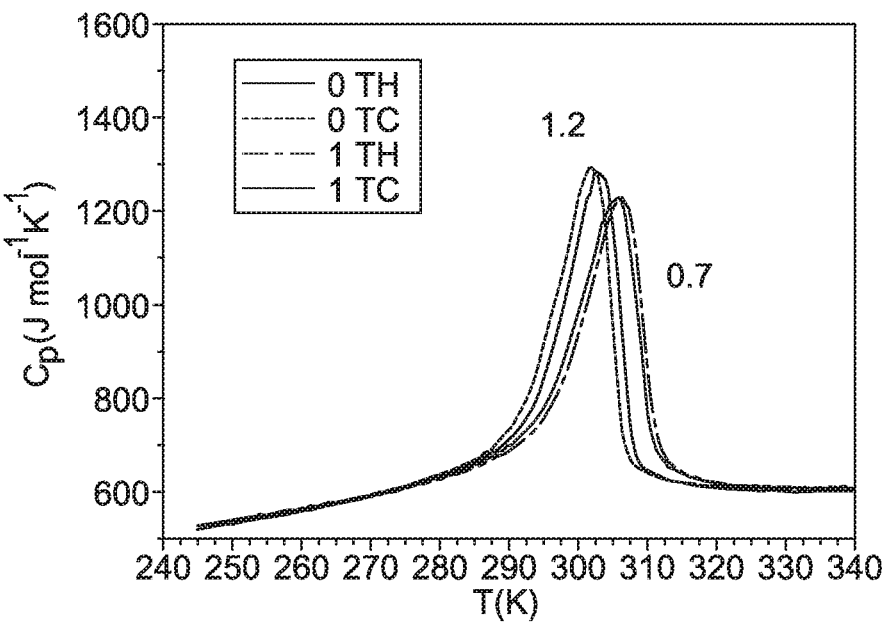
Figure 24:
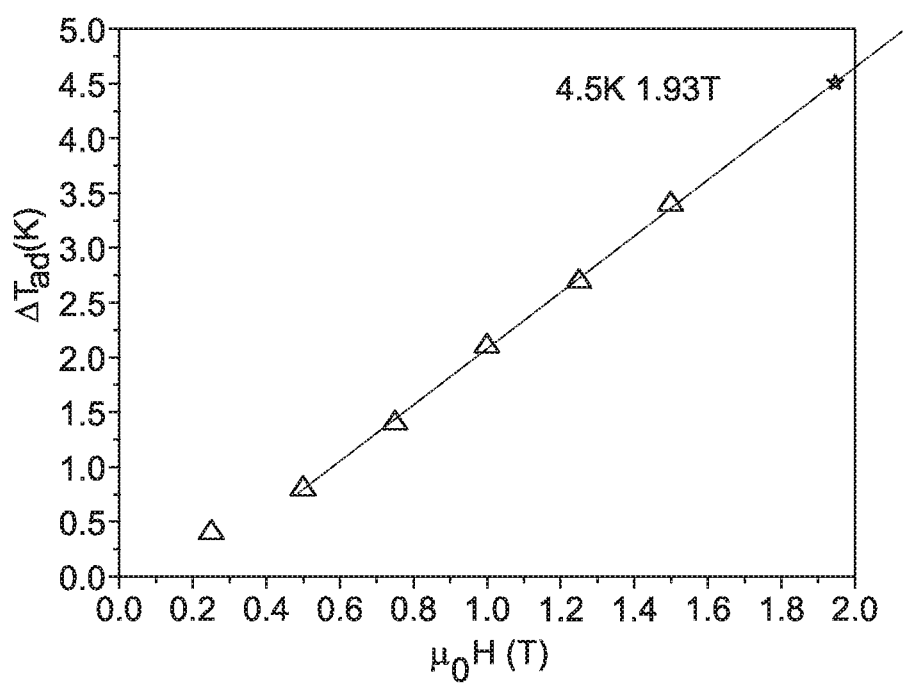
Figure 25:
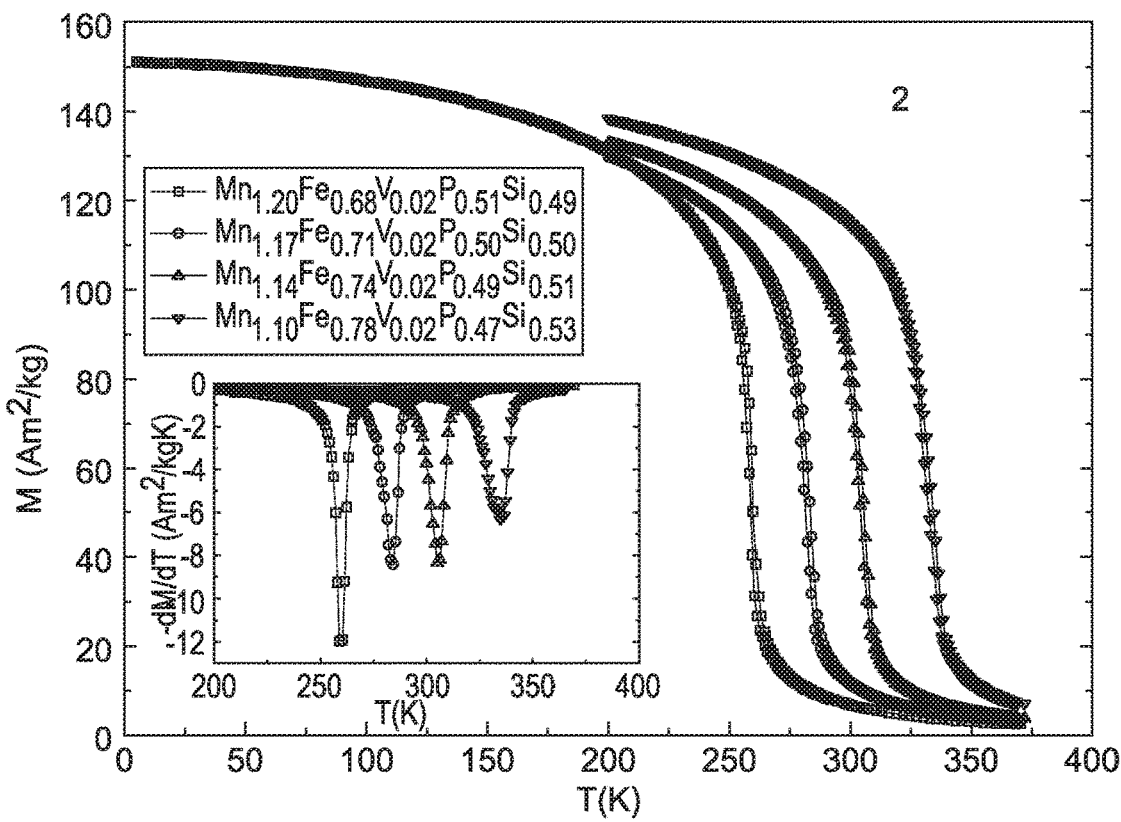
Figure 26:
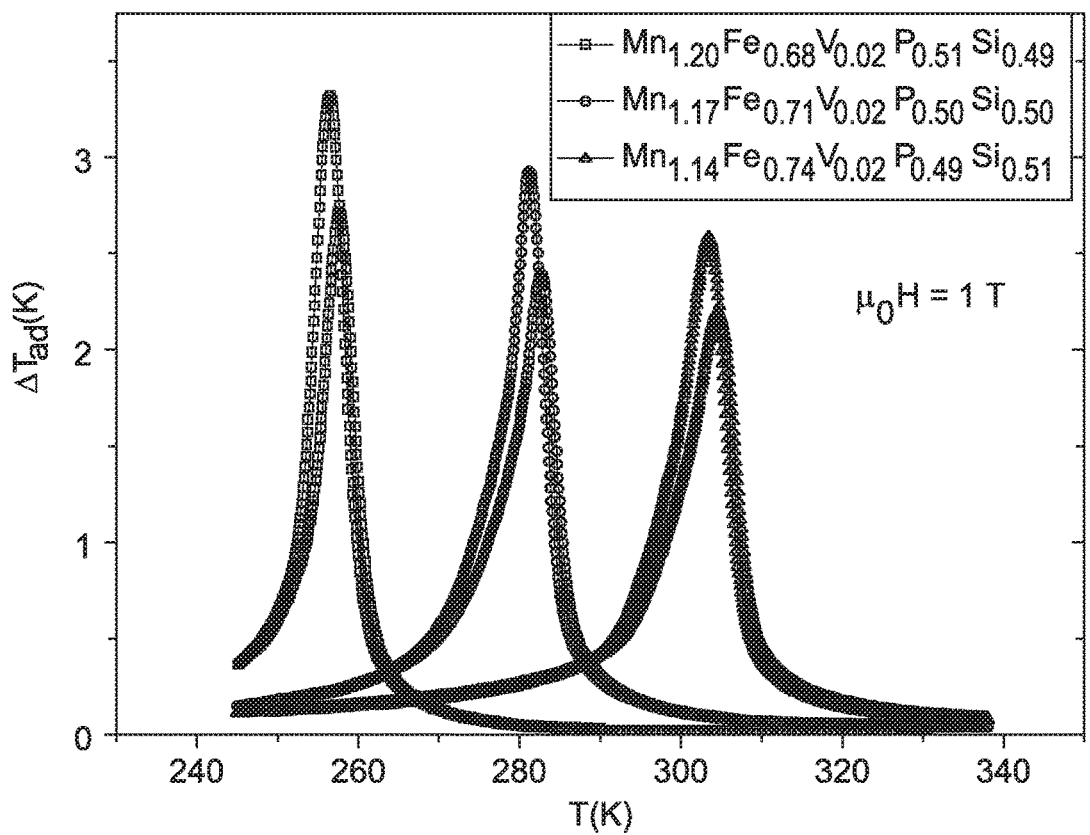
Figure 27:
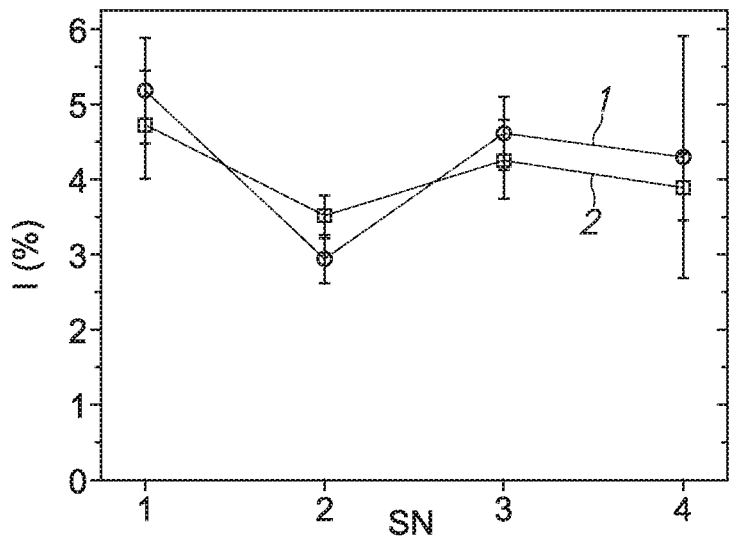
Figure 28:
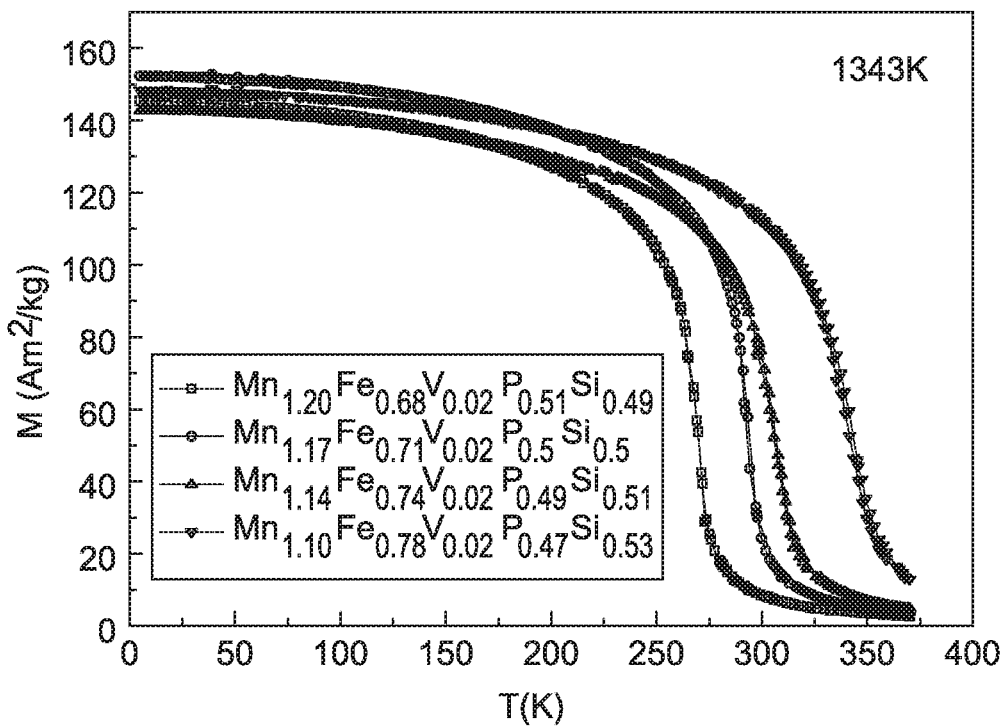
Figure 29A:
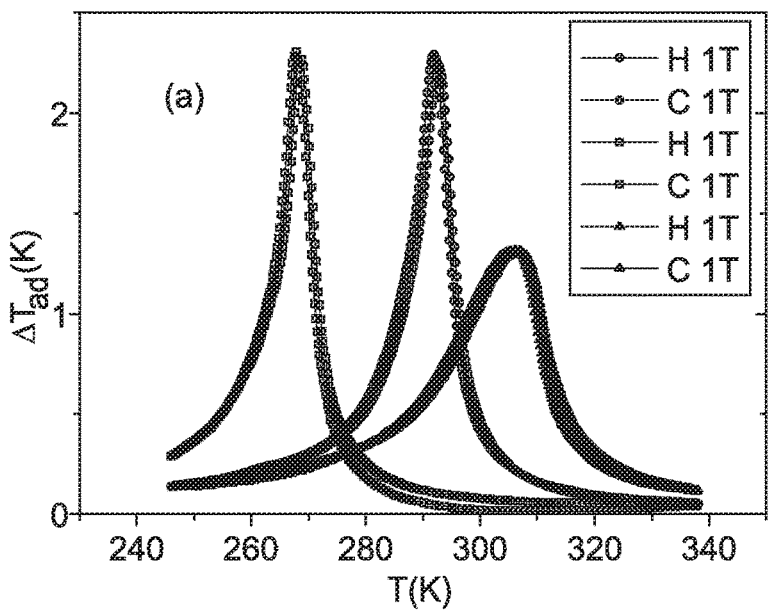
Figure 29B:
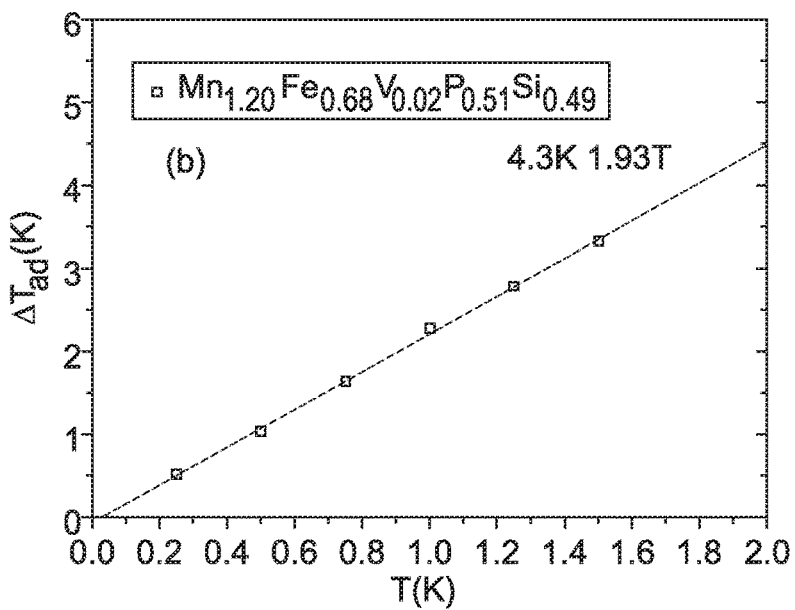
Figure 30:
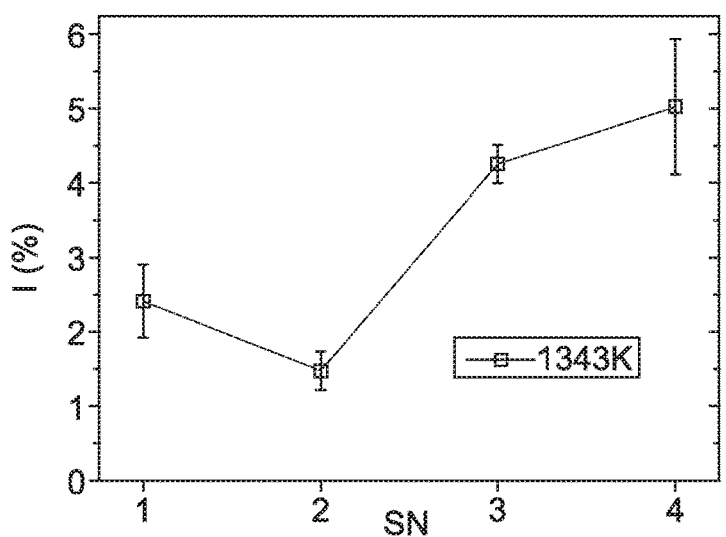
Figure 31:
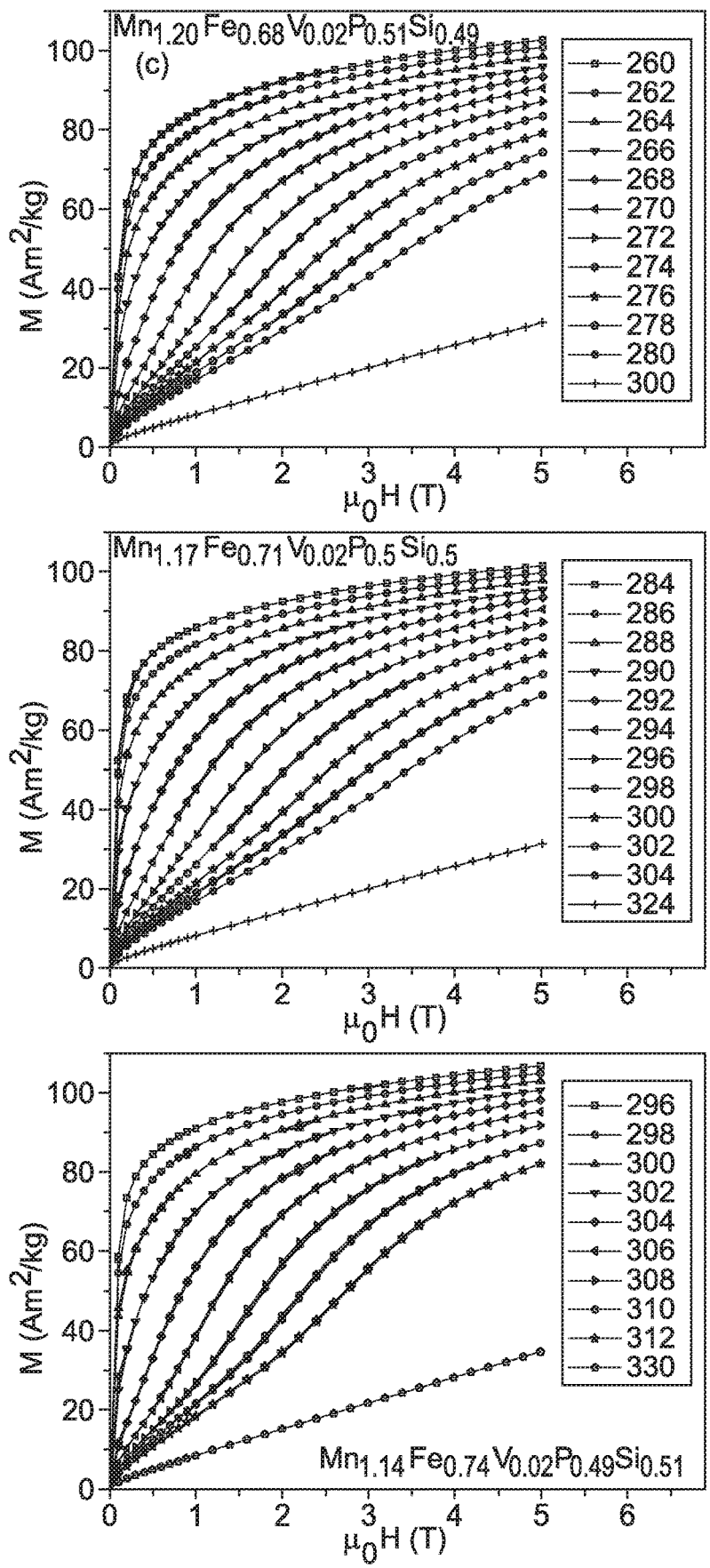

The annealing temperatures are indicated in the Figures; this also applies to the following figures;

FIG. 2: Relationship between the lattice parameters a and c, c a, and the phase fraction of impurity and the V content of $Mn_{1.2-x}V_xFe_{0.75}P_{0.5}Si_{0.5}$ (x=0.00, 0.01, 0.02, 0.03, 0.04, 0.05) alloys after annealing at 1323, 1373 and 1423K;

FIG. 3: (a) Neutron diffraction patterns and the refinement result of the $Mn_{1.18}V_{0.02}Fe_{0.75}P_{0.5}Si_{0.5}$ alloy annealed at 1373 K; on the y-axis the intensity (counts) is indicated with I(C); NDP indicates neutron diffraction pattern, FC indicates fullprof calculated (NDP and FC essentially overlap); BP indicates Bragg positions; D indicates difference between NDP and FC; (b) Interatomic distance (ID) as a function of annealing temperature ($T_a$ (in Kelvin)) for $Mn_{1.2}Fe_{0.75}P_{0.5}Si_{0.5}$ alloys and the one pointed out by arrow represents the $Mn_{1.18}V_{0.02}Fe_{0.75}P^{0.5}Si^{0.5}$ annealing at 1373 K;

FIG. 4: (a) Temperature dependence of $|\Delta S_M|$ for a field change of 0-1 T (open symbols) and 0-2 T (solid symbols) for $Mn_{1.2-x}V_xFe_{0.75}P_{0.5}Si_{0.5}$ (x=0.00, 0.01, 0.02, 0.03, 0.04) alloys after annealing at 1323 K; (b) Temperature dependence of $|\Delta S_M|$ for a field change of 0-1 T (open symbols) and 0-2 T (solid symbols) for $Mn_{1.2-x}V_xFe_{0.75}P_{0.5}Si_{0.5}$ (x=0.00, 0.01, 0.02, 0.03) alloys after annealing at 1373 K; (c) Temperature dependence of $|\Delta S_M|$ for a field change of 0-1 T (open symbols) and 0-2 T (solid symbols) for $Mn_{1.2-x}V_xFe_{0.75}P_{0.5}Si_{0.5}$ (x=0.00, 0.01, 0.02, 0.03, 0.05) alloys after annealing at 1423 K;

FIG. 5: (a) Temperature dependence of $\Delta T_{ad}$ (adiabatic temperature change) for $Mn_{1.2-x}V_xFe_{0.75}P_{0.5}Si_{0.5}$ (x=0.00, 0.01, 0.02) alloys annealed at 1323 K; (b) Temperature dependence of $\Delta T_{ad}$ for $Mn_{1.2-x}V_xFe_{0.75}P_{0.5}Si_{0.5}$ (x=0.00, 0.01, 0.02) alloys annealed at 1373 K. The solid, half-solid and open symbols represents the applied field of 1.5 and 1.0 T, respectively;

FIG. 6: (a) Lattice parameters of the a and c axis for series A and (b) c/a ratio and $T_C$ for series A; (c) Lattice parameters of the a and c axis for series B and (d) c a ratio and $T_C$ for series B; (e) Fraction (F; in volume %) of the second phase in series A and B; (f) Unit cell volume of series A and B;

FIG. 7: (a) Temperature dependence of the magnetization in series A under an applied magnetic field of 1 T; (b) Temperature dependence of the magnetization in series B under an applied magnetic field of 1 T;

FIG. 8: (a) Temperature dependence of $|\Delta S_M|$ under a field change of 0-1.0 T (open symbols) and 0-2.0 T (filled symbols) for series A; (b) Temperature dependence of $\Delta T_{ad}$ under a field change of 0-1.0 T (open symbols) and 0-1.5 T (filled symbols) for series A; (c) Temperature dependence of $|\Delta S_M|$ under a field change of 0-1.0 T (open symbols) and 0-2.0 T (filled symbols) for series B; (d) Temperature dependence of $\Delta T_{ad}$ under a field change of 01.0 T (open symbols) and 0-1.5 T (filled symbols) for series B; (e) Partial temperature dependence of $\Delta T_{ad}$ under a field change of 0-1.0 T during heating (H) and cooling (C) for series A; (f) Partial temperature dependence of $\Delta T_{ad}$ under a field change of 0-1.0 T during heating and cooling for series B;

FIG. 9: Field dependence of $T_C$ and $dT_C/dB$ (insets) for series A (a) and series B (b); (c) The magnetization as a function of the V content for series A measured at a temperature of 5 K. The insets are the magnetic moment per formula unit ($\mu_{f.u.}$) dependence of the V content for series B;

FIG. 10: (a) Latent heat under a magnetic field of 1 T and (b) magnetizations as a function of temperature for $(Mn_{0.6-y}Fe_{0.4-w})_{1.90}V_{0.02}P_{0.5}Si_{0.5}$ (y+w=0.02) (1#-4#) alloys; (c) magnetizations as a function of the external magnetic field and (d) magnetizations as a function of temperature for $Mn_{1.17}Fe_{0.71}V_{0.02}P_{0.5}Si_{0.5}$ (2#);

FIG. 11: The values of lattice parameters a and c (a), the fraction of impurity (b), c/a and $T_C$ (c), the volume of the crystal unit cell (d) for the $(Mn_{0.6-y}Fe_{0.4-w})_{1.90}V_{0.02}P_{0.5}Si_{0.5}$ (1#-4#) alloys. (e) The in-situ lattice parameter dependence of temperature for the sample of 2#. (f) Evolution of the (c/a) ratio of the cell parameters as a function of the temperature for 2#. The data are normalized in respect to the value at the transition temperature $T_C$. The measurements were performed upon warming. SN indicates: sample number;

FIG. 12: Temperature dependence of $|\Delta S_M|$ (a) and temperature dependence of $\Delta T_{ad}$ (b) for a field change of 1 T calculated from in field DSC measurement for the $(Mn_{0.6-y}Fe_{0.4-w})_{1.90}V_{0.02}P_{0.5}Si_{0.5}$ (1#-4#) alloys. (c) and (d) shows their field dependence of $|\Delta S_M|$ and $\Delta T_{ad}$, respectively. (e) shows their temperature dependence of $\Delta T_{cyclic}$ and (f) gives the temperature dependence of $\Delta T_{cyclic}$ of 2# and Gd under different external magnetic field (which are 0.68, 1.00, 1.25, 0.65, and 1.0 Tesla, respectively);

FIG. 13: The DSC curves of $(Mn_{0.6-y}Fe_{0.4-w})_{1.90}V_{0.02}P_{0.5}Si_{0.5}$ (y=0.00, w=0.02) under a magnetic field of 0 and 1T during heating (H) and cooling (C);

FIG. 14: The $\Delta T_{ad}$ of $(Mn_{0.6-y}Fe_{0.4-w})_{1.90}V_{0.02}P_{0.5}Si_{0.5}$ (y=0.00, w=0.02) under different applied magnetic field. The extrapolated value of $\Delta T_{ad}$ under 1.93 T is 5.6 K;

FIG. 15: Magnetization as a function of temperature for $Mn_{1.17}Fe_{0.72-x}V_xP_{0.5}Si_{0.5}$ alloys;

FIG. 16: Magnetization as a function of temperature for $Mn_{1.17}Fe_{0.72-x}V_xP_{0.5}Si_{0.5}$ alloys annealed at 1343 and 1373 K;

FIG. 17: The values of lattice parameters (LP) a and c (a), c/a and dM/dT (b) (V % indicates V content (at %)); the fraction of impurity (I) and the volume (V) of the crystal unit cell (c) for $Mn_{1.17}Fe_{0.72-x}V_xP_{0.5}Si_{0.5}$ alloys; IV indicates (IV: impurity volume (vol. %));

FIG. 18: Temperature dependence of $|\Delta S_M|$ for a magnetic field change of 1 T calculated from in field DSC measurement for $Mn_{1.17}Fe_{0.72-x}V_xP_{0.5}Si_{0.5}$ alloys; herein H indicates heating and C indicates cooling;

FIG. 19: Temperature dependence of $\Delta T_{ad}$ for a magnetic field change of 1 T calculated from in field DSC measurement for $Mn_{1.17}Fe_{0.72-x}V_xP_{0.5}Si_{0.5}$ alloys; herein H indicates heating and C indicates cooling;

FIG. 20: Magnetic field dependence of $\Delta T_{ad}$ for magnetic field changes of 0-0.25 up to 0-1.5 T calculated from in field DSC measurement for $Mn_{1.17}Fe_{0.72-x}V_xP_{0.5}Si_{0.5}$ alloys;

FIG. 21: Magnetizations as a function of temperature for $(Mn, Fe)_{1.90}V_{0.02}(P, Si)$ alloys;

FIG. 22: Temperature dependence of $\Delta T_{ad}$ for a magnetic field change of 1 T calculated from in field DSC measurement for $(Mn, Fe)_{1.90}V_{0.02}(P, Si)$ alloys;

FIG. 23: The DSC curves of $Mn_{1.14}Fe_{0.74}V_{0.02}P_{0.49}Si_{0.51}$ under a magnetic field of 0 and 1T during heating (H) and cooling (C);

FIG. 24: The $\Delta T_{ad}$ of $Mn_{1.14}Fe_{0.74}V_{0.02}P_{0.49}Si_{0.51}$ under different applied magnetic field. The extrapolated value of $\Delta T_{ad}$ under 1.93 T is 4.5 K;

FIG. 25: Magnetizations as a function of temperature for $(Mn, Fe)_{1.90}V_{0.02}(P, Si)$ alloys prepared in the second series;

FIG. 26: Temperature dependence of $\Delta T_{ad}$ for a magnetic field change of 1 T calculated from in field DSC measurement for $(Mn, Fe)_{1.90}V_{0.02}(P, Si)$ alloys prepared in the second series;

FIG. 27: Fraction of impurity (I (%) indicates impurity (vol %) for $(Mn, Fe)_{1.90}V_{0.02}(P, Si)$ alloys prepared in the first (1) and the second (2) series; SN indicates sample number;

FIG. 28: Magnetizations as a function of temperature for $(Mn, Fe)_{1.90}V_{0.02}(P, Si)$ alloys annealed at 1343 K;

FIG. 29: (a) Temperature dependence of $\Delta T_{ad}$ for a magnetic field change of 1 T calculated from in field DSC measurement for $(Mn, Fe)_{1.90}V_{0.02}(P, Si)$ alloys annealed at 1343 K; herein H indicates heating and C indicates cooling; (b) The $\Delta T_{ad}$ of $Mn_{1.14}Fe_{0.74}V_{0.02}P_{0.49}Si_{0.51}$ under different applied magnetic field. The extrapolated value of $\Delta T_{ad}$ under 1.93 T is 4.3 K;

FIG. 30: Fraction of impurity (I (%) indicates impurity (vol %) for $(Mn, Fe)_{1.90}V_{0.02}(P, Si)$ alloys annealed at 1343 K; SN indicates sample number;

FIG. 31: Magnetizations as a function of the applied magnetic field for $(Mn, Fe)_{1.90}V_{0.02}(P, Si)$ alloys annealed at 1343 K measured by the loop process; The schematic drawings are not necessarily to scale.

DETAILED DESCRIPTION OF THE EMBODIMENTS

Below, especially a combined effect of Annealing Temperature and Vanadium Substitution For Magnetocaloric $Mn_{1.2-x}V_xFe_{0.75}P_{0.5}Si_{0.5}$ alloys is described.

Recently, near room temperature magnetic refrigeration technology has attracted broad attention due to its high efficiency, low impact on the environment, low noise, and long service life compared with the conventional vapor-compression technology. The giant magnetocaloric effect (GMCE) materials, which are utilized as refrigerant, form a key factor to determine the efficiency of this technology.

The magnetocaloric effect (MCE, from magnet and calorie) is a magneto-thermodynamic phenomenon in which an adiabatic temperature change or an isothermal entropy change of a magnetic material is caused by exposing the material to a changing magnetic field. The term giant magnetocaloric effect GMCE especially refers to materials that show enhanced temperature or entropy change in the vicinity of a magneto-structural or magneto-elastic phase-transition (see E. Bruck, Journal of Physics D, 2005, 38, pp R381). Such GMCE materials are particular suited for commercial applications as they strongly reduce the magnetic field strength that is required to operate a magnetocaloric device and thus reduces the investment costs connected to generating large magnetic fields.

Giant MCE may occur in some materials that undergo a first-order magnetic transition (FOMT), such as $Gd_5Ge_2Si_2$, $LaFe_{13-x}Si_x$, $MnFeP_{1-x}As_x$, $MnFeP_{1-x-y}Si_xB_y$, $MnCoGeB_x$ and Heusler alloys. Among them, the $MnFeP_{1-x-y}Si_xB_y$ alloys are currently regarded as one of the most promising materials that can be industrialized as magnetic refrigerant because of their cheap and non-toxic elements, high cooling capacity and tunable $T_C$ near room temperature. However, thermal hysteresis ($\Delta T_{hys}$) in $MnFeP_{1-x}Si_x$ alloys still limits their application since it lowers the efficiency of the cooling cycle. Lots of research has been done to reduce $\Delta T_{hys}$ while maintaining the GMCE. In order to obtain a limited $\Delta T_{hys}$, the compositions can be tuned to shift the FOMT towards the border with a second order magnetic phase transition (SOMT), as demonstrated for the $MnFeP_{1-x-y}Si_xB_y$ or for the transition metal substitution in $Mn_{1-y}Co_yFe_{0.95}P_{0.50}Si_{0.50}$ and $MnFe_{0.95-x}Ni_xP_{0.50}Si_{0.50}$. Additionally, $\Delta T_{hys}$ can also be controlled by the annealing time and temperature. For example, in $Mn_{1.15}Fe_{0.85}P_{0.55}Si_{0.45}$ alloys, $\Delta T_{hys}$ decreases with the annealing temperature. The effect of the annealing temperature and time on the magnetic phase transition of $Mn_{1.000}Fe_{0.950}P_{0.595}Si_{0.330}B_{0.075}$ alloys has been investigated and the annealing temperature was found to show a strong influence on $\Delta T_{hys}$. $Mn_{1.2}Fe_{0.75}P_{0.5}Si_{0.5}$ alloys annealed at 1373 K in a two-step heat treatment process was reported to have strong FOMT with a relative low $\Delta T_{hys}$ of 5 K.

Sintering of MnFePSi alloys can be regarded as a solid state diffusion process as the annealing temperature is below the melting point (1553 K). The diffusion rate of each element strongly depends on the annealing temperature. Therefore, introducing extra elements in the MnFePSi alloy requires a different annealing temperature. Here we disclose the combined effect of a changing annealing temperature (1323, 1373 and 1423 K) and V substitution (x=0.00, 0.01, 0.02, 0.03, 0.04, 0.05) in $Mn_{1.2-x}V_xFe_{0.75}P_{0.5}Si_{0.5}$ alloys, resulting in a change in aspect ratio at the hexagonal crystal structure and the magnetic properties. The substitution of Mn by V can be controlled by adjusting the annealing temperature in order to optimize the GMCE.

Below, the preparation of $Mn_{1.2-x}V_xFe_{0.75}P_{0.5}Si_{0.5}$ alloys is described.

Polycrystalline $Mn_{1.2-x}V_xFe_{0.75}P_{0.5}Si_{0.5}$ (x=0.00, 0.01, 0.02, 0.03, 0.04, 0.05) alloys were prepared by a powder metallurgy method. The starting materials Mn (99.7%), Fe (99.7%), red P (99%), Si (99.7%) and V (99.5%) powders were mechanically ball milled in a PULVERRISETTE 5 planetary mill for 10 h in an Ar atmosphere with a constant rotation speed of 380 rpm, then pressed into small tablets, and finally sealed in quartz ampoules under 200 μmbar of Ar. These tablets were then annealed at 1323, 1373 and 1423 K for 2 h in order to crystalize and slowly cooled down to room temperature. Subsequently, they were heated up to the same annealing temperature for 20 h to homogenize and quenched in water.

The X-ray diffraction (XRD) patterns were collected on a PANalytical X-pert Pro diffractometer with Cu-Kα radiation (1.54056 Å) at room temperature (RT). The room-temperature neutron diffraction data were collected on the neutron powder diffraction instrument PEARL at the research reactor of Delft University of Technology (see also L. van Eijck, L. D. Cussen, G. J. Sykora, E. M. Schooneveld, N.J. Rhodes, A. van Well, and C. Pappas, J. App. Crystallogr. 49, 1 (2016)). The crystal structures and atom occupancies were refined using the Rietveld refinement method implemented in the Fullprof software package. Differential scanning calorimetry (DSC) was carried out using a TA-Q2000 instrument at a rate of 10 K/min. The temperature and magnetic field dependence of the magnetization was measured by a superconducting quantum interference device (SQUID) magnetometer (Quantum Design MPMS 5XL) in the reciprocating sample option (RSO) mode. The adiabatic temperature change ($\Delta T_{ad}$) is measured in a Peltier cell based differential scanning calorimetry using a Halbach cylinder magnetic field (≤1.5 T). In this setup, the iso-field calorimetric scans were performed at a rate of 50 mK·min$^{-1}$, while the temperature has been corrected for the effect of the thermal resistance of the Peltier cells.

Below, the effect of annealing temperature and V substitution to $Mn_{1.2-x}V_xFe_{0.75}P_{0.5}Si_{0.5}$ alloys is described.

Figure 1:
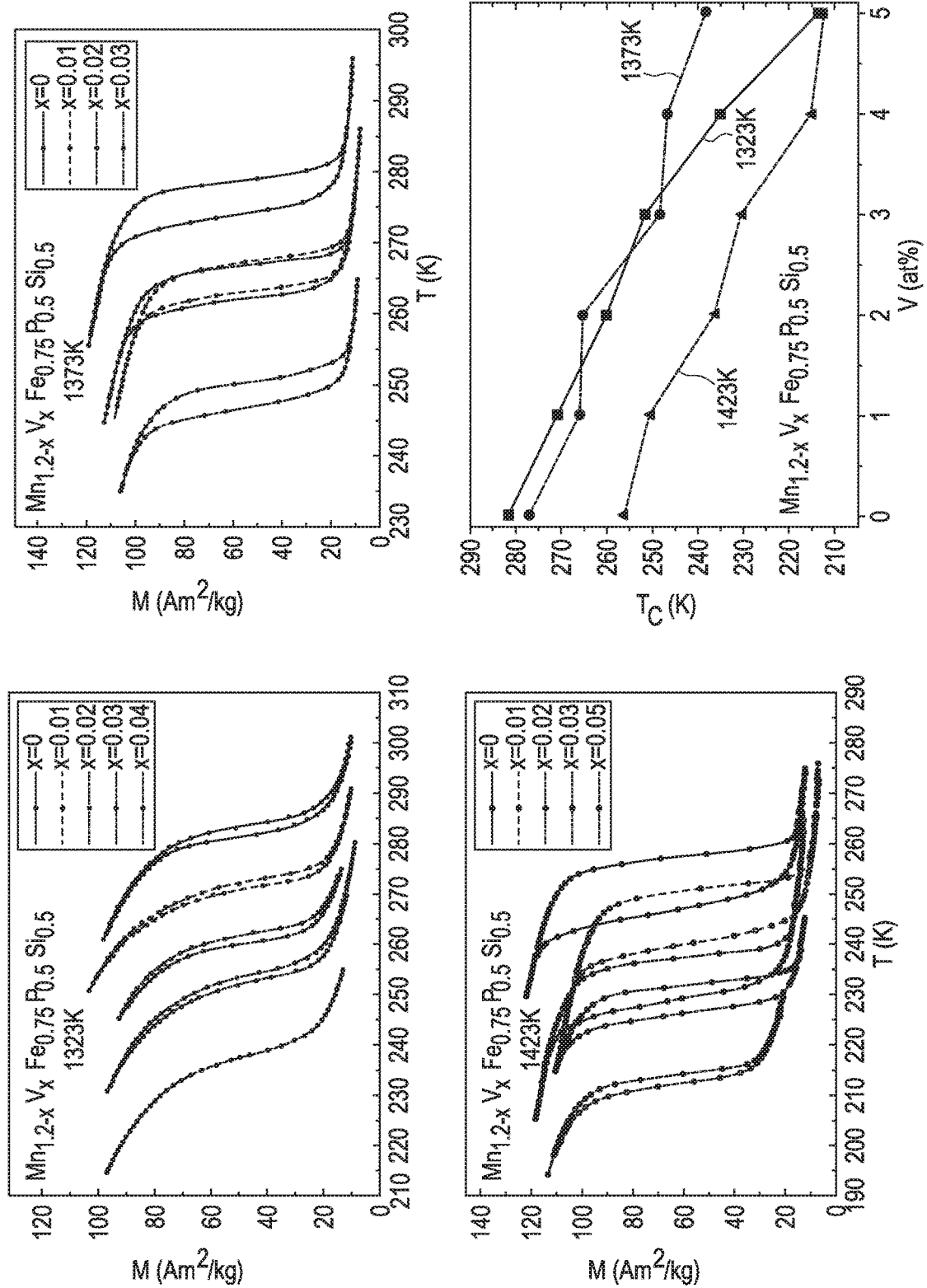
FIG. 1: Magnetizations as a function of temperature for $Mn_{1.2-x}V_xFe_{0.75}P_{0.5}Si_{0.5}$ (x=0.00, 0.01, 0.02, 0.03, 0.04 and 0.05) alloys after annealing at 1323, 1373 and 1423 K; The $T_C$ for $Mn_{1.2-x}V_xFe_{0.75}P_{0.5}Si_{0.5}$ alloys after annealing at 1323, 1373, 1423K is on the right bottom with V (at %) indicating the content.

Magnetization as a function of temperature for $Mn_{1.2-x}V_xFe_{0.75}P_{0.5}Si_{0.5}$ (x=0.00, 0.01, 0.02, 0.03, 0.04 and 0.05) alloys after annealing at 1323, 1373 and 1423 K are shown in FIG. 1. The values are extracted from iso-field measurements (decreasing from 2 to 0.2 T in steps of 0.2 T) to ensure that the virgin effect is removed. The ferromagnetic-to-paramagnetic transition temperature $T_C$ is determined by the corresponding maximum temperature of dM/dT in the curves. $T_C$ tends to decrease with increasing V substitution after annealing at 1323, 1373 and 1423K, as shown in the right bottom of FIG. 1. However, the decrease shows distinct features when the annealing temperature is changed. Except for the alloys annealed at 1323K, $T_C$ decreases linearly when annealed at 1373 and 1423 K. Since $T_C$ is relevant to the internal structure changes or the internal symmetry changes. These changes are in a good agreement with the trends for the c a ratio in the refined lattice parameters (see FIG. 2(d)).

$\Delta T_{hys}$ is defined as the hysteresis during the heating and cooling process, which will hinder the efficiency of the magnetic cooling device. It is important to minimize $\Delta T_{hys}$ while maintaining a sufficient MCE. In this work, $\Delta T_{hys}$ is determined by the difference in the transition temperature during heating and cooling in a field of 1 T. The transition temperature is defined as the extreme value of |dM/dT| versus T in the heating or cooling process, as shown in FIG. 1. The values of $T_C$, $\Delta T_{hys}$ and Latent heat (L) for $Mn_{1.2-x}V_xFe_{0.75}P_{0.5}Si_{0.5}$ (x=0.00, 0.01, 0.02, 0.03, 0.04, 0.05) alloys after annealing at 1323, 1373 and 1423 K are shown in table 1. Since materials with a pronounced FOMT usually show large L values, the values of L can be regarded as a sign of the strength of the FOMT. In general, V substitutions of Mn can reduce both $\Delta T_{hys}$ and L. When x increases from 0.00 to 0.05, $\Delta T_{hys}$ decreases dramatically from 12.8 K to 1.4 K when annealing at 1423 K, while it decreases from 2.1 K to below experimental resolution when annealing at 1323 K. Note that the limited $\Delta T_{hys}$ for the $Mn_{1.2-x}V_xFe_{0.75}P_{0.5}Si_{0.5}$ alloys annealed at 1323 K is promising for practical applications. The $\Delta T_{hys}$ and the L values for the alloy with x=0.02 are somewhat larger than that with x=0.01 for annealing at 1323 and 1373 K, which suggest a stronger first-order transition. As shown in table 2, the increase in occupation of Fe on the 3f site enhances the FOMT.

A Rietveld refinement of the room temperature XRD data shows that, in the $Mn_{1.2-x}V_xFe_{0.75}P_{0.5}Si_{0.5}$ alloys, the hexagonal $Fe_2P$-type lattice structure (space group P-62m) phase corresponds to the main phase and a $MnFe_2Si$-type lattice structure(space group Fm3m) is found as impurity phase. The phase fraction of impurities in each annealing temperature (see FIG. 2) is roughly at the same level for x≤0.04, which allows for independent comparison of the effects of V substitutions on the alloys annealed at the same annealing temperature. For the alloys with x≤0.03 annealing at 1323 and 1373 K, the impurity phase fraction is around 8.0±1.0 volume percentage (vol. %). But the impurity increases to around 11.5±0.5 vol. % when the annealing temperature rises to 1423 K. These results indicate that a large impurity phase fraction will be introduced at a higher annealing temperature.

Based on the crystal structure refinement results (shown in FIG. 2), the trends as a function of the V substitution concentration in lattice parameter change are similar for all the three annealing temperatures: the a axis decreases while the c axis increases, leading to an increase in the c a ratio. The size of the change varies with the annealing temperature. For x=0.05, the change in c a ratio is 1.0%, 0.5%, 0.4% at an annealing temperature of 1323, 1373 and 1423 K, respectively. There is a smaller change at higher annealing temperatures, which may be caused by loss of one component of the alloy either segregating into the inter-grain secondary phase or evaporation.

Below, the Room temperature neutron diffraction and atom site occupancy change of $Mn_{1.2-x}V_xFe_{0.75}P_{0.5}Si_{0.5}$ alloys is described.

For the Mn—Fe—P—Si alloy, it is reported that the Fe atoms mainly occupy the 3f site, the Mn atoms the 3g site, the P atoms and Si atoms the 2c or 1b sites and the Si atoms have a high preference in the 2c site. X-ray absorption and powder diffraction experiments combined with density functional theory (DFT) calculations revealed that an electronic redistribution takes place in Mn—Fe—P—Si—B which is the origin of the giant entropy change and results in a large change in the electron density for the Fe and the surrounding Si/P atoms. The previous first-principles calculation results suggest that larger magnetic moments will develop on the 3f and 3g site when there are more coplanar Si nearest neighbors. Consequently, the Si atoms on the 2c site may also contribute to strengthen the magnetic moments. Thus, it suggests that the 3f site is highly affected by the ferromagnetic transition. In order to investigate the relationship between the site occupancies and the magneto-elastic phase transition, it is significant to investigate both the atom positions and the site occupation in the $Fe_2P$-type structure.

TABLE 1

The values of $T_C$, $\Delta T_{hys}$ and the Latent heat (L) for $Mn_{1.2-x}V_xFe_{0.75}P_{0.5}Si_{0.5}$ (x = 0.00, 0.01, 0.02, 0.03, 0.04, 0.05) alloys after annealing at 1323, 1373 and 1423K, respectively.

| | Annealed at 1423K | | | Annealed at 1373K | | | Annealed at 1323K | | |
|---|---|---|---|---|---|---|---|---|---|
| x | $T_C$ (K) | $\Delta T_{hys}$ (K) | L (kJ/kg) | $T_C$ (K) | $\Delta T_{hys}$ (K) | L (kJ/kg) | $T_C$ (K) | $\Delta T_{hys}$ (K) | L (kJ/kg) |
| 0.00 | 256.4 | 12.8 | 7.6 | 276.8 | 4.5 | 8.0 | 281.2 | 2.1 | 6.2 |
| 0.01 | 250.5 | 10.7 | 7.1 | 265.7 | 3.5 | 7.6 | 270.6 | 1.3 | 4.8 |
| 0.02 | 236.4 | 9.1 | 5.9 | 265.1 | 4.7 | 8.4 | 260.1 | 1.8 | 4.2 |
| 0.03 | 230.4 | 5.4 | 5.6 | 248.2 | 3.7 | 6.3 | 251.5 | 1.3 | 3.9 |
| 0.04 | 215.3 | 3.8 | 4.5 | 246.7 | / | 5.5 | 234.9 | 1 | 3.3 |
| 0.05 | 212.5 | 1.4 | 3.5 | 238.4 | / | 4.9 | 213.5 | 0 | 0.04 |

FIG. 3 (a) shows the neutron diffraction pattern and the refinement result of the $Mn_{1.18}V_{0.02}Fe_{0.75}P_{0.5}Si_{0.5}$ alloy annealed at 1373 K, indicating that the calculation is consistent with the experimental result. Note that V can hardly be detected by neutron diffraction as the sample holder is made from V. The V scatters incoherently and thereby contributes mainly to the background. Therefore, the site occupation of V in the $Fe_2P$-type structure is not refined here. According to the refinement of the neutron diffraction patterns, the higher annealing temperature results in a higher occupancy of the Fe atoms on the 3f site and Si atoms on the 2c site (see table 2). Therefore, this increase can illustrate why the higher annealing temperature leads to a stronger first-order magneto-elastic transition with higher |$\Delta S_M$| values for a field change of 2 T, as shown in FIG. 5. For the alloys annealed at 1373 K, the sample with x=0.02 has a higher |$\Delta S_M$| value for a field change of 1 T than the sample with x=0 (see FIG. 4(b)). This is probably due to its slightly higher Fe occupation on 3f site and the Si atoms on the 2c site (shown in table 2). As mentioned above, that will enhance the FOMT.

FIGS. 3 (b) and 3 (c) illustrate the interatomic distance as a function of annealing temperature $T_a$ (K) for $Mn_{1.2}Fe_{0.75}P_{0.5}Si_{0.5}$ alloys, amongst others $Mn_{1.18}V_{0.02}Fe_{0.75}P_{0.5}Si_{0.5}$ annealed at 1373 K. Note that the FOMT becomes stronger with increasing annealing temperature. In the $Fe_2P$-type structure, Mn/Fe (3f)-P/Si (2c) hybridizes in the same plane while Mn (3g)-P/Si (1b) is in the other plane. According to the previous X-ray magnetic circular dichroism experiments, a similar moment evolution was observed in both Mn and Fe, suggesting that the origin of GMCE might come from both Mn and Fe layer. Consequently, the mean distance of the Mn/Fe (3f)-P/Si (2c) and the Mn (3g)-P/Si (1b) intra layer will strongly affect the hybridization between the metallic and non-metallic elements. For the $Mn_{1.2}Fe_{0.75}P_{0.5}Si_{0.5}$ alloy with similar amount of impurity annealed at 1323 and 1373 K, the mean distance of the intra layer Mn/Fe (3f)-P/Si (2c) and Mn (3g)-P/Si (1b) decreases with increasing annealing temperature and therefore increases the GMCE. Compared to the alloy without V annealed at 1373 K, the $Mn_{1.18}V_{0.02}Fe_{0.75}P_{0.5}Si_{0.5}$ annealed at 1373 K, which has larger GMEC, also has smaller mean distance of the intra layer Mn/Fe (3f)-P/Si (2c) and Mn (3g)-P/Si (1b). However, for the $Mn_{1.2}Fe_{0.75}P_{0.5}Si_{0.5}$ alloy annealed at 1423 K with the largest GMCE, the impurity is higher than other three samples, suggesting that it has lower Si content in the $Fe_2P$-type phase. Thus, the interatomic distance is not comparable with other samples. But it should be note that its intra layer distance Mn/Fe (3f)-Mn/Fe (3f) is the lowest among these samples. In conclusion, the changing of the GMCE strength induced by the annealing temperature is the result of both the different occupation on 3f site and 2c site and the varying interatomic distances.

FIG. 3 (d) shows on the x-axis also the annealing temperature Ta, and on the left y-axis a (Å) and on the right axis c (Å). The a value decreases with annealing temperature; the c value increases with annealing temperature.

Below, the Magnetocaloric effect and magneto-elastic phase transition of $Mn_{1.2-x}V_xFe_{0.75}P_{0.5}Si_{0.5}$ alloys is described.

The iso-field magnetization curves (not shown here) of annealed $Mn_{1.2-x}V_xFe_{0.75}P_{0.5}Si_{0.5}$ (x=0.00, 0.01, 0.02, 0.03, 0.04, 0.05) for a magnetic field change of 0-2 T are measured in the vicinity of $T_C$ at temperature intervals of 1 K. The $|\Delta S_M|$ values of the alloys are derived from extracted isothermal magnetization curves based on the Maxwell relation. Temperature-dependence of $|\Delta S_M|$ for a field change of 0-1 T (open symbols) and 0-2 T (solid symbols) for $Mn_{1.2-x}V_xFe_{0.75}P_{0.5}Si_{0.5}$ (x=0.00, 0.01, 0.02, 0.03, 0.04, and 0.05) alloys after annealing at 1323, 1373 and 1423 K are shown in FIGS. 4 (a), (b) and (c), respectively. With increasing annealing temperatures, $|\Delta S_M|$ increases and $T_C$ decreases, which agrees with the previous reported effect of annealing temperature for $MnFe_{0.95}P_{0.595}Si_{0.33}B_{0.075}$ alloys. On the other hand, for increasing V substitutions, $|\Delta S_M|$ decreases and $T_C$ decreases. The alloy with x=0.02 annealed at 1373 K even has a larger $|\Delta S_M|$ value (18.4 J/(kg K)) than that with x=0.00 (17.2 J/(kg K)) under an external field of 1 T. But when the external field is at a field change of 0-2 T, these two samples have equal values of $|\Delta S_M|$. This indicates that the alloy with 0.02 at % has better low-field (1 T) performance, which is attributed to high Fe occupancy in the 3f site and Si occupancy on the 2c site. Since the magnetic field we apply in current heat pump prototypes now is around 1 T with low-cost NdFeB permanent magnets, it is very significant to have high performance under this field. The current alloys with x=0.00 annealed at 1323 K ($|\Delta S_M|$=8.2 J/(kgK)) at 282 K for a field change of 0-1 T with $\Delta T_{hys}$=2.1 K) is comparable to the Boron doping alloys such as the $MnFe_{0.95}P_{0.595}Si_{0.33}B_{0.075}$ alloys annealed at 1323 K ($|\Delta S_M|$=6.2 J/(kgK) at 285 K for a field change of 0-1 T) and the $MnFe_{0.95}P_{0.593}Si_{0.33}B_{0.077}$ alloys annealed at 1373K ($|\Delta S_M|$=9.8 J/(kg K) at 281 K with $\Delta T_{hys}$=1.6 K). These results suggest that a decreasing annealing temperature can tune the strong first-order magnetic transition to the boundary between the first-order to second-order magnetic transition in the $Mn_{1.2}Fe_{0.75}P_{0.5}Si_{0.5}$ alloys.

FIG. 5 (a) illustrates the temperature dependence of DSC in-field $\Delta T_{ad}$ for several $Mn_{1.2-x}V_xFe_{0.75}P_{0.5}Si_{0.5}$ alloys annealed at 1323 K while FIG. 5 (b) illustrates the temperature dependence of $\Delta T_{ad}$ for $Mn_{1.2-x}V_xFe_{0.75}P_{0.5}Si_{0.5}$ alloys annealed at 1373 K. $\Delta T_{ad}$ is determined by using the following equation:

TABLE 2

The site occupation of the 3f, 3g, and 2c sites for the $Mn_{1.2}Fe_{0.75}P_{0.5}Si_{0.5}$ alloys annealed at 1323, 1373 and 1423K and the $Mn_{1.18}V_{0.02}Fe_{0.75}P_{0.5}Si_{0.5}$ alloy annealed at 1373K. Space group: P-62 m. Atomic positions : 3f($x_1$, 0,0), 3g ($x_2$, 0, 1/2), 2c (1/3, 2/3, 0), and 1b (0, 0, 1/2).

| Site | Parameters | x = 0.00, 1323K | x = 0.00, 1373K | x = 0.00, 1423K | x = 0.02, 1373K |
|---|---|---|---|---|---|
| | a | 6.107(4) | 6.098(2) | 6.083(0) | 6.093(1) |
| | c | 3.427(7) | 3.442(4) | 3.460(6) | 3.448(8) |
| | V(Å) | 110.72(7) | 110.86(2) | 110.899(1) | 110.88(7) |
| 3f | x1 | 0.25401(4) | 0.25594(5) | 0.25443(5) | 0.25591(4) |
| | n(Fe)/n(Mn) | 0.197/0.053(4) | 0.200/0.050(1) | 0.199/0.051(3) | 0.206/0.044(3) |
| 3g | x2 | 0.59250(7) | 0.59145(9) | 0.59179(0) | 0.59179(8) |
| | n(Mn)/n(Fe) | 0.249/0.000(7) | 0.247/0.003(1) | 0.248/0.002(3) | 0.248/0.002(3) |
| 2c | n(P)/n(Si) | 0.146/0.020(3) | 0.119/0.047(2) | 0.114/0.052(9) | 0.099/0.067(1) |
| 1b | n(P)/n(Si) | 0.080/0.003(1) | 0.068/0.015(1) | 0.080/0.003(1) | 0.062/0.021(4) |
| | Rp(%) | 6.18 | 8.9 | 7.77 | 6.92 |
| | wRp(%) | 8.5 | 10.9 | 11 | 8.98 |
| | $\chi^2$ | 6.96 | 10.2 | 13.4 | 5.06 |

$$\Delta T_{ad} = \frac{T}{C_p(H)} \Delta S_M(H) \quad (4.1)$$

where $C_p(H)$ is the specific heat. Note that there are two peaks in the vicinity of $T_C$ for the sample x=0.00. It is reasonable as two different Fe$_2$P-type phases with close compositions have been reported to co-exist if annealing is preferred at relative lower temperatures. When x increases from 0.00 to 0.02 for the sample annealed at 1323 K, the values of $\Delta T_{ad}$ increases from 1.8 to 2.7 K and $|\Delta S_M|$ decrease from 8.2 to 7.6 Jkg$^{-1}$K$^{-1}$ under an external field change of 1 T. Compared to the alloy without V, a significant $\Delta T_{ad}$ of 2.7 K for a field change of 1 T and a limited hysteresis (1.8 K) are achieved in the alloy with x=0.02 annealed at 1323 K, indicating that it is a promising candidate for magnetic heat-pumping.

For the sample annealed at 1373 K, the values of $\Delta T_{ad}$ increases from 3.3 to 4.8 K for an external field change of 1 T by increasing x from 0.00 to 0.02. The intermediate hysteresis in these samples is about 4.5 K. It is important to distinguish the value of $\Delta T$ada in this work from the Cyclic (direct) field-induced temperature changes ($\Delta T_{cyclic}$) in first order materials showing a large hysteresis. $\Delta T_{cyclic}$ reflects the practical working situation of the magnetic refrigeration while the $\Delta T_{ad}$ is more reflecting the potential. Therefore, for the materials with a large hysteresis, $\Delta T_{ad}$ turns out to be much higher than $\Delta T_{cyclic}$. Thus, it is concluded that V substitution can increase $\Delta T_{ad}$ when annealed at 1323 and 1373 K.

The combined influence of V substitution for Mn and a variation of the annealing temperature is investigated in the Mn$_{1.2-x}$V$_x$Fe$_{0.75}$P$_{0.5}$Si$_{0.5}$ alloys. Increasing the V content results in a decrease in the a-axis and increase on the c-axis, which leads to a decrease in $T_C$. The occupancy of Fe atoms on the 3f site and the Si atoms on the 2c site are enhanced when the annealing temperature and/or the V content increases, which will result in a higher $|\Delta S_M|$. Decreasing the mean distance of the intra layer Mn/Fe (3f)-P/Si (2c) and Mn (3g)-P/Si (1b) also contributes to an increase on $|\Delta S_M|$. The alloy with x=0.02 annealed at both 1323 and 1373 K has a larger $|\Delta S_M|$ value than the alloy with x=0.00 for a field change of 0-2 T while its value is equal for a field change of 0-1 T, indicating that the alloy with x=0.02 has better low-field performance in a field change of 1 T. This competitive low-field performance promotes the application of low-cost NdFeB permanent magnets or even the ferrite permanent magnets, which will help development of a low-field prototype. Compared to a V free alloy, a larger temperature change $\Delta T_{ad}$ of 2.7 K and less hysteresis of 1.8 K are achieved by optimizing the alloy with x=0.02 annealed at 1323 K, which is comparable to the MnFe$_{0.95}$P$_{0.595}$Si$_{0.33}$B$_{0.075}$ alloy. Mn$_{1.2-x}$V$_x$Fe$_{0.75}$P$_{0.5}$Si$_{0.5}$ alloys can therefore form a promising alternative for magnetic refrigeration near room temperature.

Below Ultra-low Hysteresis and Giant Magnetocaloric Effect near the critical Point of First to Second order Phase Transition in Mn1-xVxFe(P,Si,B) Alloys is described.

Thermal hysteresis ($\Delta T_{hys}$) is an important issue that limits the real application of the GMCE in these FOMT materials. The discontinuous nature of the transition is the feature that provides the GMCE. Therefore, in the premise of keeping the GMCE, the thermal hysteresis should be made as narrow as possible by manipulating the microstructure or by tuning the composition. Through 0.075 at. % of B substitution in the MnFeP$_{1-x-y}$Si$_x$B$_y$ alloys, the optimized $\Delta T_{hys}$ can be decreased to 1.6 K according to temperature-dependent magnetization curves at a magnetic field of 1 T and $\Delta T_{hys}$ is 2.0 K according to in-field DSC measurements at a magnetic field of 1 T (see the supporting information of ref F. Guillou, G. Porca'ri, H. Yibole, N. H. van Dijk, and E. Bruck. Taming the First-Order Transition in Giant Magnetocaloric Materials. Advanced Materials, 17 (2014) 2671-2675), while maintaining a GMCE. In this case, the material can be cycled for 10 thousand times and the sample geometry remains intact. A higher level of B substitution can decrease the $\Delta T_{hys}$ further, but may fail to provide a sufficiently large GMCE. It is desirable to find a new approach to further decrease the $\Delta T_{hys}$ and simultaneously provide a large GMCE. One of the design criteria is that the adiabatic temperature change ($\Delta T_{ad}$) should especially be larger than 2 K, since cooling may be ineffective when $\Delta T_{ad}$ drops below 2 K. In this work, through V substitution, an ultra-low $\Delta T_{hys}$ (0.7 K) and a GMEC of $\Delta T_{ad}$ (2.3 K) at a magnetic field of 1 T is achieved simultaneously.

The crystal structure of MnFeP$_{1-x-y}$Si$_x$B$_y$ shows a significant change in lattice parameters across the magnetic phase transition, while it keeps its hexagonal structure (magnetoelastic transition). Applying a magnetic field results in a shift of the transition temperature ($T_c$) to higher temperatures. The shift of $T_c$ induced by magnetic fields, defined as $dT_c/dB$, is positive for a conventional first-order magnetic transition materials such as MnFeP$_{1-x-y}$Si$_x$B$_y$ and La—Fe—Si, while it is negative for the inverse first-order magnetic transition materials, for instance the Ni—Mn—X-Heusler alloys with X=Sn, Sb and In or Fe—Rh. For the conventional first-order magnetic transition materials, this shift is attributed to the magnetic field stabilization of the phase with the higher magnetization, being the low-temperature ferromagnetic phase. In a magnetic field thermal energy is then needed to induce the magnetic phase transition. If the value of $dT_c/dB$ is enhanced, the magnetic phase transition can be induced in lower magnetic field. As a consequence, low-field permanent magnets could be utilized, which would significantly reduce the costs of commercial applications. The magnetic field currently used in the commercial prototypes is generated by NdFeB permanent magnets with external magnetic fields varying from a 0.9 to 1.5 T. The materials cost to reach a field of 1.5 T may be 10 times higher than the costs to reach a field of 0.9 T. It is therefore of interest to explore the lower field potential of this GMCE system by studying $dT_c/dB$. In this work, we investigated the effect of V substitution on the $\Delta T_{hys}$, $dT_c/dB$, the lattice parameters and the magnetic properties in polycrystalline Mn—V—Fe—P—Si—B alloys.

Below, the preparation of Mn1-xVxFe(P,Si,B) alloys is described.

Polycrystalline Mn$_{1-x}$V$_x$Fe$_{0.95}$P$_{0.593}$Si$_{0.33}$B$_{0.077}$ (x=0.00, 0.01, 0.02, 0.03) alloys were prepared by a powder metallurgy method. The starting materials in the form of Mn, Fe, red P, Si, B, and V powders were mechanically ball milled for 10 h in an Ar atmosphere with a constant rotation speed of 380 rpm, then pressed into small tablets, and finally sealed in quartz ampoules under 200 μmbar of Ar before employing the various heat treatment conditions. These tablets were annealed at 1323 K for 2 h in order to crystalize and slowly cooled down to room temperature. Then they were heated up to the same annealing temperature for 20 h to homogenize the alloy and finally quenched in water. This batch samples is regarded as series A. In order to tune the $T_C$ to room temperature for the sample with V, the Mn$_{1-x}$V$_x$Fe$_{0.95}$P$_{0.563}$Si$_{0.36}$B$_{0.077}$ (x=0.00, 0.01, 0.02, 0.03) alloys with a higher Si content were prepared with the same procedure as series A, except for a higher annealing temperature of 1373 K. This batch samples is regarded as series B.

The X-ray diffraction (XRD) patterns were collected on a PANalytical X-pert Pro diffractometer with Cu-Kα radiation (1.54056 Å) at room temperature. The temperature and magnetic field dependence of the magnetization was measured with a commercial superconducting quantum interference device (SQUID) magnetometer (Quantum Design MPMS 5XL) in the reciprocating sample option (RSO) mode. The adiabatic temperature change ($\Delta T_{ad}$) is measured in a Peltier cell based differential scanning calorimetry using a Halbach cylinder providing a magnetic field of 1.5 T. In this setup, the iso-field calorimetric scans were performed at a slow rate of 50 µmKmin$^{-1}$ in order to probe the equilibrium state, while the temperature has been corrected for the effect of the thermal resistance of the Peltier cells.

Below, the characterization of crystal structure of Mn1-xVxFe(P,Si,B) alloys is described.

In FIGS. 6a-6d the XRD patterns for series A (a and b) and series B (c and d) are illustrated. For the $Mn_{1-x}V_xFe_{0.95}P_{0.563}Si_{0.36}B_{0.077}$ (x=0.00, 0.01) alloys in series B, as $T_C$ is higher than room temperature, the XRD patterns are measured at 323 K, where they are in the paramagnetic state. Other samples are measure at room temperature since their $T_C$ values are below room temperature. At the selected temperatures, all the samples are measured at paramagnetic state. The hexagonal Fe$_2$P-type (space group P-62m) phase is identified as the main phase in all these alloys and the cubic MnFe$_2$Si-type phase (space group Fm3m) is identified as the impurity phase. Based on the refinement results, the estimated fraction of the impurity phase is 1.6-2.4 vol. % in series A and 3.7-4.5 vol. % in the series B, respectively (see FIG. 6e). The amount of impurity phase is decreases by V substitution for series B. Above a difference in annealing temperature was found to result in a variation in the site occupancy and atom position. The lattice parameter in series A and series B shows a different behavior. For series A, an increase in V substitution leads to a decrease in the a axis and an increase in the c axis. The c/a ratio increases, while $T_C$ decreases for an increasing V substitution. Note that, the unit cell volume of the crystal remains unchanged for x=0.01 and 0.02. Only when the V content reaches x=0.03, the volume drops by 0.7% compared to x=0.00. For series B, the lattice parameters show a different trend. Oppositely, an increasing V substitution leads to an increase in the a axis, while the c axis decreases for x=0.00, 0.01 and 0.02. The evolution of the unit cell volume for series B was found to differ from series A, as the unit cell volume slightly increases for x=0.02 and 0.03, but still is smaller than x=0.00. Since the covalent radius of V (132±5 pm) is slightly smaller than that of Mn (139±5 pm), a decrease in the unit cell volume may be a sign of the substitution of Mn by V in the Fe2P-type structure. The temperature in the drawings indicate the annealing temperature at 1323 K (FIGS. 6a-6b), at 1373 K (FIGS. 6c-6d), and at 1323 or 1373 K (in both FIGS. 6e-6f).

Below, the magnetocaloric Effect of Mn1-xVxFe(P,Si,B) alloys is described.

Temperature dependence of the magnetization in series A and B are shown in FIGS. 7 (a) and (b), respectively. The temperature dependence of –dM/dT is also shown in the corresponding insets. Generally, the maximum of –dM/dT is regarded as an indication of the strength for FOMT. The maximum of –dM/dT in our materials decreases for an increasing V content except for the sample with x=0.02, indicating it moves closer to SOMT. The transition temperature $T_C$ is determined from the maximum value of the –dM/dT in the M-T curve during heating. For series A, $T_C$ tends to decrease with increasing V substitution. Moreover, the reduction of $T_C$ becomes weaker with increasing V content, as shown in table 3. It reduces from about 18.1, 15.3 and 12.7 K from x=0.00 to 0.03 in steps of 0.01 at. % V. For series B, $T_C$ first increases at x=0.01 and then decreases with increasing V substitution.

The DSC patterns for series A and B are measured (not shown here), and the derived latent heat is listed in Table 3. It was earlier found that the alloy with x=0 is already at the border of the FOMT to the second order magnetic transition (SOMT). Increasing the V substitution from 0.00 to 0.03 results in a strong reduction of the latent heat by 67% from 5.2 to 1.7 J/g for the alloys annealed at 1323 K and by 55% from 6.2 to 2.8 J/g for the alloys annealed at 1373 K (listed in table 3), indicating that the samples transfer more towards the SOMT. As mentioned above, the reduction in latent heat mainly contributes to the increase in $dT_C/dB$. Additionally, smaller latent heat will result in a smaller thermal hysteresis.

TABLE 3

The Curie temperature ($T_C$), thermal hysteresis ($\Delta T_{hys-MT}$), latent heat (L), magnetic entropy change ($|\Delta S_M|$) and adiabatic temperature change $\Delta T_{ad}$ at a field change of 1 T for series A and B.

| Annealed T (K) | Sample | $T_C$ (K) | $\Delta T_{hys-MT}$ (K) | L (kJ/kg) | $|\Delta S_M|$ (J/(kg · K)) | $\Delta T_{ad}$ (K) |
|---|---|---|---|---|---|---|
| series A | x = 0.00 | 290.0 | 1.1 | 5.2 | 6.5 | 2.7 |
| series A | x = 0.01 | 270.4 | 0.8 | 3.4 | 3.3 | / |
| series A | x = 0.02 | 255.2 | 0.9 | 2.4 | 4.6 | 1.6 |
| series A | x = 0.03 | 242.5 | 0.7 | 1.7 | 2.7 | / |
| series B | x = 0.00 | 300.2 | 1.5 | 6.2 | 11.3 | 3.5 |
| series B | x = 0.01 | 310.2 | 0.8 | 2.5 | 4.8 | 1.8 |
| series B | x = 0.02 | 286.2 | 0.5 | 3.7 | 5.6 | 2.3 |
| series B | x = 0.03 | 264.2 | 0.1 | 2.8 | 4.8 | 1.6 |
| 1373* | x = 0.00 | 281 | 1.6 | 3.8 | 9.8 | 2.5 |

*The sample is $Mn_1Fe_{0.95}P_{0.593}Si_{0.33}B_{0.077}$ alloy annealed at 1373K in two-step heat treatment.

A large $\Delta T_{hys}$ is usually accompanied with a strong FOMT in the materials families of Gd$_5$(Si,Ge)$_4$, La(Fe,Si)$_{13}$, and Heuslers NiMn(In,Ga,Sn) and (Mn,Fe)$_2$(P,Si,B) alloys. Even though they have a giant MCE, the large $\Delta T_{hys}$ limits their application in real devices since it will lower the heat exchanging efficiency dramatically. Materials optimized to be near the critical point between a first and second order transition are promising candidates for applications as they combine a low thermal hysteresis with a considerable GMCE. Here, we find that $\Delta T_{hys}$ can be reduced further by substituting Mn by V in (Mn,Fe)$_2$(P,Si,B) alloys. $\Delta T_{hys-MT}$ is determined by calculating the difference in the maximum value of –dM/dT during cooling and heating in an applied magnetic field of $\mu_0H$=1 T. For series A, $\Delta T_{hys-MT}$ decreases by 36% from 1.1 to 0.7 K when x increases from 0.00 to 0.03. For series B, $\Delta T_{hys-MT}$ decreases by 93% from 1.5 to 0.1 K when x increases from 0.00 to 0.03. The thermal hysteresis decreases with increasing V substitution, which tunes the series A and B alloys towards a second order magnetic transition which makes these materials more suitable for commercialization of magnetic refrigerators.

The iso-field magnetization curves (not shown here) of series A and B for a magnetic field change of 0-2 T are measured in the vicinity of $T_C$ with a temperature interval of 1 K. The values of $|\Delta S_M|$ for the alloys is derived from extracted isothermal magnetization curves using the Maxwell relation. The temperature dependence of $|\Delta S_M|$ for series A and B are shown in FIGS. 8 (a) and (c), respectively.

$|\Delta S_M|$ decreases with increasing V substitution. However, the alloy with x=0.02 in series A has a higher $|\Delta S_M|$ value even though it has a lower latent heat. In series A, the MCE ($|\Delta S_M|$=6.5 J/(kgK) at 289 K under a field change of 0-1 T with $\Delta T_{hys}$=1.1 K) of the alloy with x=0.00 is comparable to a previously studied one prepared by a second step annealing method ($|\Delta S_M|$=9.2 J/(kgK) at 279.1 K under a field change of 0-1 T with $\Delta T_{hys}$=1.6 K).

FIG. 8 (b) illustrates the temperature dependence of in-field DSC values of $\Delta T_{ad}$ for a partial series A (x=0.00 and 0.02), while FIG. 8 (d) illustrates the temperature dependence of $\Delta T_{ad}$ for series A (x=0.00, 0.01, 0.02 and 0.03). When x increases from 0.00 to 0.02 in series A, the value of $\Delta T_{ad}$ decreases from 2.7 to 1.6 K under a field change of 1 T. When x increases from 0.00 to 0.02 in series B, the values of $\Delta T_{ad}$ decreases from 3.5 to 2.3 K under afield change of 1 T. Note that, in series B, the value of $\Delta T_{hys\text{-}DSC}$, determined by the difference of the heating and cooling process of in-field DSC under a field change of 1 T, decreases from 2.4 to 0.7 K when x increases from 0.00 to 0.02. The value of $\Delta T_{ad}$ for $Mn_{0.98}V_{0.02}Fe_{0.95}P_{0.563}Si_{0.36}B_{0.077}$ ($\Delta T_{ad}$=2.3 K) in series B is competitive to the $MnFe_{0.95}P_{0.563}Si_{0.36}B_{0.077}$ alloys ($\Delta T_a d$=2.5 K), but its value of $\Delta T_{hys\text{-}DSC}$ is reduced by 85%. It is clearly promising to achieve at the same time a giant value of $\Delta T_{ad}$ and an extremely low $\Delta T_{hys\text{-}DSC}$, which can significantly improve the heat exchange efficiency of the magnetic cooling system.

Below, a mechanism of ultra-low hysteresis and giant magnetocaloric for Mn1-xVxFe(P,Si,B) alloys is described.

The magnetic field dependence of $T_C$ and $dT_C/dB$ for series A and B are shown in FIGS. 9 (a) and (b). The magnetic field (on the horizontal axis) has been corrected by the demagnetizing field using a demagnetization factor of ⅓, as the shape of measuring powders can be simplified as spheres. In order to demonstrate the change in $dT_C/dB$, the value of $T_C$ (B)-$T_C$ (0) versus the magnetic field is shown in FIGS. 9 (a) and (b). The Clausius-Clapeyron relation for a FOMT corresponds to $dT_C/dB$=-$T_C\Delta M/L$, where B is the applied magnetic field and $\Delta M$ is the jump in magnetization, implying that $dT_C/dB$ should increase with an increase of $\Delta M$ and a decrease of the latent heat. For the alloys annealed at 1323 and 1373 K, $dT_C/dB$ can be enhanced from 4.0 to 5.0 K/T when the V content is changed from x=0.00 to x=0.02. A value of 5.0 K/T is comparable to the $dT_C/dB$ value of $(Mn,Fe)_2(P,As)$ alloys, where $dT_C/dB$ was found to be 5.2 K/T. This increase is mainly caused by the decrease of the latent heat (see table 3) since the values of $T_C$ and $\Delta M$ are reduced (see FIG. 8). Moreover, FIG. 9 (c) demonstrates that the magnetic moment per formula unit ($\mu_{f.u.}$) for series B increases from 3.75 to 3.96 $\mu_B/_{f.u.}$ when x increases from 0.00 to 0.02. The value of $\mu_{f.u.}$ for series B was calculated as mentioned in reference. A larger value of $\mu_{f.u.}$ suggests a larger value of $|\Delta S_M|$. The higher values for $dT_C/dB$ and $\mu_{f.u.}$ explains why a ultra-low thermal hysteresis and a giant GMEC can be achieved simultaneously in the alloys with V. By B substitution, the thermal hysteresis reaches a minimum, while $\Delta T_{ad}$ remains 2 K. Introducing V as a new substitutional element is found to be capable of increasing both $dT_C/dB$ and $\mu_{f.u.}$ and can further decease the hysteresis without losing the GMCE. Thus, the current $Mn_{1-x}V_xFe(P,Si,B)$ compounds provide a feasible alternative for high-frequency near room temperature magnetic cooling applications.

The ultra-low hysteresis and giant MCE of $Mn_{1-x}V_xFe_{0.95}P_{0.563}Si_{0.36}B_{0.077}$ alloys annealed at 1373 K paves a path to high frequency magnetic refrigeration applications. $T_C$ tends to decrease with increasing V. For the alloys annealed at 1373 K, the latent heat can be reduced by 55% from 6.2 to 2.8 J/g and $\Delta T_{hys\text{-}MT}$ decreases by 93% from 1.5 to 0.1 K when x increases from 0.00 to 0.03. The field dependence of the transition temperature ($dT_C/dB$) is enhanced from 4.0 to 5.0 K/T by V substitution of Mn. Higher values of $dT_C/dB$ and $\mu_{f.u.}$ value are the key reasons that a large GMCE value can be provided even though hysteresis has been reduced to ultra-low values. Finally, an ultra-low value of $\Delta T_{hysDSC}$ (0.7 K) and a giant $\Delta T_{ad}$ (2.3 K) can be achieved in a field of 1 T. Thus, the current Mn1-xVxFe(P,Si,B) compounds can provide a feasible alternative for high-frequency near-room temperature magnetic cooling applications using permanent magnets.

Below, further information in relation to Low Hysteresis and Large Latent Heat in the Off-stoichiometric Mn—Fe—P—Si—V Magnetocaloric Alloys is described.

Below, a preparation method is described.

Polycrystalline $(Mn_{0.6-y}Fe_{0.4-w})_{1.90}V_{0.02}P_{0.5}Si_{0.5}$ (y+w=0.02) alloys were prepared by a powder metallurgy method. The starting materials in the form of Mn (99.7%), Fe (99.7%), red P (99%), Si (99.7%) and V (99.5%) powders were mechanically ball milled for 10 h in an Ar atmosphere with a constant rotation speed of 380 rpm, then pressed into small tablets, and finally sealed in quartz ampoules under 200 μmbar of Ar before employing the various heat treatment conditions. These tablets were annealed at 1373 K for 25 h in order to crystalize and finally quenched in water.

Below, experimental results are described.

TABLE 4

The values of $T_C$, $\Delta T_{hys}$, the latent heat (L), $|\Delta S_M|$ and $\Delta T_{ad}$ under a magnetic field change of 1 T, $\Delta T_{cyclic}$ under a magnetic field change of 1.1 T for $(Mn_{0.6-y}Fe_{0.4-w})_{1.90}V_{0.02}P_{0.5}Si_{0.5}$ (1#-4#) alloys.

| Sample Number | $T_C$ (K) | $\Delta T_{hys}$ (K) | L (kJ/kg) | $|\Delta S_M|$ (J/(kg · K)) | $\Delta T_{ad}$ (K) | $\Delta T_{cyclic}$ (K) | Cyclic Shape |
|---|---|---|---|---|---|---|---|
| y = 0.00, w = 0.00 | 310.6 | 1.5 | 9.3 | 8.7 | 2.4 | 1.6 | Powders |
| y = 0.00, w = 0.02 | 288.6 | 0.6 | 6.3 | 9.2 | 3.0 | 2.0 | Powders |
| y = 0.01, w = 0.01 | 292.9 | 1.0 | 7.3 | 8.9 | 2.4 | 1.6 | Powders |
| y = 0.02, w = 0.00 | 292.6 | 1.2 | 7.1 | 8.5 | 2.8 | 1.8 | Powders |
| Gd | 290.1 | 0.0 | / | 3.0 | 3.5 | 2.2 | Spheres |
| Fe$_2$P—B | 281 | 2.0 | 3.8 | 9.8 | 2.5 | 2.7 | Plates |

Below, Giant Magnetocaloric Mn1.17Fe0.72-xVxP0.5Si0.5 alloys is described.

Below, a preparation method is described.

Polycrystalline $Mn_{1.17}Fe_{0.72-x}V_xP_{0.5}Si_{0.5}$ alloys were prepared by a powder metallurgy method. The starting materials in the form of Mn (99.7%), Fe (99.7%), red P (99%), Si (99.7%) and V (99.5%) powders were mechanically ball milled for 10 h in an Ar atmosphere with a constant rotation speed of 380 rpm, then pressed into small tablets, and finally sealed in quartz ampoules under 200 μmbar of Ar before employing the various heat treatment conditions. These tablets were annealed at 1343 K for 25 h in order to crystalize and finally quenched in water.

Below, a preparation method is described.

Polycrystalline $(Mn, Fe)_{1.90}V_{0.02}(P, Si)$ alloys, in which the Mn/Fe and P/Si ratio change simultaneously, were prepared by a powder metallurgy method. The starting materials in the form of Mn (99.7%), Fe (99.7%), red P (99%), Si (99.7%) and V (99.5%) powders were mechanically ball milled for 10 h in an Ar atmosphere with a constant rotation speed of 380 rpm, then pressed into small tablets, and finally sealed in quartz ampoules under 200 μmbar of Ar before employing the various heat treatment conditions. These tablets were annealed at 1373 K for 25 h in order to crystalize and finally quenched in water.

Further (comparative) examples are described below, preparation of these materials is not limited to powder metallurgy. Melting synthesis is also possible like described by e.g. S. Rundquist and F. Jellinek, Acta. Chem. Scand. (1959) 13 pp 425.

TABLE 5a

| | | | comparative) examples | | | |
|---|---|---|---|---|---|---|
| Stoichiometry (at %) | Mn (at %) | Fe (at %) | P (at %) | Si (at %) | B (at %) | V (at %) |
| 1.95 | 1.2 | 0.75 | 0.5 | 0.5 | 0 | 0 |
| 1.95 | 1.19 | 0.75 | 0.5 | 0.5 | 0 | 0.01 |
| 1.95 | 1.18 | 0.75 | 0.5 | 0.5 | 0 | 0.02 |
| 1.95 | 1.17 | 0.75 | 0.5 | 0.5 | 0 | 0.03 |
| 1.95 | 1.16 | 0.75 | 0.5 | 0.5 | 0 | 0.04 |
| 1.95 | 1.15 | 0.75 | 0.5 | 0.5 | 0 | 0.05 |
| 1.95 | 1.2 | 0.75 | 0.5 | 0.5 | 0 | 0 |
| 1.95 | 1.19 | 0.75 | 0.5 | 0.5 | 0 | 0.01 |
| 1.95 | 1.18 | 0.75 | 0.5 | 0.5 | 0 | 0.02 |
| 1.95 | 1.17 | 0.75 | 0.5 | 0.5 | 0 | 0.03 |
| 1.95 | 1.16 | 0.75 | 0.5 | 0.5 | 0 | 0.04 |
| 1.95 | 1.15 | 0.75 | 0.5 | 0.5 | 0 | 0.05 |
| 1.95 | 1.2 | 0.75 | 0.5 | 0.5 | 0 | 0 |
| 1.95 | 1.19 | 0.75 | 0.5 | 0.5 | 0 | 0.01 |
| 1.95 | 1.18 | 0.75 | 0.5 | 0.5 | 0 | 0.02 |
| 1.95 | 1.17 | 0.75 | 0.5 | 0.5 | 0 | 0.03 |
| 1.95 | 1.16 | 0.75 | 0.5 | 0.5 | 0 | 0.04 |
| 1.95 | 1.15 | 0.75 | 0.5 | 0.5 | 0 | 0.05 |
| 1.95 | 1 | 0.95 | 0.593 | 0.33 | 0.077 | 0 |
| 1.95 | 0.99 | 0.95 | 0.593 | 0.33 | 0.077 | 0.01 |
| 1.95 | 0.98 | 0.95 | 0.593 | 0.33 | 0.077 | 0.02 |
| 1.95 | 0.97 | 0.95 | 0.593 | 0.33 | 0.077 | 0.03 |
| 1.95 | 1 | 0.95 | 0.563 | 0.36 | 0.077 | 0 |
| 1.95 | 0.99 | 0.95 | 0.563 | 0.36 | 0.077 | 0.01 |
| 1.95 | 0.98 | 0.95 | 0.563 | 0.36 | 0.077 | 0.02 |
| 1.95 | 0.97 | 0.95 | 0.563 | 0.36 | 0.077 | 0.03 |
| 1.95 | 1 | 0.95 | 0.563 | 0.36 | 0.077 | 0 |
| 1.95 | 0.99 | 0.95 | 0.563 | 0.36 | 0.077 | 0.01 |
| 1.95 | 0.98 | 0.95 | 0.563 | 0.36 | 0.077 | 0.02 |
| 1.95 | 0.97 | 0.95 | 0.563 | 0.36 | 0.077 | 0.03 |
| 1.95 | 0.9 | 1.05 | 0.563 | 0.36 | 0.077 | 0 |
| 1.95 | 0.89 | 1.05 | 0.563 | 0.36 | 0.077 | 0.01 |
| 1.95 | 0.88 | 1.05 | 0.563 | 0.36 | 0.077 | 0.02 |
| 1.95 | 0.87 | 1.05 | 0.563 | 0.36 | 0.077 | 0.03 |
| 1.95 | 0.9 | 1.05 | 0.563 | 0.36 | 0.077 | 0 |
| 1.95 | 0.89 | 1.05 | 0.563 | 0.36 | 0.077 | 0.01 |
| 1.95 | 0.88 | 1.05 | 0.563 | 0.36 | 0.077 | 0.02 |
| 1.95 | 0.87 | 1.05 | 0.563 | 0.36 | 0.077 | 0.03 |
| 1.92 | 1.18 | 0.74 | 0.5 | 0.5 | 0 | 0 |
| 1.9 | 1.17 | 0.73 | 0.5 | 0.5 | 0 | 0 |
| 1.88 | 1.16 | 0.72 | 0.5 | 0.5 | 0 | 0 |
| 1.86 | 1.15 | 0.71 | 0.5 | 0.5 | 0 | 0 |
| 1.84 | 1.13 | 0.71 | 0.5 | 0.5 | 0 | 0 |
| 1.82 | 1.12 | 0.7 | 0.5 | 0.5 | 0 | 0 |
| 1.9 | 1.17 | 0.73 | 0.5 | 0.5 | 0 | 0 |
| 1.9 | 1.15 | 0.73 | 0.5 | 0.5 | 0 | 0.02 |
| 1.9 | 1.16 | 0.72 | 0.5 | 0.5 | 0 | 0.02 |
| 1.9 | 1.17 | 0.71 | 0.5 | 0.5 | 0 | 0.02 |
| 1.88 | 1.16 | 0.72 | 0.5 | 0.5 | 0 | 0 |
| 1.88 | 1.14 | 0.72 | 0.5 | 0.5 | 0 | 0.02 |
| 1.88 | 1.15 | 0.71 | 0.5 | 0.5 | 0 | 0.02 |
| 1.88 | 1.16 | 0.7 | 0.5 | 0.5 | 0 | 0.02 |

The thermal hysteresis of samples is less than 2.0 K and dM/dT is larger than 5 $Am^2$/kgK. $T_C$ covers temperature range of 230-350 K.

TABLE 5b

| | | | comparative) examples | | | |
|---|---|---|---|---|---|---|
| Stoichiometry (at %) | Mn (at %) | Fe (at %) | P (at %) | Si (at %) | B (at %) | V (at %) |
| 1.95 | 1.19 | 0.75 | 0.5 | 0.5 | 0 | 0.01 |
| 1.95 | 1.18 | 0.75 | 0.5 | 0.5 | 0 | 0.02 |
| 1.95 | 1.17 | 0.75 | 0.5 | 0.5 | 0 | 0.03 |
| 1.95 | 1.16 | 0.75 | 0.5 | 0.5 | 0 | 0.04 |
| 1.95 | 1 | 0.95 | 0.593 | 0.33 | 0.077 | 0 |
| 1.95 | 0.98 | 0.95 | 0.593 | 0.33 | 0.077 | 0.02 |
| 1.95 | 1 | 0.95 | 0.563 | 0.36 | 0.077 | 0 |
| 1.95 | 0.98 | 0.95 | 0.563 | 0.36 | 0.077 | 0.02 |
| 1.95 | 0.97 | 0.95 | 0.563 | 0.36 | 0.077 | 0.03 |
| 1.95 | 1 | 0.95 | 0.563 | 0.36 | 0.077 | 0 |
| 1.95 | 0.9 | 1.05 | 0.563 | 0.36 | 0.077 | 0 |
| 1.95 | 0.9 | 1.05 | 0.563 | 0.36 | 0.077 | 0 |
| 1.88 | 1.16 | 0.72 | 0.5 | 0.5 | 0 | 0 |
| 1.9 | 1.15 | 0.73 | 0.5 | 0.5 | 0 | 0.02 |
| 1.9 | 1.16 | 0.72 | 0.5 | 0.5 | 0 | 0.02 |
| 1.9 | 1.17 | 0.71 | 0.5 | 0.5 | 0 | 0.02 |

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" includes also embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. An alloy comprising metal elements and non-metal elements, wherein the metal elements comprise manganese, iron, and vanadium, and wherein the non-metal elements comprise phosphor and silicon, wherein:
the alloy is $(Mn_aFe_bV_cM^*_d)x(PeSifA^*g)y$, wherein:
M* refers to optional other metals;
A* refers to optional other non-metals;
a+b+c+d=1 and e+f+g=1;
a>0, b>0, c>0, d≥0, e>0, and f>0;
a+b≥0.8;
e+f≥0.7;
g≤0.12;
x is selected from the range of 1.8-2.1;
y is selected from the range of 0.85-1.05;
an atom ratio of the vanadium element to the other metal elements is selected from the range of 0.01:1.94-0.04:1.86;
the atom ratio of V to all metal elements is selected from the range of 0.005-0.1; and
the atom ratio of Mn to Fe is selected from the range of 0.3-2.

2. The alloy according to claim 1, wherein an atom ratio of the metal elements to the non-metal elements is within the range of 1.93-1.97: 1.

3. The alloy according to claim 1, further comprising one or more of C, N, B, wherein an atom ratio of C, N and B to phosphor and silicon ([C]+[N]+[B])/([P]+[Si]) is equal to or smaller than 0.1.

4. The alloy according to claim 1, wherein an atom ratio of the silicon element is in a molar fraction of the non-metal elements ranging from 0.3 to 0.6, with the remainder being (i) P, or (ii) P, and one or two out of C, N, B.

5. The alloy according to claim 1, wherein an atom ratio of the silicon element is in a molar fraction of the non-metal elements ranging from 0.3 to 0.6, with the remainder being P, and C, N, and B.

6. The alloy according to claim 1, obtainable by pre alloying starting materials for the alloy and a subsequent heat treatment at a temperature selected from the range of 1300-1500 K over a period of time selected from the range from minutes to weeks.

7. The alloy according to claim 1, shaped to facilitate fast heat transfer.

8. The alloy according to claim 1, wherein d=0.

9. The alloy according to claim 1, wherein A* is B.

10. The alloy according to claim 1, wherein the alloy is $Mn_{1.2-x}V_xFe_{0.75}P_{0.5}Si_{0.5}$,
$Mn_{1-x}V_xFe_{0.95}P_{0.593}Si_{0.33}B_{0.077}$,
$Mn_{1-x}V_xFe_{0.95}P_{0.563}Si_{0.36}B_{0.077}$, or
$Mn_{1.17}V_xFe_{0.73-x}P_{0.5}Si_{0.5}$,
wherein x=0.01, 0.02, 0.03, 0.04, or 0.05.

11. The alloy according to claim 1, wherein the alloy is selected from $Mn_{1.20}V_{0.02}Fe_{0.68}P_{0.51}Si_{0.49}$, $Mn_{1.17}V_{0.02}Fe_{0.71}P_{0.50}Si_{0.50}$, $Mn_{1.14}V_{0.02}Fe_{0.74}P_{0.49}Si_{0.51}$, and $Mn_{1.10}V_{0.02}Fe_{0.78}P_{0.47}Si_{0.53}$.

12. An apparatus configured to execute one or more of (a) cooling during a first operation mode, and (b) heating during a second operation mode, wherein the apparatus comprises a thermo element comprising the alloy according to claim 1.

13. The apparatus according to claim 12, further comprising:
a magnetic field generator, a heat sink, and a control system, wherein in a controlling mode the control system is configured to select between (i) a first configuration wherein the magnetic field generator generates a magnetic field, the thermo element is exposed to the magnetic field, and the thermo element is in thermal contact with the heat sink, and (ii) a second configuration, wherein the thermo element is not exposed to the magnetic field, and the thermo element is not in thermal contact with the heat sink.

14. The apparatus according to claim 12, further comprising a fluid system, wherein the fluid system is configured to contain a fluid, and wherein the fluid system is configured to provide thermal contact between the thermo element and the fluid.

15. The apparatus according to claim 14, wherein the fluid comprises a nonflammable, nontoxic, greenhouse-effect neutral fluid that does not boil or freeze in the desired temperature range.

16. The apparatus according to claim 12, further comprising:
a magnetic field generator, a heat sink, a heat source, and a control system, wherein in a controlling mode the control system is configured to select between (i) a first configuration wherein the magnetic field generator generates a magnetic field, the thermo element is exposed to the magnetic field, and heat from the thermo element is transferred to the heat sink, and (ii) a second configuration, wherein the thermo element is not exposed to the magnetic field, and heat from the heat source is transferred to the thermo element.

17. A system comprising the apparatus according to claim 12, wherein the system is configured to heat, to cool, or to heat and cool, respectively, or to generate mechanical energy.

18. The system according to claim 17, wherein the system is configured as a refrigerator, wherein in a controlling mode of the system, the system is configured to pump heat from sub ambient levels to a temperature in the range from ambient down to 210 K to temperatures above ambient.

19. The system according to claim 17, wherein the system is configured as a heater, wherein in a controlling mode of the system, the system is configured to pump heat from sub ambient levels to temperatures above ambient up to 380 K.

20. The system according to claim 17, further comprising a magnetic field source and a thermal switch, wherein the system is configured to generate mechanical and/or electrical energy.

21. A method for producing the alloy according to claim 1, comprising providing a combination of starting materials to produce the alloy, and heating the combination of starting material until the alloy is obtained.

22. The method according to claim 21, wherein the starting materials comprise at least one of elemental starting materials or a pre alloyed starting material, and wherein the heating comprises heating at a temperature selected from the range of 1300-1500 K.

* * * * *

UNITED STATES PATENT AND TRADEMARK OFFICE
CERTIFICATE OF CORRECTION

PATENT NO. : 11,972,883 B2
APPLICATION NO. : 17/285523
DATED : April 30, 2024
INVENTOR(S) : Ekkehard Hubertus Brück, Jaiwei Lai and Niels Harmen Van Dijk It is certified that error appears in the above-identified patent and that said Letters Patent is hereby corrected as shown below:

In the Claims

In Claim 1, Column 25, Line 65, replace "the alloy is $(Mn_aFe_bV_cM^*_d)x(PeSifA^*g)y$, wherein:" with -- the alloy is $(Mn_aFe_bV_cM^*d)_x(P_eSi_fA^*_g)_y$, wherein: --

Signed and Sealed this
Sixth Day of August, 2024

Katherine Kelly Vidal
*Director of the United States Patent and Trademark Office*